United States Patent
Choi et al.

(10) Patent No.: US 11,770,232 B2
(45) Date of Patent: Sep. 26, 2023

(54) METHOD AND APPARATUS FOR MULTIPLEXING UPLINK CHANNELS IN WIRELESS CELLULAR COMMUNICATION SYSTEM

(71) Applicant: Samsung Electronics Co., Ltd., Suwon-si (KR)

(72) Inventors: Seunghoon Choi, Seongnam-si (KR); Taehyoung Kim, Seoul (KR); Yongjun Kwak, Yongin-si (KR); Donghan Kim, Osan-si (KR); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 17/238,713

(22) Filed: Apr. 23, 2021

(65) Prior Publication Data
US 2021/0243000 A1   Aug. 5, 2021

Related U.S. Application Data

(63) Continuation of application No. 15/821,298, filed on Nov. 22, 2017, now abandoned.
(Continued)

(30) Foreign Application Priority Data

Dec. 19, 2016  (KR) .................. 10-2016-0173755
Mar. 3, 2017   (KR) .................. 10-2017-0027834
Apr. 25, 2017  (KR) .................. 10-2017-0053076

(51) Int. Cl.
*H04L 5/02*  (2006.01)
*H04L 5/00*  (2006.01)
(Continued)

(52) U.S. Cl.
CPC .............. *H04L 5/023* (2013.01); *H04L 5/005* (2013.01); *H04L 5/0007* (2013.01);
(Continued)

(58) Field of Classification Search
CPC ....... H04L 5/023; H04L 5/005; H04L 5/0007; H04L 5/0044; H04W 72/042
See application file for complete search history.

(56) References Cited

U.S. PATENT DOCUMENTS

2013/0157660 A1   6/2013  Awad et al.
2017/0339454 A1*  11/2017 Meng ................... H04L 5/0007
(Continued)

OTHER PUBLICATIONS

LG Electronics, Discussions on sPDSCH and DMRS design, 3GPP TSG RAN WG1 Meeting #87, Reno, USA Nov. 14-18, 2016, R1-1611777. (Year: 2016).*
(Continued)

*Primary Examiner* — Shailendra Kumar
(74) *Attorney, Agent, or Firm* — Jefferson IP Law, LLP

(57) ABSTRACT

A communication technique of fusing a 5$^{th}$ generation (5G) communication system for supporting higher data transmission rate beyond a 4$^{th}$ generation (4G) system with an Internet of Things (IoT) technology and a system thereof are provided. The communication technique may be applied to intelligent services (e.g., smart home, smart building, smart city, smart car or connected car, health care, digital education, retail business, security and safety related service, or the like) based on the 5G communication technology and the IoT related technology. In order to support sufficient uplink coverage, two structures of an uplink control channel and a multiplexing method with other channels, a method in which long term evolution (LTE) and 5G systems coexist in a single carrier, and a method for reducing an overhead of downlink control information are provided.

20 Claims, 67 Drawing Sheets

Related U.S. Application Data

(60) Provisional application No. 62/425,400, filed on Nov. 22, 2016.

(51) Int. Cl.
*H04W 72/23* (2023.01)
*H04L 27/00* (2006.01)

(52) U.S. Cl.
CPC .......... *H04L 5/0044* (2013.01); *H04L 5/0051* (2013.01); *H04L 5/0053* (2013.01); *H04W 72/23* (2023.01); *H04L 5/001* (2013.01); *H04L 27/0006* (2013.01)

(56) References Cited

U.S. PATENT DOCUMENTS

| | | | |
|---|---|---|---|
| 2018/0049189 A1* | 2/2018 | Hugl | H04W 72/042 |
| 2018/0132211 A1* | 5/2018 | Huang | H04L 5/00 |
| 2018/0212732 A1* | 7/2018 | You | H04L 5/0051 |
| 2019/0052332 A1* | 2/2019 | Shimezawa | H04W 72/0446 |

OTHER PUBLICATIONS

3rd Generation Partnership Project; Technical Specification Group Radio Access Network; Evolved Universal Terrestrial Radio Access (E-UTRA); Study on latency reduction techniques for LTE (Release 14), Jun. 2016, TR 36.881 V14.0.0 (Jun. 2016). (Year: 2016).*

LG Electronics, 'Discussions on sPDSCH and DMRS design', R1-1611777, 3GPP TSG RAN WG1 Meeting #87, Nov. 5, 2016, Reno, USA.

Huawei et al., 'Discussion on DMRS-based sPDCCH', R1-1611157, 3GPP TSG RAN WG1 Meeting #87, Nov. 5, 2016, Reno, USA.

LG Electronics, 'Considerations on Reference Signal for Control Channel', R1-1611815, 3GPP TSG RAN WG1 Meeting #87, Nov. 5, 2016, Reno, USA.

Ericsson, 'DMRS reuse for data and control', R1-1612988, 3GPP TSG-RAN WG1 #87, Nov. 4, 2016, Reno, USA.

International Search Report dated Feb. 8, 2018, issued in International Application No. PCT/KR2017/013319.

3rd Generation Partnership Project; Technical Specification Group Radio Access Network; Evolved Universal Terrestrial Radio Access (E-UTRA); Study on latency reduction techniques for LTE (Release 14), Jun. 2016, TR 36.881 V14.0.0; Jun. 2016.

* cited by examiner

METHOD AND APPARATUS FOR MULTIPLEXING UPLINK CHANNELS IN WIRELESS CELLULAR COMMUNICATION SYSTEM

CROSS-REFERENCE TO RELATED APPLICATION(S)

This application is a continuation application of prior application Ser. No. 15/821,298, filed on Nov. 22, 2017, which claimed priority under 35 U.S.C. § 119(e) of a U.S. Provisional application filed on Nov. 22, 2016 in the U.S. Patent and Trademark Office and assigned Ser. No. 62/425,400, and under 35 U.S.C. § 119(a) of a Korean Patent application filed on Dec. 19, 2016 in the Korean Intellectual Property Office and assigned Serial number 10-2016-0173755, a Korean Patent application filed on Mar. 3, 2017 in the Korean Intellectual Property Office and assigned Serial number 10-2017-0027834, and a Korean Patent application filed on Apr. 25, 2017 in the Korean Intellectual Property Office and assigned Serial number 10-2017-0053076, the entire disclosure of each of which is hereby incorporated by reference.

TECHNICAL FIELD

Various embodiments of the present disclosure relate to a mobile communication system. More particularly, the present disclosure relates to a method and an apparatus for efficiently transmitting/receiving a signal in a $5^{th}$ generation (5G) mobile communication system.

BACKGROUND

To meet a demand for radio data traffic that is on an increasing trend since commercialization of a $4^{th}$ generation (4G) communication system, efforts to develop an improved $5^{th}$ generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple-input and multiple-output (MIMO), full dimensional MIMO (FD-MIMO), array antenna, analog beamforming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid frequency shift keying (FSK) and quadrature amplitude modulation (QAM) modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the related-art information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

In order to process explosively increasing mobile data traffic in recent years, a 5th generation (5G) system which is a next generation telecommunication system since long term evolution (LTE) or evolved universal terrestrial radio access (E-UTRA) and LTE-advanced (LTE-A) or E-UTRA evolution has been actively discussed. The 5G system is aiming at high-speed data service of several Gbps using ultra-wideband. For this purpose, an operating frequency band of 5G system considers a very high frequency band of several GHz or several tens of GHz as candidate frequency.

In the above-mentioned 5G system, various services are provided and a new communication method is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, aspects of the present disclosure are directed to provision of an uplink channel structure in a $5^{th}$ generation (5G) frame structure design. In order to support sufficient uplink coverage, an uplink control channel may have two structures. A detailed embodiment of an uplink control channel structure of each structure, and a method for multiplexing other channels is proposed.

Another aspect of the present disclosure is directed to provision of a method for coexistence of long term evolution (LTE) and a 5G system in at least one LTE carrier, including a method for using a multimedia broadcast single frequency network (MBSFN) subframe, a method for using an uplink (UL) subframe, a method for using a licensed assisted access (LAA) operation in an unlicensed band, and a method for cell activation in carrier aggregation (CA), and an apparatus therefor.

Still another aspect of the present disclosure is directed to provision of an efficient downlink control channel transmission method and an apparatus therefor when a slot having a short length is supported in a 5G wireless communication system.

Aspects of the present disclosure are not limited to the above-mentioned aspects. That is, other aspects that are not mentioned may be obviously understood by those skilled in the art to which the present disclosure pertains from the following description.

In accordance with an aspect of the present invention, a method for transmitting control information in a wireless communication system is provided. The method may include identifying a first resource for transmitting control information, identifying a second resource for transmitting data, transmitting the control information and a demodulation reference signal for decoding the control information on the first resource, and transmitting the data on the second resource, and wherein the second resource is identified based on the first resource.

In accordance with another aspect of the present invention, a method for receiving control information in a wireless communication system is provided. The method may include receiving control information and a demodulation reference signal for decoding the control information on a first resource, and receiving data on a second resource, and wherein the second resource is identified based on the first resource.

In accordance with another aspect of the present invention, a base station in a wireless communication system is provided. The terminal may include a transceiver, and a controller coupled with the transceiver and configured to control to identify a first resource for transmitting control information, identify a second resource for transmitting data, transmit the control information and a demodulation reference signal for decoding the control information on the first resource, and transmit the data on the second resource, and wherein the second resource is identified based on the first resource.

In accordance with another aspect of the present invention, a terminal in a wireless communication system is provided. The base station may include: a transceiver, and a controller coupled with the transceiver and configured to control to receive control information and a demodulation reference signal for decoding the control information on a first resource, and receive data on a second resource, and wherein the second resource is identified based on the first resource.

According to an embodiment of the present disclosure, a system capable of efficient multiplexing between uplink channels may be configured. In addition, the LTE and the 5G communication system can coexist and may be effectively operated in one LTE carrier frequency or multiple LTE carriers without the introduction of the additional carriers for the 5G (or new radio (NR)).

Also, it is possible to effectively use the radio resource by effectively transmitting the downlink control channel and sharing the demodulation reference signal in the 5G communication system. Meanwhile, other various effects will be directly or implicitly disclosed in the detailed description according to the embodiment of the present disclosure to be described below.

The effects that may be achieved by the embodiments of the present disclosure are not limited to the above-mentioned aspects. That is, other effects that are not mentioned may be obviously understood by those skilled in the art to which the present disclosure pertains from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
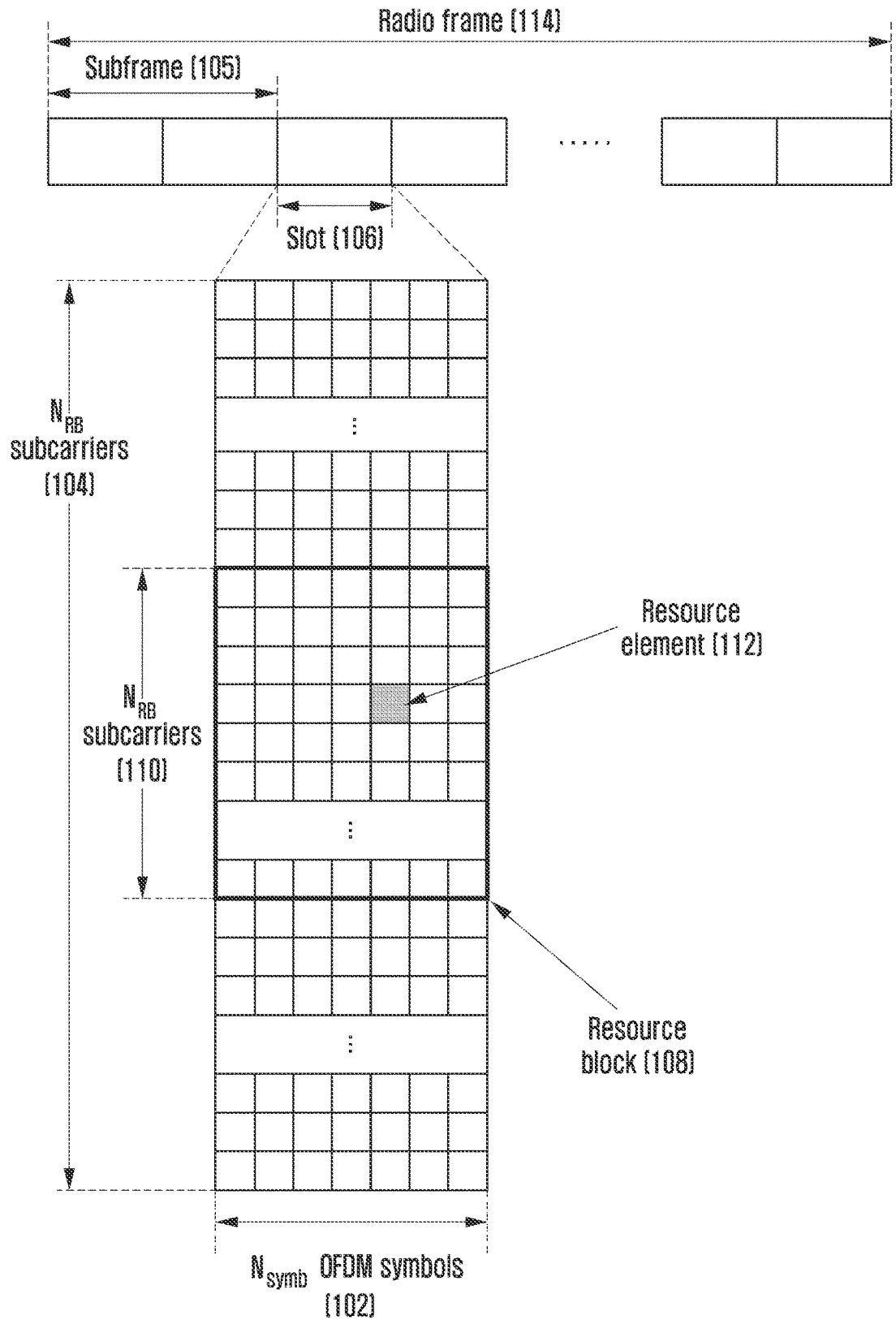
FIG. 1 is a diagram illustrating a long term evolution (LTE) frame structure according to various embodiments of the present disclosure.

Hereinafter, exemplary embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

Further, in describing in detail embodiments of the present disclosure, an advanced evolved universal terrestrial radio access (E-UTRA) (or referred to as long term evolution-advanced (LTE-A)) system supporting a carrier aggregation will be mainly described. However, a main subject of the present disclosure may be slightly changed to be applied to other communication systems having similar technical backgrounds and channel forms without greatly departing the scope of the present disclosure, which may be determined by those skilled in the art to which the present disclosure pertains. For example, a main subject may also be applied to a multicarrier HSPA supplying the carrier aggregation.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operations son the computer or the other programmable data processing apparatuses to create processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are contiguously illustrated may be simultaneously performed in fact or be performed in a reverse sequence depending on corresponding functions sometimes.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Here, the term '-unit' used in the present embodiment means software or hardware components such as a field-programmable gate array (FPGA) and an application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card.

First Embodiment

In order to process explosively increasing mobile data traffic in recent years, a 5th generation (5G) system which is a next generation telecommunication system since long term evolution (LTE or E-UTRA LTE-A or E-UTRA evolution has been actively discussed. A system transmission bandwidth per single carrier of the related-art LTE and LTE-A is limited to a maximum of 20 MHz, while the 5G system aims at providing super-high speed data services of several Gbps using an ultra-wide bandwidth much wider than that. Since it is difficult to secure an ultra-wideband frequency in a frequency band ranging from hundreds of GHz to several GHz used in the related-art mobile communication system, an operating frequency band of the 5G system is a very high frequency band of several GHz or tens of GHz as a candidate frequency.

A radio wave in the very high frequency band is a wavelength of about several mm and therefore is sometimes referred to as a millimeter wave (mmWave). However, in the very high frequency band, a path loss of the radio wave is increased in proportion to the frequency band, such that the coverage of the mobile communication system becomes small.

In order to overcome the disadvantage of the reduction in the coverage, a beamforming technique for concentrating radiation energy of a radio wave onto a predetermined destination by using a plurality of antennas to increase an arrival distance of the radio wave is becoming more important. The beamforming technique may be applied to a transmitting end and a receiving end, respectively. The beamforming technique also reduces interference in areas other than the beam forming direction in addition to increasing the coverage. In addition to the effect of increasing the coverage upon the application of the beamforming technique, there is the effect that the interference is reduced in an area other than the beamforming direction.

As another requirement of the 5G system, there is an ultra low latency service having a transmission delay of about 1 ms between the transmitting/receiving ends. By one method for reducing a transmission delay, a frame structure design based on short transmission time interval (TTI) compared to the LTE and the LTE-A is possible. The TTI is a basic unit for performing scheduling. The TTI of the related-art LTE and LTE-A systems is 1 ms corresponding to the length of one subframe. For example, as the short TTI for satisfying the requirement for ultra-low latency services of the 5G system LTE, there may be 0.5 ms, 0.2 ms, 0.1 ms, or the like shorter than the related-art LTE and LTE-A systems. In the following description, unless otherwise stated, one TTI and subframe are a basic unit of the scheduling and is interchangeably used with each other as a meaning representing a predetermined time interval.

Hereinafter, the restrictions of the LTE and LTE-A systems will be described with reference to the drawings, and the design direction of the 5G system will be described.

FIG. 1 is a diagram illustrating LTE frame structure according to various embodiments of the present disclosure.

In FIG. 1, a horizontal axis represents a time domain and a vertical axis represents a frequency domain. An uplink (UL) means a radio link through which a terminal transmits a data or a control signal to a base station and a downlink (DL) means a radio link through which the base station transmits the data or the control signal to the terminal. A minimum transmission unit in the time domain of the related-art LTE and LTE-A systems is an OFDM symbol in the case of the downlink and a single carrier frequency division multiple access (SC-FDMA) symbol in the case of the uplink, in which one slot 106 is formed by collecting $N_{symb}$ symbols 102 and one subframe 105 is formed by collecting two slots. Further, a radio frame 114 is a time domain unit consisting of 10 subframes. A minimum transmission unit in the frequency domain is a sub-carrier of 15 kHz unit, in which the whole system transmission bandwidth consists of a total of $N_{BW}$ sub-carriers 104.

A basic unit of the resource in the time-frequency domain is a resource element (RE) 112 and may be represented by an OFDM symbol index or an SC-FDMA symbol index and a subcarrier index. A resource block (RB) 108 (or a physical resource block (PRB)) is defined by the $N_{symb}$ continued OFDM symbols 102 in the time domain and $N_{RB}$ continued sub-carriers 110 in the frequency domain. Therefore, one RB 108 consists of $N_{symb} \times N_{RB}$ REs 112.

In the LTE and LTE-A systems, a data is mapped in an RB unit, and the base station performs scheduling on a predetermined terminal in a RB-pair unit configuring one subframe. The number of SC-FDMA symbols or the number $N_{symb}$ of OFDM symbols is determined depending on a cyclic prefix (CP) length added to each symbol to prevent inter-symbol interference. For example, if a normal CP is applied, $N_{symb}=7$ and if a scalable CP is applied, $N_{symb}=6$. The $N_{BW}$ is proportional to the bandwidth of the system transmission band and the data rate is increased in proportion to the number of RBs scheduled to the terminal.

Figure 2:
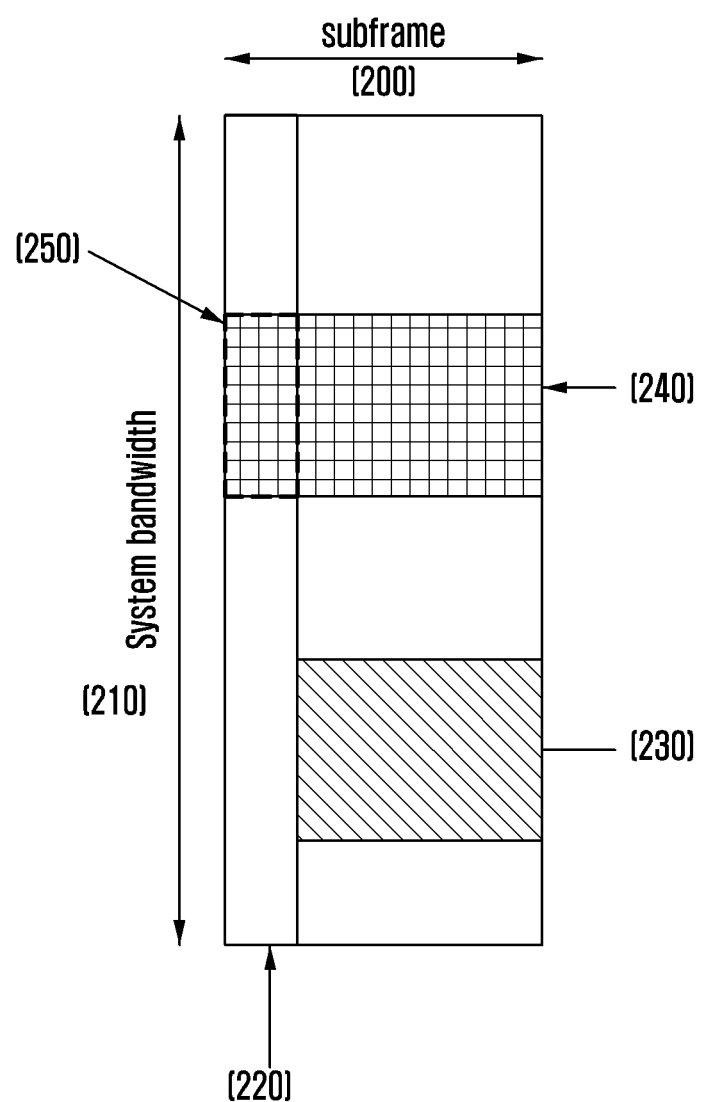
FIG. 2 is a diagram illustrating an LTE data channel and a control channel structure according to various embodiments of the present disclosure.

FIG. 2 is a diagram illustrating an LTE data channel and a control channel structure according to various embodiments of the present disclosure. In FIG. 2, a horizontal axis represents a time domain and a vertical axis represents a frequency domain. In the LTE and LTE-A systems, a basic unit of scheduling is a subframe 200. In general, a base station determines whether to schedule a terminal for each subframe, and transmits the data channel and the control channel including the scheduling information on the data channel according to the scheduling determination result. In the time domain, the control channel is mapped over first to third OFDM symbol periods in the subframe, and in the frequency domain, the control channel is distributed and mapped over the system transmission band 210 and is transmitted to the terminal 220. As a result, the terminal processing for the control channel is completed as early as possible, and the frequency diversity effect is maximized to improve the reception performance of the control channel.

The data channel scheduled by the control channel is mapped from the next OFDM symbol of the mapped OFDM symbol to the last OFDM symbol of the corresponding subframe in the time domain, and mapped within a range not exceeding the system transmission bandwidth according to the scheduling determination result of the base station in the time domain and transmitted to the terminal (230). Therefore, the terminal should always have the reception capability of the entire system transmission band regardless of the size of the frequency domain occupied by the data channel actually scheduled.

There is no big difference in terms of the implementation of the terminal in the LTE or LTE-A system having a relatively narrower system transmission bandwidth, but the complexity of the implementation of the terminal may be excessively increased in the 5G system in which the system transmission bandwidth is an ultra wideband. For example, in the initial introduction stage of the 5G system, the terminal which supports only some (subband 240) of the 5G system bandwidth in which the increase in the complexity is not relatively large for early diffusion of the 5G terminal may be introduced. In this case, when the mapping of the 5G control channel is distributed and mapped over the entire system transmission band as in the related-art LTE and LTE-A systems, a problem occurs that the 5G terminal supporting only the subband cannot receive the 5G control channel. Therefore, the 5G terminal supporting only the subband does not use radio resources as much as an area 250, which is inefficient. Similarly, there are restrictions on efficient resource utilization of various 5G services that may be introduced in the future when defining the channel occupying the entire system transmission band as in the related-art LTE and LTE-A systems. That is, there are restrictions on providing forward compatibility.

Figure 3:
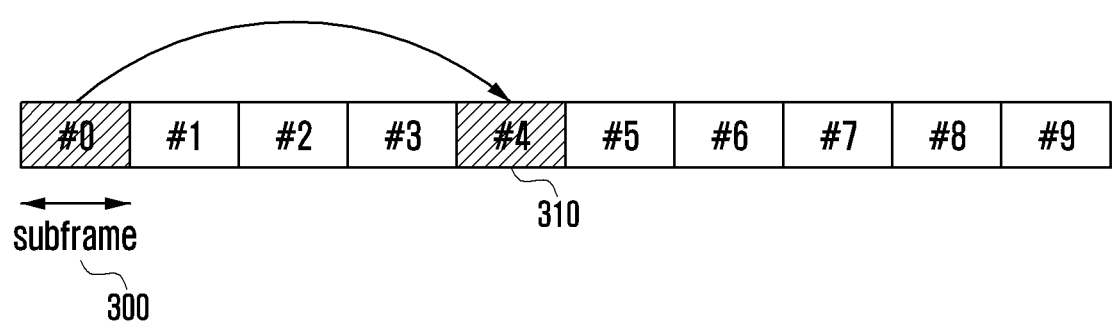
FIG. 3 is a diagram illustrating an LTE hybrid automatic repeat request (HARQ) timing structure according to various embodiments of the present disclosure.

FIG. 3 is a diagram illustrating an LTE hybrid automatic repeat request (HARQ) timing structure according to various embodiments of the present disclosure. The LTE and LTE-A systems may support a frequency division duplex (FDD) scheme and a time division duplex (TDD) scheme. The FDD scheme uses separate frequencies for a downlink and an uplink, respectively, whereas the TDD scheme uses a common frequency to the uplink and the downlink but separately operates transmission/reception of an uplink signal and a downlink signal in the time domain. The TDD scheme separately transmits uplink or downlink signals for each subframe. Therefore, various TDD uplink-downlink (UL-DL) configurations are defined and operated so that the TDD scheme may be operated by equally dividing the subframes for uplink/downlink in the time domain according to a traffic load of the uplink and the downlink, operated by allocating more subframes to the downlink, or operated by allocating more subframes to the uplink.

In the LTE and LTE-A systems of the FDD scheme, when a base station transmits a data channel and a control channel related thereto in an n-th subframe (300), an HARQ ACK/NACK feedback indicating whether or not the terminal successfully receives the data channel in an n+4-th subframe is transmitted to the base station (310). The LTE and LTE-A systems of the TDD scheme are operated by defining HARQ ACK/NACK feedback timing corresponding to each subframe for each TDD uplink-downlink setup. Further, the HARQ ACK/NACK feedback timing may be further defined according to whether or not support of carrier aggregation (CA) and a combination. That is, the implementation complexity may be increased due to various HARQ ACK/NACK feedback timing.

The 5G system may have two channel structures for the transmission of the uplink control signal. One is a structure of a control channel of a short transmission interval to minimize a transmission delay and the other is a control channel structure of a long transmission interval to obtain sufficient cell coverage. The main gist of the present disclosure relates to the transmission/reception operation related to the uplink control channel of at least two structures described above, which will be described below with reference to the drawings.

Figure 4:
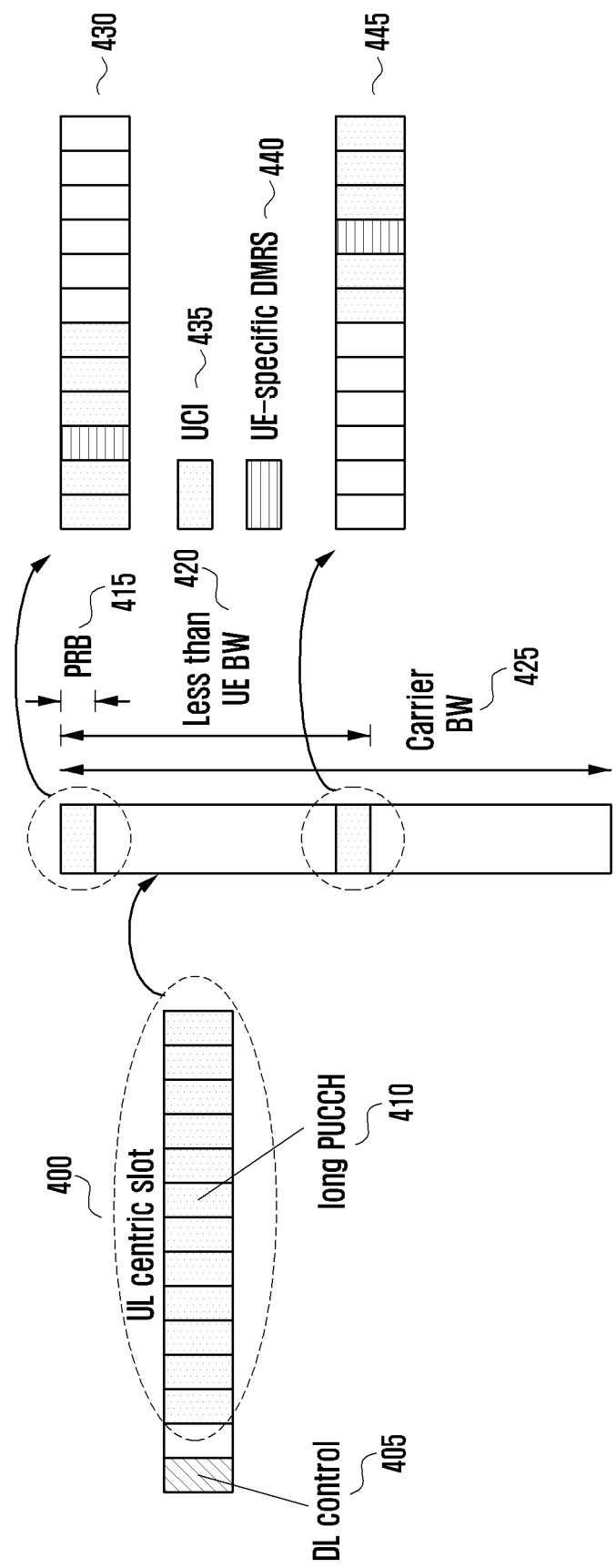
FIG. 4 is a diagram illustrating a control channel structure of a long transmission interval of a $5^{th}$ generation (5G) system according to various embodiments of the present disclosure.

FIG. 4 is a diagram illustrating a control channel structure of a long transmission interval a 5G system according to various embodiments of the present disclosure. The 5G system includes a control channel structure of a long transmission interval for sufficient cell coverage. Reference numeral 400 represents an UL centric slot, which is mostly used within a slot (which may be given various names like a subframe, a transmission time interval (TTI), etc. In the present disclosure, the basic transmission unit is named a slot) which is a transmission basic unit of the 5G. The uplink centric slot refers to a case in which most of the OFDM symbols are used in the uplink, but refer to a case in which all the OFDM symbols may be used for the uplink transmission or a case in which a few OFDM symbols may be used for the downlink transmission. Here, when the downlink and the uplink are simultaneously present within one slot, a transmission gap may exist between the downlink and the uplink. In FIG. 4, a first OFDM symbol in one slot is used for a downlink transmission, for example, a downlink control channel transmission 405, and symbols starting from a third OFDM symbol are used for the uplink transmission. A second OFDM symbol is used as a transmission gap.

In the uplink transmission, the uplink data channel transmission and the uplink control channel transmission are possible. FIG. 4 illustrates the form that an uplink control channel 410 of a long transmission interval is transmitted. Since the control channel of the long transmission interval is used for the purpose of increasing cell coverage, the control channel may be transmitted in a DFT-S-OFDM scheme which is a single carrier transmission rather than an OFDM transmission. In this case, therefore, only the contiguous subcarriers should be transmitted. To obtain a frequency diversity effect, the uplink control channel of the long transmission interval is configured at a spaced position like reference numerals 430 and 445. A spaced distance 420 in terms of frequency should be smaller than a bandwidth supported by the terminal and a maximum support bandwidth of the terminal may be equal to or smaller than a bandwidth 425 supported by the system.

The control channel of the long transmission interval is transmitted using PRB-1 like reference numeral 430 in a front part of the slot, and is transmitted using PRB-2 like reference numeral 445 in a rear part of the slot. In the above description, the PRB 415 is a physical resource block, which means a minimum transmission unit on the frequency side and may be defined as 12 subcarriers, or the like. In addition, the control channel transmitted in the front part of the slot 430 and the control channel transmitted in the rear part of the slot 445 each consist of uplink control information (UCI) 435 and a terminal reference signal 440. It is assumed that the two signals are temporally divided and transmitted in the OFDM symbol.

In the above description, one or a plurality of OFDM symbols before and after the slot may be used as the downlink according to a slot type in the uplink centric slot. In addition, there may be a case in which one or a plurality of OFDM symbols before and after a slot is the uplink but the control channel of the long transmission interval may not be transmitted. For example, when the last OFDM symbol is allocated as a control channel of a short transmission interval within one slot, the control channel of the long transmission interval may not be transmitted in the last OFDM symbol. Therefore, the size of the OFDM symbol in which the control channel of the long transmission interval is transmitted varies according to the slot structure.

Figure 5:
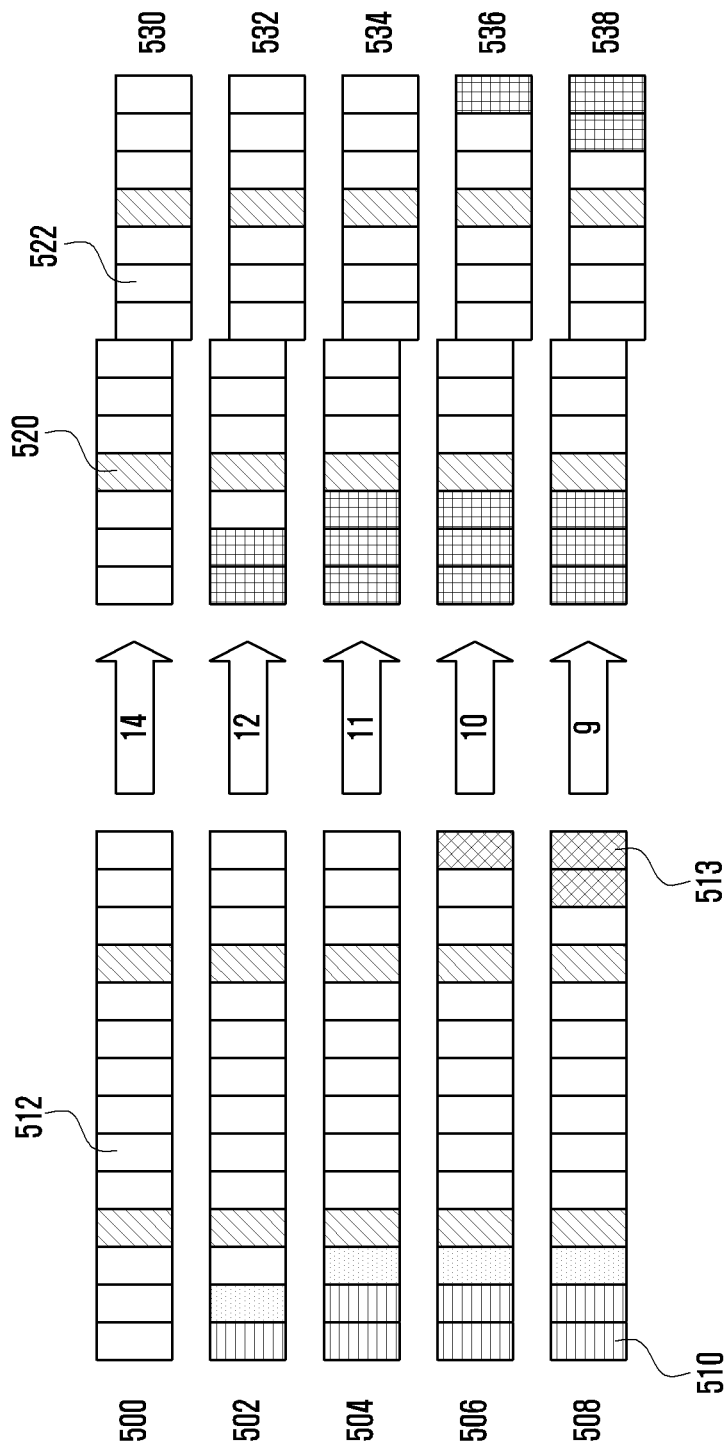
FIG. 5 is a diagram illustrating an example of an orthogonal frequency division multiplexing (OFDM) symbol in which a control channel of a long transmission interval is transmitted according to various embodiments of the present disclosure.

FIG. 5 is a diagram illustrating an example of an orthogonal frequency division multiplexing (OFDM) symbol in which a control channel of a long transmission interval is transmitted according to various embodiments of the present disclosure. Reference numeral 512 is a control channel of a long transmission interval, reference numeral 510 is a downlink control channel, and reference numeral 513 is an area in which a control channel of a short transmission interval or a sounding reference signal (SRS) or the like is allocated. Therefore, the type of the control channel of the long transmission interval may be variously determined from reference numerals 500 to 508 depending on the presence or absence of the OFDM symbol allocated to the downlink OFDM symbol, the control channel of the short transmission interval, or the sounding reference signal (SRS). Of course, in addition to the five cases illustrated in FIG. 5, other cases are possible. In FIG. 4, it is assumed that the control channel of the long transmission interval is divided into two parts and transmitted using another PRB. Reference numerals 530 to 538 show a method for transmitting a control channel of a long transmission interval in slot structures 500 to 508 as described above. Reference numeral 520 represents a terminal reference signal and reference numeral 522 represents uplink control information. A position of the terminal reference signal 520 may be determined by the following manner.

The terminal reference signal is transmitted in the determined OFDM symbol regardless of the slot structure. In other words, the reference signal is transmitted in, for example, fourth and eleventh OFDM symbols in all the slot structures.

The OFDM symbol in which the terminal reference signal is transmitted varies according to the slot structure. That is, if the reference signal is transmitted in fourth and eleventh OFDM symbols in reference numeral 530, the reference signal are transmitted in fifth and tenth OFDM symbols in reference numeral 538. The present disclosure proposes that the position of the reference signal varies according to the slot structure, and the position of the specific OFDM symbol may be variously determined.

In addition, a method for mapping uplink control information 522 may be determined as follows.

First, symbols encoded according to the size of the corresponding resource may be rate-matched according to the number of OFDM symbols determined in the slot structure to match and transmit control information.

Second, if the control information is mapped to all possible OFDM symbols by performing encoding and rate matching based on a reference slot structure, for example, a structure 500 regardless of the slot structure and unused OFDM symbols exist in the actual structure, the information mapped to this symbol may be punctured to form a slot structure.

In FIG. 5, five slot structures are described by way of example. The number of preceding symbols, the number of subsequent symbols, and combinations thereof that are not used for the control channel of the long transmission interval in the slot may be much various, and the above-mentioned technology may be applied to all the combinations.

Figure 6:
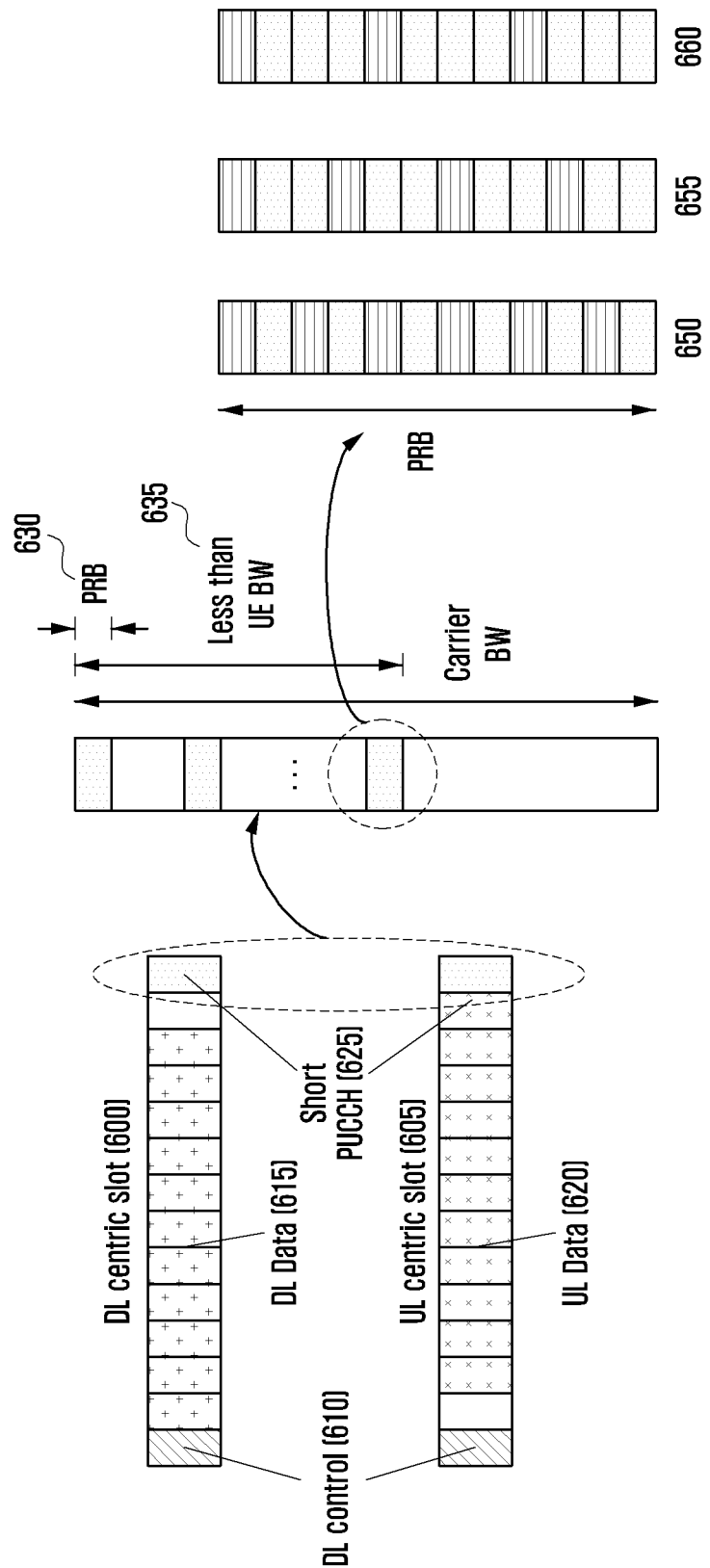
FIG. 6 is a diagram illustrating a control channel structure of a short transmission interval according to various embodiments of the present disclosure.

FIG. 6 illustrates a control channel structure of a short transmission interval according to various embodiments of the present disclosure. Reference numeral 600 has a form of a downlink centric slot and uses most of the resources of the slot for the downlink transmission. Reference numeral 605 has a form of an uplink centric slot and uses most of the resources of the slot for the uplink transmission. The control channel of the short transmission interval may be transmitted in both the downlink centric slot and the uplink centric slot and is generally transmitted in the last symbol of the slot or the OFDM symbol at the rear part. Of course, the control channel of the short transmission interval may be transmitted at an arbitrary position in the slot. The control channel of the short transmission interval may be transmitted using one OFDM symbol or a plurality of OFDM symbols. In FIG. 6, the control channel of the short transmission interval is transmitted in the last symbol 625 of the slot. The remaining portion of the slot may be used for a downlink control information transmission 610, a downlink data transmission 615, and an uplink data transmission 620.

Radio resources for the control channel of the short transmission interval are allocated in units of PRB 630 on the frequency side, the allocated PRBs may be allocated a plurality of contiguous PRBs, or a plurality of PRBs away from the frequency band may also be allocated. The allocated PRB should be included in a band equal to or smaller than the frequency band 635 supported by the terminal. In one PRB, the uplink control information and a demodulation reference signal have to be multiplexed in the frequency band. There are a method for transmitting a demodulation reference signal to one subcarrier per every two symbols like reference numeral 650, a method for transmitting a demodulation reference signal to one subcarrier per three symbols like reference numeral 655, a method for transmitting a demodulation reference signal to one subcarrier per every four symbols like reference 660, or the like. The present disclosure proposes the demodulation reference signal with an arbitrary period like reference numerals 650, 655, and 660.

The uplink control channel structure of the short transmission interval is described with reference to FIG. 6. It is described that the uplink control channel may be transmitted in both the downlink centric slot and the uplink centric slot. In the uplink centric slot, the uplink control channel of the short transmission interval is transmitted at the last part of the slot and the uplink data channel may be transmitted in front of the last part. The example is also illustrated in FIG. 7.

Figure 7:
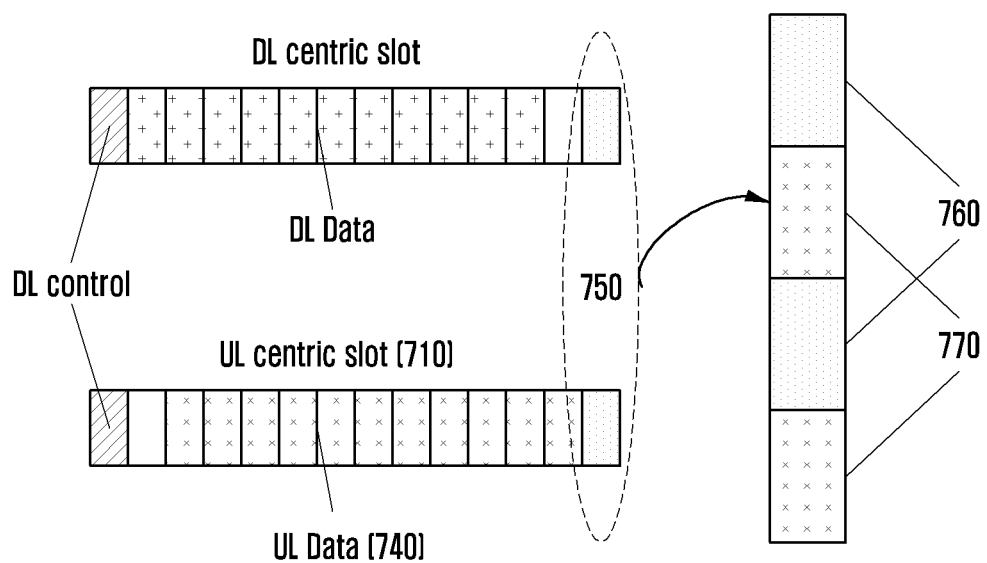
FIG. 7 is a diagram illustrating an uplink control channel structure of a short transmission interval according to various embodiments of the present disclosure.

FIG. 7 is a diagram illustrating an uplink control channel structure of a short transmission interval according to various embodiments of the present disclosure. Referring to FIG. 7, an uplink data channel 740 exists in an uplink centric slot 710, and an uplink control channel 750 of a short transmission interval exists. In this case, the uplink control channel of the short transmission interval may be transmitted while occupying the entire system bandwidth, but may be transmitted using only a part of the entire system bandwidth when there are not many control channels to be transmitted. At this time, for some PRBs in which the uplink control channel of the short transmission interval is not transmitted in the last OFDM symbol in which the uplink control channel of the short transmission interval is transmitted, it is possible to more effectively operate the radio resource by transmitting the uplink data channel rather than no transmitting anything.

In FIG. 7, the last symbol is allocated for the uplink control channel of the short transmission interval in the PRB 760 (or PRB set), and allocated for the uplink data channel transmission in the PRB 770 (or PRB set). Therefore, it is determined whether the terminal, which has been allocated the uplink data channel transmission, transmits the uplink data channel only in a data area 740, that is, a resource not including the last OFDM symbol or transmits the uplink data channel by including the last OFDM area 750 in the data area 740. The OFDM symbol length of the uplink data channel may be determined by the following method.

First, the downlink control information (DCI) for the allocation of the uplink data channel directly informs the OFDM symbol length in which the uplink data channel is transmitted. It is also possible to directly notify a specific OFDM symbol length, or to inform whether or not to transmit to an uplink control channel area of a short transmission interval with 1 bit (or small bit) information.

Second, all the terminals previously notify the radio resource for the uplink control channel of the short transmission interval, that is, some PRB information 760 in the last OFDM symbol. Various methods such as system information, RRC, MAC signaling, and dynamic signaling may be used as a notification method. Since the terminal knows in advance whether the uplink control channel of the short transmission interval in any of PRBs, if the frequency resource of the allocated uplink data channel overlaps with the uplink data channel PRB, the uplink data channel is transmitted using only the data channel area 740, whereas if the frequency resource of the uplink data channel does not overlap with the uplink data channel PRB, the uplink data channel is transmitted using all resources for the data channel area 740 and the uplink control channel 750 of the short transmission interval.

In this case, if only a part of the frequency resource allocated for the uplink data channel overlaps with the PRB for the uplink control channel of the short transmission interval, the method for transmitting the last symbol in the non-overlapping PRB and symbols before the last symbol in the overlapping PRB. In addition, if only a part of the frequency resource allocated for the uplink data channel overlaps with the PRB for the uplink control channel of the short transmission interval, the method for not transmitting the last OFDM symbol in all the allocated PRBs and transmitting the last OFDM symbol in the radio resource for the uplink data transmission 740 is possible.

Hereinafter, a method for transmitting a sounding reference signal (SRS) is proposed. It is described above that the uplink control channel of the short transmission interval may be transmitted in the last OFDM symbol of one slot. Hereinafter, a method for multiplexing an uplink control channel of a short transmission interval with an SRS will be described below with reference to FIG. 8.

Figure 8:
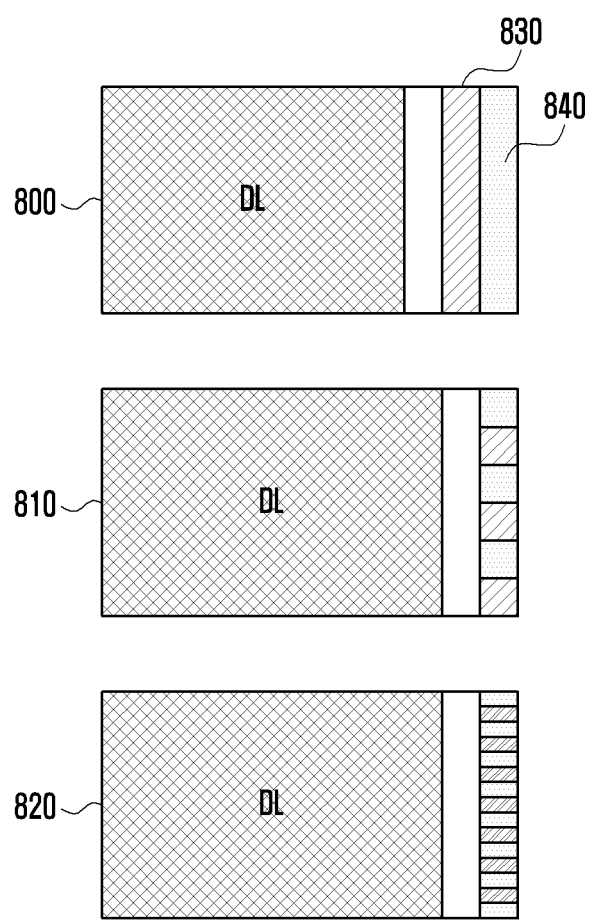
FIG. 8 is a diagram illustrating a method for multiplexing an uplink control channel a short transmission interval with a sounding reference signal (SRS) according to various embodiments of the present disclosure.

FIG. 8 is a diagram illustrating a method for multiplexing an uplink control channel a short transmission interval with a sounding reference signal (SRS) according to various embodiments of the present disclosure. In reference numeral 800, the SRS and the uplink control channel of the short transmission interval are temporally multiplexed. If the uplink control channel of the short transmission interval is transmitted in the OFDM symbol 830, the SRS is transmitted in the OFDM symbol 840. The transmission position of the uplink control channel in the short transmission interval is determined depending on whether the SRS is transmitted or not. The terminal may know whether the SRS exists in an arbitrary slot through the system information, the RRC, the DCI, or the like, thereby determining the transmission position of the UL control channel in the short transmission interval.

In reference numeral 810, the SRS and the uplink control channel of the short transmission interval are multiplexed on the frequency axis. It is described that the uplink control channel of the short transmission interval may be restrictively allocated to some band rather than the entire system band. Any of the plurality of PRBs are allocated to the uplink control channel of the short transmission interval, and the remaining PRBs are allocated to the SRS. Since the SRS needs to be transmitted in consideration of the entire PRB, the PRB allocated to the uplink control channel of the short transmission interval and the PRB allocated to the SRS may be alternately configured according to a slot number. That is, in an even-numbered slot, the uplink control channel of the short transmission interval is allocated to even-numbered PRBs and the SRS is allocated to odd-numbered PRBs, and to the contrary, the uplink control channel of the short transmission interval is allocated to the odd-numbered PRB and the SRS is allocated to the even-numbered PRBs, which is one example. The exemplified method is a method for transmitting an uplink control channel of a short transmission interval using resources remaining after resources capable of transmitting an SRS every two subcarriers or multiple subcarriers. The terminal determines whether to allocate the SRS resource using the system information, the RRC, the DCI, or the like, and determines the resource for the uplink control channel of the short transmission interval according to SRS resources. That is, in the slot in which the SRS exists, the UL control channel of the short transmission interval exists in the PRB while avoiding the SRS resource, whereas in the slot where no SRS exists, the UL control channel of the short transmission interval exists over the entire PRB.

Figure 9:
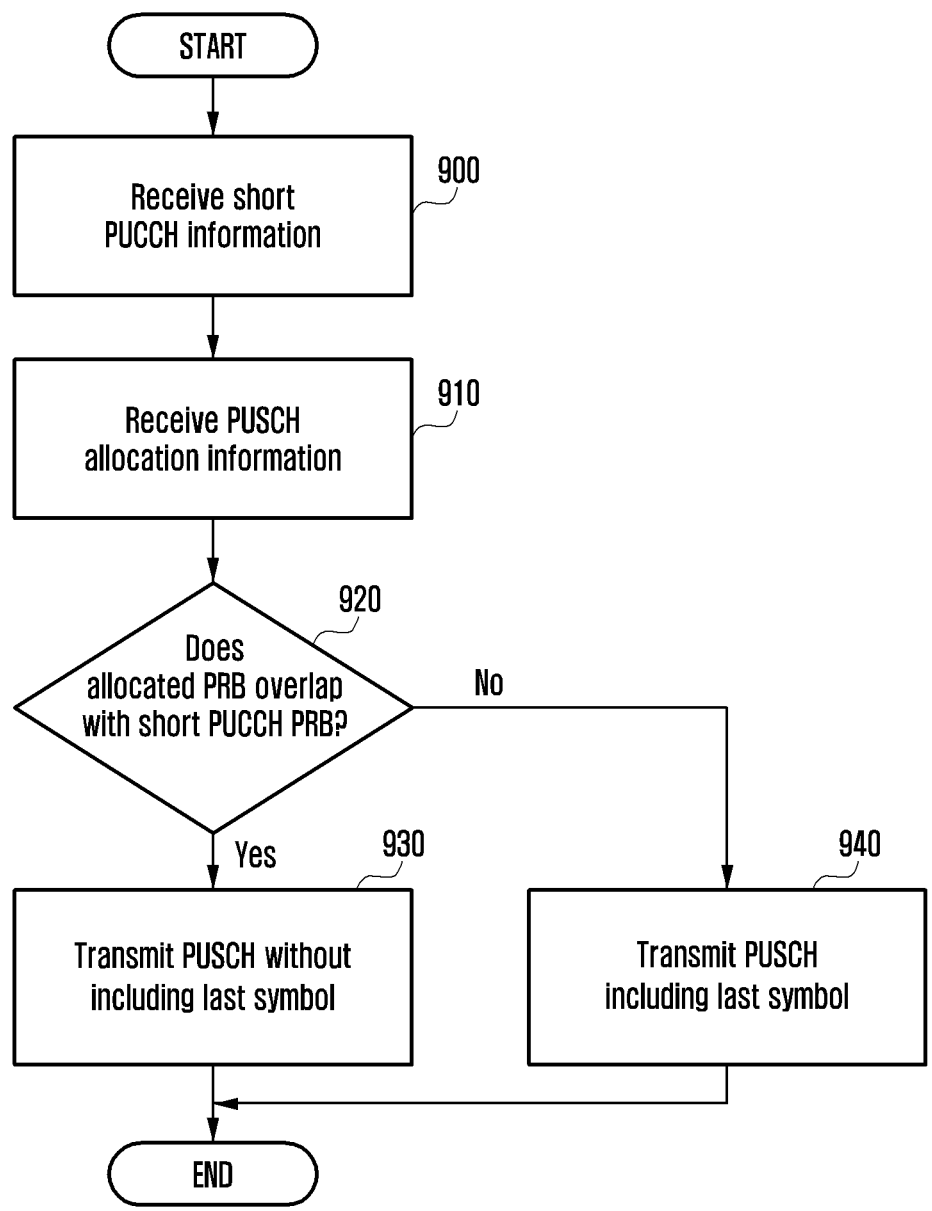
FIG. 9 is a diagram illustrating an operation of a terminal according to various embodiments of the present disclosure.

FIG. 9 is a diagram illustrating an operation of a terminal according to various embodiments of the present disclosure. In particular, FIG. 9 is a diagram illustrating a terminal operation of a second detailed disclosure among the methods for multiplexing an uplink control channel of a short transmission interval with an uplink data channel which is described with reference to FIG. 7. The terminal receives uplink control channel (short PUCCH) resource information of the short transmission interval in operation 900 and receives the uplink data channel (PUSCH) allocation information in operation 910. In operation 920, the terminal compares the PRB information included in the uplink data channel allocation information with the PRB to which the uplink control channel (short PUCCH) of the short transmission interval is allocated to confirm the overlapping. If overlapping, the uplink data channel without including the last symbol is transmitted in operation 930 and if not overlapping, the uplink data channel including the last symbol is transmitted in operation 940.

Figure 10:
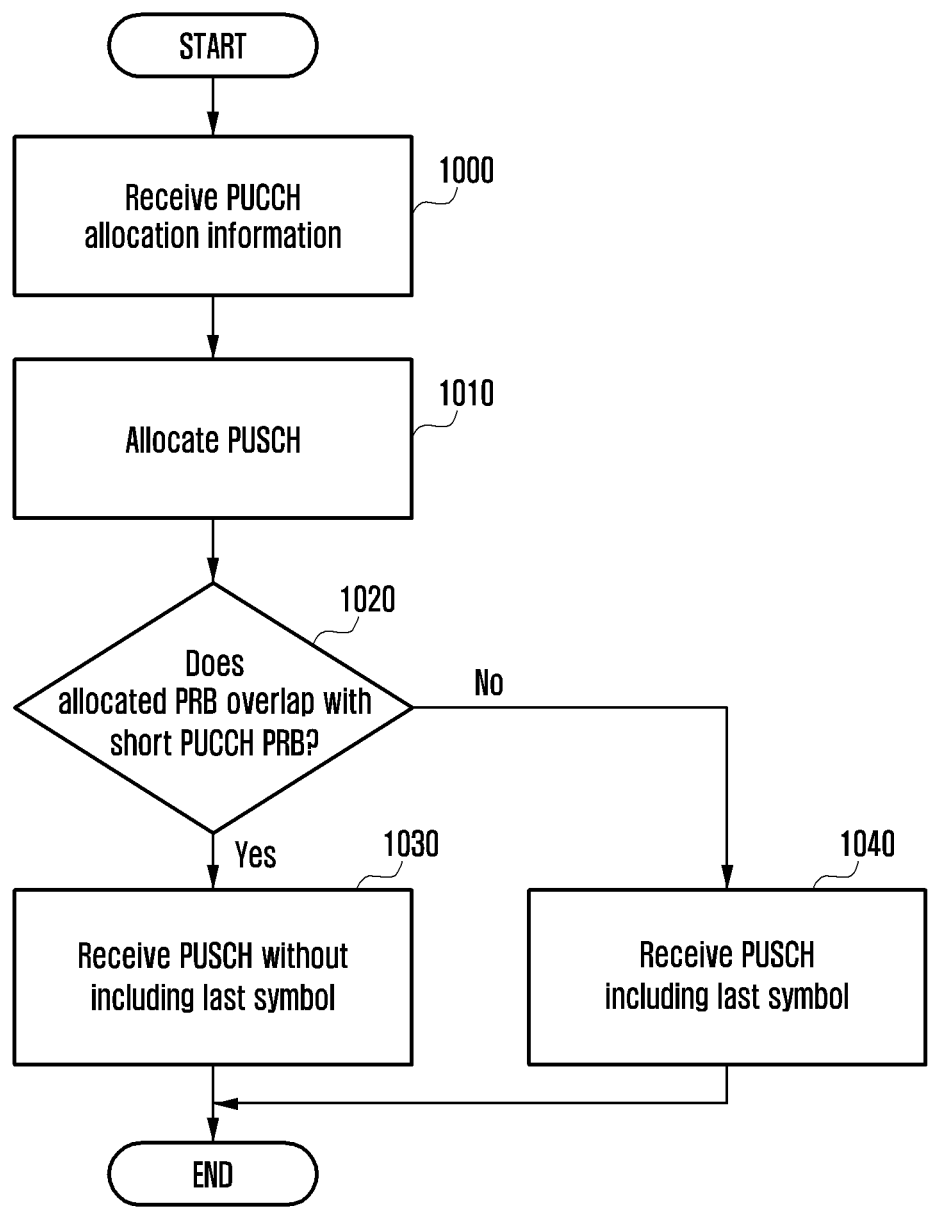
FIG. 10 is a diagram illustrating an operation of a base station according to various embodiments of the present disclosure.

FIG. 10 is a diagram illustrating an operation of a base station according to various embodiments of the present disclosure. In particular, FIG. 10 is a diagram illustrating an operation of a base station corresponding to the operation of FIG. 9. The base station determines the uplink control channel (short PUCCH) resource information of the short transmission interval and transmits the determined short PUCCH resource information, in operation 1000 and allocates a channel based on scheduling for an uplink data in operation 1010. In operation 1020, the base station compares the PRB information included in the uplink data channel (PUSCH) allocation information with the PRB to which the uplink control channel (short PUCCH) of the short transmission interval is allocated to confirm the overlapping. If overlapping, the uplink data channel without including the last symbol is transmitted in operation 1030 and if not overlapping, the uplink data channel including the last symbol is transmitted in operation 1040.

The operations of FIGS. 9 and 10 may be applied to the method represented by reference numeral 820 among the methods for multiplexing the SRS with the uplink control channel of the short transmission interval. That is, the terminal receives the SRS resource information in operation 900 and receives the uplink control channel information of the short transmission interval in operation 910. If it is determined in operation 920 that the SRS is transmitted in the time when the uplink control channel of the short transmission interval is transmitted, the terminal transmits the uplink control channel of the short transmission interval in the remaining resources except for the SRS resource in operation 930, and if it is determined that the SRS is not transmitted, the terminal transmits the uplink control channel of the short transmission interval in all the PRBs in operation 940.

The base station transmits the SRS resource information in operation 1000 and transmits the uplink control channel information in the short transmission interval in operation 1010. If it is determined in operation 1020 that the SRS is transmitted in the time when the uplink control channel of the short transmission interval is transmitted, the terminal receives the uplink control channel of the short transmission interval in the remaining resources except for the SRS resource in operation 1030, and if it is determined that the SRS is not transmitted, the terminal receives the uplink control channel of the short transmission interval in all the PRBs in operation 1040.

Figure 11:
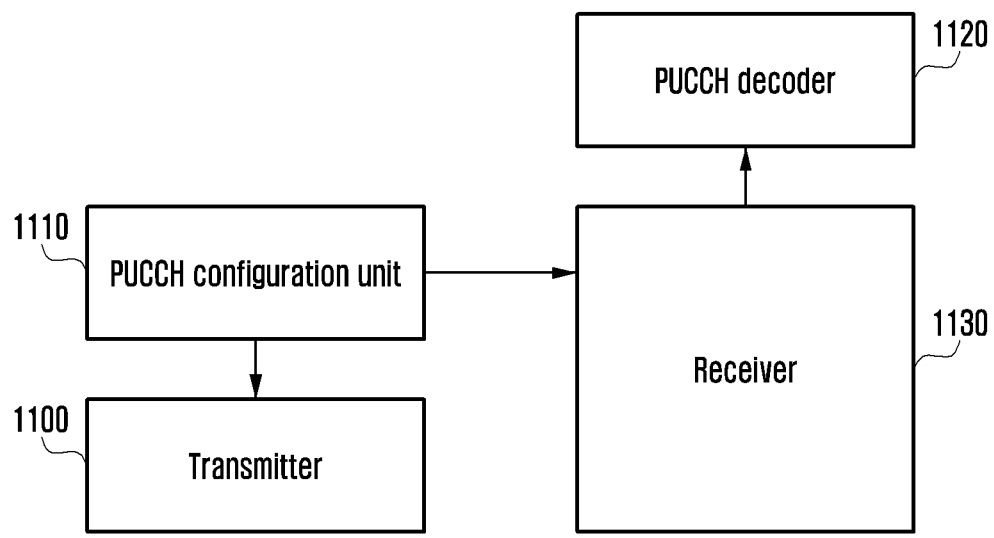
FIG. 11 is a diagram illustrating a base station apparatus according to various embodiments of the present disclosure.

FIG. 11 is a diagram illustrating a base station apparatus according to various embodiments of the present disclosure. The base station transmits the uplink control channel resource information or the SRS resource information of the short transmission interval to any terminal as DCI or RRC in reference numeral 1100. In addition, based on the resources configured in reference numeral 1110, the uplink channel transmitted from the terminal is received using a receiver 1130, and the uplink control signal is decoded in a decoder 1120.

Figure 12:
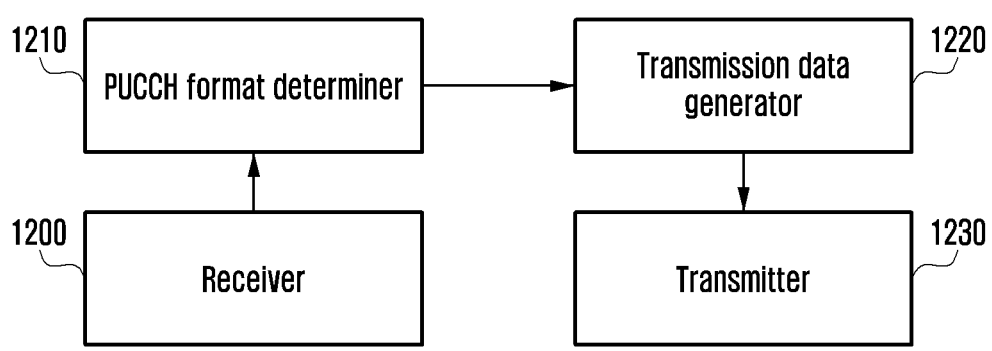
FIG. 12 is a diagram illustrating a terminal apparatus according to various embodiments the present disclosure.

FIG. 12 is a diagram illustrating a terminal apparatus according to various embodiments the present disclosure. The terminal receives configuration information from the base station in a receiver 1200 to determine the uplink control channel resource information or the SRS resource position of the transmission interval in reference numeral 1210, and a transmission data generator 1220 generates a proper uplink channel and a transmitter 1230 transmits the generated uplink channel.

Second Embodiment

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Further, in describing in detail embodiments of the present disclosure, an OFDM based wireless communication system, in particular, a 3GPP EUTRA standard will be described as a major target. However, a main subject of the present disclosure may be slightly changed to be applied to other communication systems having similar technical backgrounds and a channel type without greatly departing the scope of the present disclosure, which may be determined by those skilled in the art to which the present disclosure pertains.

On the other hand, studies on the coexistence of a new 5G communication (or NR communication in the present disclosure) and the related-art LTE communication in the same spectrum in a mobile communication system are underway.

The present disclosure relates to a wireless communication system, and more specifically, to a method and an apparatus for making different wireless communication systems coexist in one carrier frequency or a plurality of carrier frequencies and transmitting/receiving data between a terminal, which can transmit/receive data in at least one communication system among different communication systems, and each communication system.

Generally, mobile communication systems have been developed to provide a voice service while securing activity of a user. However, the mobile communication system gradually extends an area from a voice service to a data service. At present, the mobile communication system has been developed to provide a high-speed data service. However, since the current mobile communication systems that are providing services suffers from a resource shortage phenomenon and do not meet a user demand for higher-speed services, there is a need for a more developed mobile communication system.

To meet the requirement, standardizations for long term evolution (LTE) in the 3rd generation partnership project (3GPP) as one system that is being developed as next-generation mobile communication systems are in progress. The LTE is a technology of implementing fast packet based communication having a transmission rate of a maximum of 100 Mbps or so. For this purpose, several schemes have been discussed. For example, there are a scheme of reducing the number of nodes positioned on a communication path by simplifying, for example, network architecture, a scheme of approaching radio protocols to a radio channel to the extent possible, and so on.

If a decoding failure occurs upon initial transmission, the LTE system has adopted a hybrid automatic repeat reQuest (HARQ) scheme of retransmitting the corresponding data in a physical layer. When a receiver does not accurately decode data, the HARQ scheme enables the receiver to transmit information (negative acknowledgement (NACK)) notifying the decoding failure to a transmitter to thereby enable the transmitter to retransmit the corresponding data in the physical layer. The receiver combines the data retransmitted by the transmitter with the existing data that are not decoded, thereby increasing the receiving performance of the data. Further, if the receiver accurately decodes the data, information (acknowledgement (ACK)) notifying a decoding success is transmitted to the transmitter so that the transmitter may transmit new data.

Figure 13:
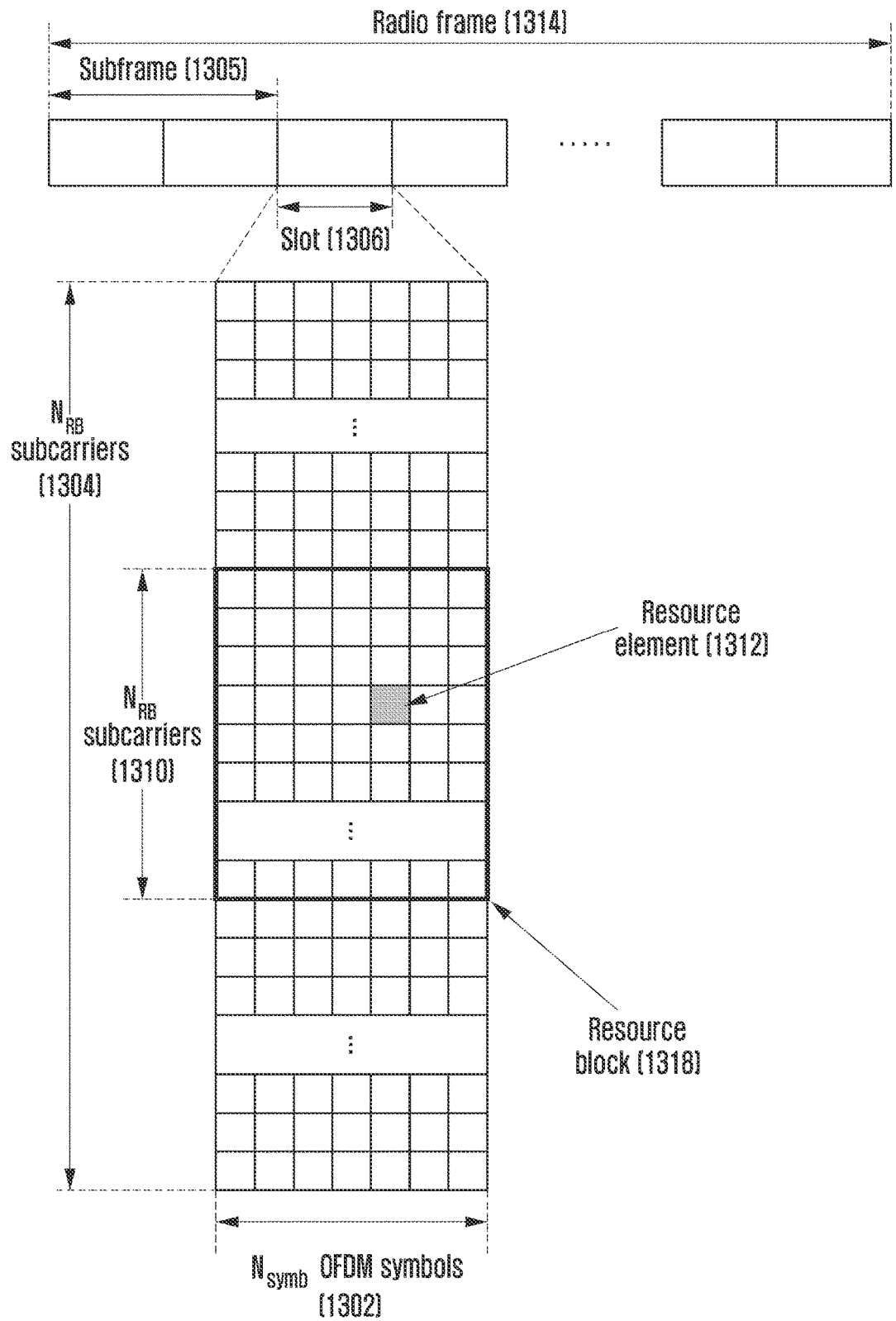
FIG. 13 is a diagram illustrating a basic structure of a time-frequency domain in the LTE according to various embodiments of the present disclosure.

FIG. 13 is a diagram illustrating a basic structure of a time-frequency domain in the LTE according to various embodiments of the present disclosure. In particular, FIG. 13 is a diagram illustrating a basic structure of a time-frequency domain that is a radio resource area in which data or a control channel is transmitted in a downlink, in the LTE system.

In FIG. 13, a horizontal axis represents a time domain and a vertical axis represents a frequency domain. A minimum transmission unit in the time domain is an OFDM symbol, in which one slot 1302 is configured by collecting $N_{symb}$ OFDM symbols 1306 and one subframe 1305 is configured by collecting two slots. The slot length is 0.5 ms and the subframe length is 1.0 ms. Further, a radio frame 1314 is a time domain unit consisting of 10 subframes. A minimum transmission unit in the frequency domain is a sub-carrier, in which the whole system transmission bandwidth consists of a total of $N_{BW}$ sub-carriers 1304.

A basic unit of resources in the time-frequency domain is a resource element (RE) 1312 and may be represented by an OFDM symbol index and a sub-carrier index. A resource block (RB) 1318 (or physical resource block (PRB)) is defined by the $N_{symb}$ continued OFDM symbols 1302 in the time domain and $N_{RB}$ continued sub-carriers 1310 in the frequency domain. Therefore, one RB 1318 consists of $N_{symb} \times N_{RB}$ REs 1312.

Generally, a minimum transmission unit of the data is the RB unit. In the LTE system, generally, $N_{symb}=7$ and $N_{RB}=12$ and $N_{BW}$ is proportional to the system transmission bandwidth. A data rate is increased in proportion to the number of RBs scheduled for the terminal. The LTE system is operated by defining six transmission bandwidths. In a frequency division duplex (FDD) system operated by dividing the downlink and the uplink based on a frequency, a downlink transmission bandwidth and an uplink transmission bandwidth may be different from each other. A channel bandwidth represents an RF bandwidth corresponding to the system transmission bandwidth. The following Table 1 illustrates a correspondence relationship between the system transmission bandwidth and the channel bandwidth that are defined in the LTE system. For example, the LTE system having the channel bandwidth of 10 MHz is configured of a transmission bandwidth including 50 RBs.

TABLE 1

| | Channel bandwidth BW$_{channel}$[MHz] | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

The downlink control information is transmitted within first N OFDM symbols within the subframe. Generally, N={1, 2, 3}. Therefore, the N value varies in each subframe depending on the amount of control information to be transmitted at the current subframe. The control information may include a control channel transmission section indicator representing over how many OFDM symbols the control information is transmitted, scheduling information on downlink data or uplink data, HARQ ACK/NACK signals, or the like.

In the LTE system, the scheduling information on the downlink data or the uplink data is transmitted from a base station to a terminal through downlink control information (DCI). The UL means a radio link through which the terminal transmits the data or the control signal to the base station and the DL means a radio link through which the base station transmits the data or the control signal to the terminal. The DCI is defined in various formats, and thus the DCI formats are defined depending on whether the DCI is the scheduling information (UL grant) on the uplink data and the scheduling information (DL grant) on the downlink data, whether the DCI is compact DCI having a small size of control information, whether to apply spatial multiplexing using a multiple antenna, whether the DCI is DCI for a power control, or the like and are operated.

For example, DCI format 1 that is the scheduling control information (DL grant) on the downlink data is configured to include at least following control information.

Resource allocation type 0/1 flag: It is informed whether a resource allocation scheme is type 0 or type 1. The type 0 applies a bitmap scheme to allocate a resource in a resource block group (RBG) unit. In the LTE system, a basic unit of the scheduling is the resource block (RB) represented by the time-frequency domain resource and the RBG is configured of a plurality of RBs and thus becomes the basic unit of the scheduling in the type 0 scheme. The type 1 allocates a specific RB within the RBG.

Resource block assignment: The RB allocated for the data transmission is informed. The represented resource is determined depending on the system bandwidth and the resource allocation scheme.

Modulation and coding scheme (MCS): The modulation scheme used for the data transmission and a size of a transport block that is the data to be transmitted are informed.

HARQ process number: An HARQ process number is informed.

New data indicator: An HARQ initial transmission or retransmission is informed.

Redundancy version: An HARQ redundancy version is informed.

Transmit power control (TPC) command for physical uplink control channel (PUCCH): A transmit power control command for the PUCCH that is an uplink control channel is informed.

The DCI is subjected to a channel coding and modulation process and then is transmitted through a physical downlink control channel (PDCCH) or an enhanced PDCCH (EPDCCH) that is the downlink physical control channel.

Generally, the DCI is independently channel-coded for each terminal and then is configured of independent PDCCH and is transmitted. In the time domain, the PDCCH is transmitted while being mapped during the control channel transmission section. A mapping position in the frequency domain of the PDCCH is determined by identifiers IDs of each terminal and is spread over the entire system transmission bandwidth.

The downlink data are transmitted through a physical downlink shared channel (PDSCH) that is a physical channel for downlink data transmission. The PDSCH is transmitted after the control channel transmission section and the DCI transmitted through the PDCCH informs the scheduling information on the detailed mapping position in the frequency domain, the modulation scheme, or the like.

By the MCS consisting of 5 bits among the control information configuring the DCI, the base station notifies the modulation scheme applied to the PDSCH to be transmitted to the terminal and a data size (transport block size (TBS)) to be transmitted. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (16 QAM), and 64QAM, in which each modulation order $Q_m$ corresponds to 2, 4, and 6. That is, in the case of the QPSK modulation, 2 bits per symbol may be transmitted, in the case of the 16QAM modulation, 4 bits per symbol may be transmitted, and in the case of the 64QAM modulation, 6 bits per symbol may be transmitted.

Compared to the LTE Release 8, the 3GPP LTE Release 10 has adopted the bandwidth extension technology to support a higher data transmission amount. The technology called the bandwidth extension or the carrier aggregation (CA) may increase the data transmission amount as much as the extended bandwidth, compared to the LTE Rel-8 terminal which extends a bandwidth and transmits data in one bandwidth. Each of the bandwidths is called a component carrier (CC) and the LTE Release 8 terminal is specified to have one component carrier for each of the downlink and the uplink. Further, an aggregation of the downlink component carrier and the uplink component carrier which have an SIB-2 link relation is called a cell. The SIB-2 connection relationship between the downlink configuration carrier and the uplink configuration carrier is transmitted as the system signal or the higher signal. The terminal supporting the CA may receive the downlink data and transmit the uplink data, through a plurality of serving cells.

In the Release 10, when the base station is hard to transmit the physical downlink control channel (PDCCH) to the specific terminal in the specific serving cell, the base station transmits the PDCCH in other serving cells and may configure a carrier indicator field (CIF) as a field notifying that the corresponding PDCCH indicates the physical downlink shared channel (PDSCH) or the physical uplink shared channel (PUSCH) in other serving cells. The CIF may be configured in the terminal supporting the CA. The CIF is determined to indicate other serving cells by adding 3 bits to the PDCCH information in the specific serving cell, and the CIF is included only when cross carrier scheduling is performed and when the CIF is not included, the cross carrier scheduling is not performed. When the CIF is included in the downlink assignment (DL allocation) information, the CIF indicates the serving cell to which the PDSCH scheduled by the DL allocation is transmitted and when the CIF is included in the uplink resource allocation information (UL grant), the CIF is defined to indicate the serving cell to which the PUSCH scheduled by the UL grant is transmitted.

As described above, in the LTE Release 10, the carrier aggregation (CA) that is the bandwidth extension technology is defined and thus the plurality of serving cells may be configured in the terminal. The terminal periodically or aperiodically transmits the channel information on the plurality of serving cells to the base station for data scheduling of the base station. The base station schedules data for each carrier and transmits the data, and the terminal transmits A/N feedback on the data transmitted for each carrier. The Release 10 is designed to transmit the A/N feedback of up to 21 bits, and if the transmission of the A/N feedback and the channel information overlap in one subframe, the Release 10 is designed so that the A/N feedback is transmitted and the channel information is discarded. The LTE Release 11 is designed so that the A/N feedback of up to 22 bits and the channel information of one cell are transmitted to PUCCH format 3 in a transmission resource of PUCCH format 3 by multiplexing the channel information of one cell together with the A/N feedback.

In the LTE Release 13, it is assumed that the number of serving cell setting scenarios is a maximum of 32 and a concept of extending the number of serving cells up to 32 using a bandwidth in an unlicensed band as well as a licensed has been introduced. In addition, considering that the number of licensed bands such as an LTE frequency is limited, the LTE services in unlicensed bands such as a 5 GHz band have been introduced, which is called a licensed assisted access (LAA). The LAA applies the carrier aggregation technology in LTE to support the LTE cell which is the licensed band to be operated as a P cell and the LAA cell which is the unlicensed band to be operated as an S cell. Therefore, the feedback generated from the LAA cell which is the S cell as in the LTE system should be transmitted only in the P cell, and the downlink subframe and the uplink subframe may be freely applied to the LAA cell. Unless otherwise stated herein, the LTE refers to all evolved technologies of LTE such as the LTE-A and the LAA.

On the other hand, as a communication system since the LTE, that is, a fifth generation wireless cellular communication system (hereinafter referred to as 5G or NR in the present specification) should freely reflect various requirements of a user, a service provider, or the like, services that meet various requirements may be supported.

Therefore, in the 5G communication system, an increased mobile broadband communication (hereinafter referred to an enhanced mobile broadband (eMBB) in the present specification), a massive machine type communication (hereinafter referred to as mMTC in the present specification), an ultra reliable and low latency communications (hereinafter, referred to as URLLC in the present specification) may be defined as technologies to meet requirements selected for the respective 5G services, among requirements such as a terminal maximum transmission speed of 20 Gbps, a terminal maximum speed of 500 km/h, a maximum delay time of 0.5 ms, and a terminal connection density of 1,000,000 terminal/km2.

For example, in order to provide the eMBB in the 5G system, it is required to provide the maximum terminal transmission rate of 20 Gbps in the downlink and the maximum terminal transmission rate of 10 Gbps in the uplink from the viewpoint of one base station. At the same time, an average transmission speed that the terminal can actually sense should also be increased. In order to satisfy such the requirement, improvement in transmission/reception technologies including a further improved multi input multi output (MIMO) transmission technology is demanded.

At the same time, the mMTC is being considered to support application services such as Internet of Thing (IoT) in the 5G system. The mMTC is required for an access support of a large-scale terminal in a cell, coverage enhancement of a terminal, improved battery time, and cost reduction of a terminal in order to efficiently provide the Internet of things. The Internet of things needs to be able to support a large number of terminals (e.g., 1,000,000 terminals/km2) in a cell because it is attached to various sensors and various devices to provide communication functions. In addition, the mMTC requires coverage wider than coverage provided from the eMBB because it is highly likely to be positioned in a shadow area such as area where the terminal may not cover a basement of building or cell due to the characteristics of the services. The mMTC is highly likely to be configured as a cheap terminal and requires a very long battery life time because it is difficult to frequently replace a battery of the terminal frequently.

Finally, the URLLC is cellular-based wireless communication used for a specific purpose and needs to provide communication providing ultra low latency and ultra reliability as a service used for remote control for robots or machinery, industrial automation, unmanned aerial vehicle, remote health control, emergency notification, or the like. For example, the URLLC has a requirement to satisfy a maximum delay time of less than 0.5 ms and at the same time to provide a packet error rate of 10-5 or less. Therefore, it is necessary to provide a transmission time interval (TTI) smaller than that of the 5G service such as the eMBB for the URLLC, and at the same time, there is a need for a design specification to allocate a wide resource in the frequency band.

The services considered in the above-mentioned fifth generation wireless cellular communication system should be provided as one framework. That is, for efficient resource management and control, it is preferable that each service is integrated into one system and controlled and transmitted rather than being operated independently.

Figure 14:
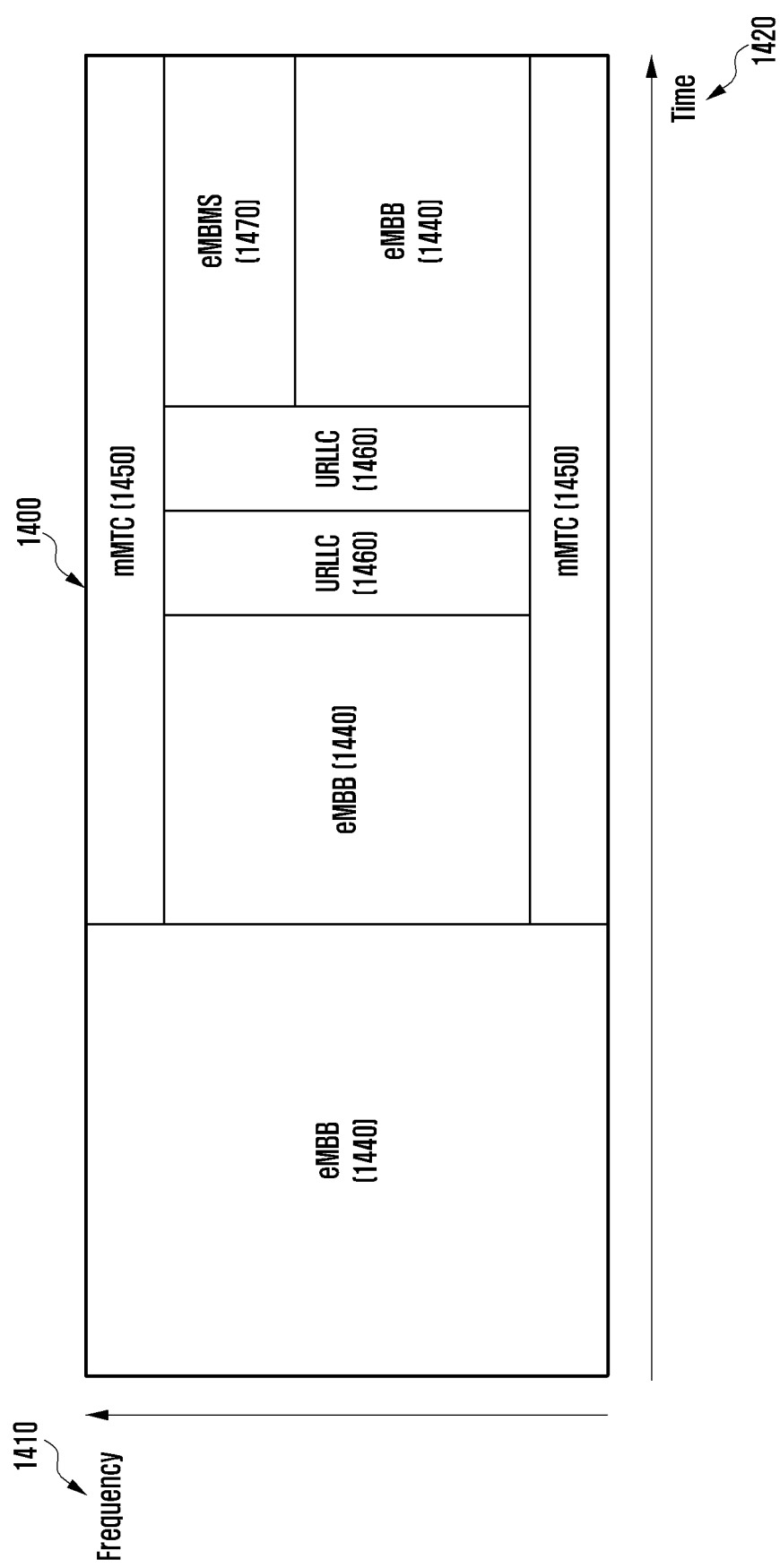
FIG. 14 is a diagram illustrating an example in which 5G services are multiplexed and transmitted in one system according to various embodiments of the present disclosure.

FIG. 14 is a diagram illustrating an example in which 5G services are multiplexed and transmitted in one system according to various embodiments of the present disclosure. In FIG. 14, services to be considered in the 5G system are transmitted to one system.

In FIG. 14, a frequency-time resource 1400 used by the 5G system may include a frequency axis 1410 and a time axis 1420. FIG. 14 illustrates that the 5G system operates an eMBB 1440, an mMTC 1450, and an URLLC 1460 within one framework. In addition, as a service that may be additionally considered in the 5G system, an enhanced Mobile Broadcast/Multicast Service (eMBMS) 1470 for providing a broadcasting service on a cellular basis may be considered. Services considered in the 5G system such as the eMBB 1440, the mMTC 1450, the URLLC 1460 and the eMBMS 1470 may be transmitted by being multiplexed by time-division multiplexing (TDM) or frequency division multiplexing (FDM) within one system frequency bandwidth operated in the 5G system. In addition, spatial division multiplexing may also be considered.

It is preferable that the eMBB 1440 is transmitted by occupying the maximum frequency bandwidth at a specific time in order to provide the above-mentioned increased data transmission rate. Accordingly, it is preferable that the eMBB 1440 service is transmitted in by being TDMed with other services within the system transmission bandwidth 1400, but it is also preferable that the eMBB 1440 service is transmitted by being FDMed with other services within the system transmission bandwidth according to the needs of other services.

In the case of mMTC 1450, unlike other services, an increased transmission interval is required to secure wide coverage, and coverage may be ensured by repeatedly transmitting the same packet within the transmission interval. At the same time, in order to reduce the complexity of the terminal and the terminal price, the transmission bandwidth that the terminal can receive is limited. Considering the requirements, the mMTC 1450 is preferably transmitted by being FDMed with other services within the transmission system bandwidth 1400 of the 5G system.

The URLLC 1460 preferably has a short transmission time interval (TTI) when compared to other services to satisfy the ultra latency requirement required by the service. At the same time, since the URLLC should have a low coding rate in order to satisfy the ultra reliability requirement, it is preferable to have a wide bandwidth on the frequency side. Considering the requirements of the URLLC, the URLLC 1460 is preferably transmitted by being TDMed with other services within the transmission system bandwidth 1400 of the 5G system.

Each of the services described above may have different transmission/reception techniques and transmission/reception parameters to satisfy the requirements of each service. For example, each service may have different numerologies depending on each service requirement. Here, numerology refers to a cyclic prefix (CP) length, a subcarrier spacing, an OFDM symbol length, the transmission time interval, or the like in a communication system based on OFDM or orthogonal frequency division multiple access (OFDMA).

As an example having different numerologies between the above services, the eMBMS 1470 may have a longer CP length than other services. Since the eMBMS transmits broadcast-based upper traffic, the same data may be transmitted in all cells. At this time, if signals received from a plurality of cells arrive within the CP length, the terminal can receive and decode all of the signals, thereby obtaining a single frequency network (SFN) gain. Therefore, a terminal positioned at a cell boundary has an advantage of receiving broadcasting information without a restriction of coverage. However, since the waste due to CP overhead occurs when the CP length is relatively longer than other services in supporting the eMBMS in the 5G system, the OFDM symbol length longer than other services is required, and at the same time, the subcarrier spacing narrower than other services is required.

In addition, as an example where different numerologies are used between services in the 5G system, the URLLC may require a shorter OFDM symbol length as the TTI smaller than that of other services is required, and at the same time larger subcarrier spacing may be required.

On the other hand, unlike the current LTE system which is mainly used in a frequency band of 2 GHz band, the 5G system uses a frequency of 20 MHz or more in a frequency band of 6 GHz or less (hereinafter, referred to as sub-6 GHz in this specification) or a frequency band of 6 GHz or more (hereinafter, referred to as over-6 GHz in this specification), thereby satisfying a data transmission rate required in the 5G. Therefore, supporting the coexistence of the LTE with the 5G in one LTE carrier or multiple LTE carriers in sub-6 GHz needs to be considered. Accordingly, the technology of supporting the coexistence of the LTE with the 5G is expected to be an important technology for early commercialization of the 5G without introducing additional carriers for the 5G. As a result, there is a need for a method for coexistence of LTE with 5G in at least one LTE carrier.

Hereinafter, exemplary embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

Further, in describing in detail embodiments of the present disclosure, the LTE and the 5G system will be described as a major target. However, a main subject of the present disclosure may be slightly changed to be applied to other communication systems having similar technical backgrounds and a channel type without greatly departing the scope of the present disclosure, which may be determined by those skilled in the art to which the present disclosure pertains.

A coexistence system in which the LTE cell and the 5G cell coexist and are coupled in the dual connectivity or carrier aggregation, or a coexistence system in which the LTE cell and the 5G cell operate in a stand-alone manner will be described below.

FIGS. 15, 16A, 16B, 17, 18A, 18B, 19, and 20 are diagrams illustrating a 2-1-th embodiment, a 2-2-th embodiment and a 2-3-th embodiment of a communication system to which the present disclosure is applied. The above drawings illustrate a form in which the LTE system and the 5G system, which are two different systems, coexist. The schemes suggested by the present disclosure can be applied to the systems of FIGS. 15, 16A, and 16B, the system of FIGS. 17, 18A, and 18B, and FIGS. 19, 20A, and 20B.

2-1-th Embodiment

Figure 15:
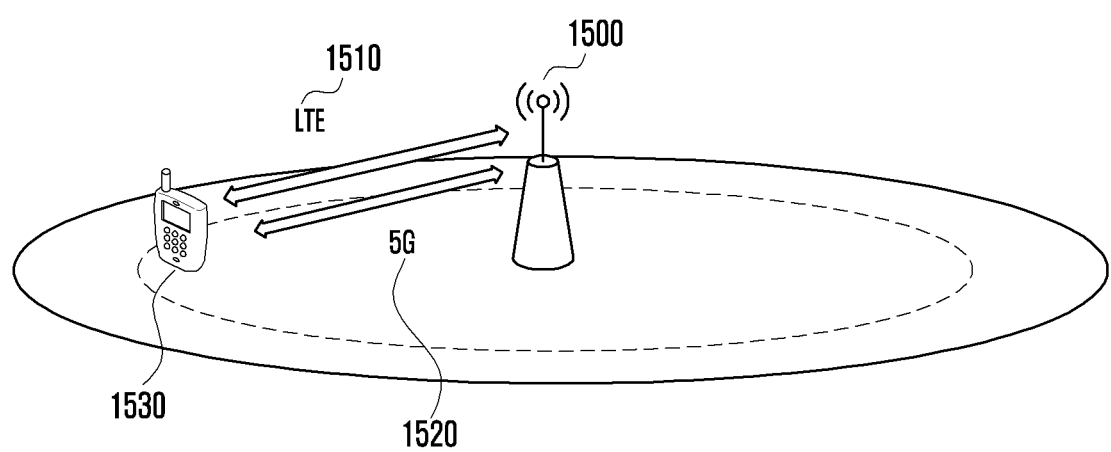
FIGS. 15, 16A, and 16B are diagrams illustrating a 2-1-th embodiment of a communication system according to various embodiments of the present disclosure.
Figure 16A:
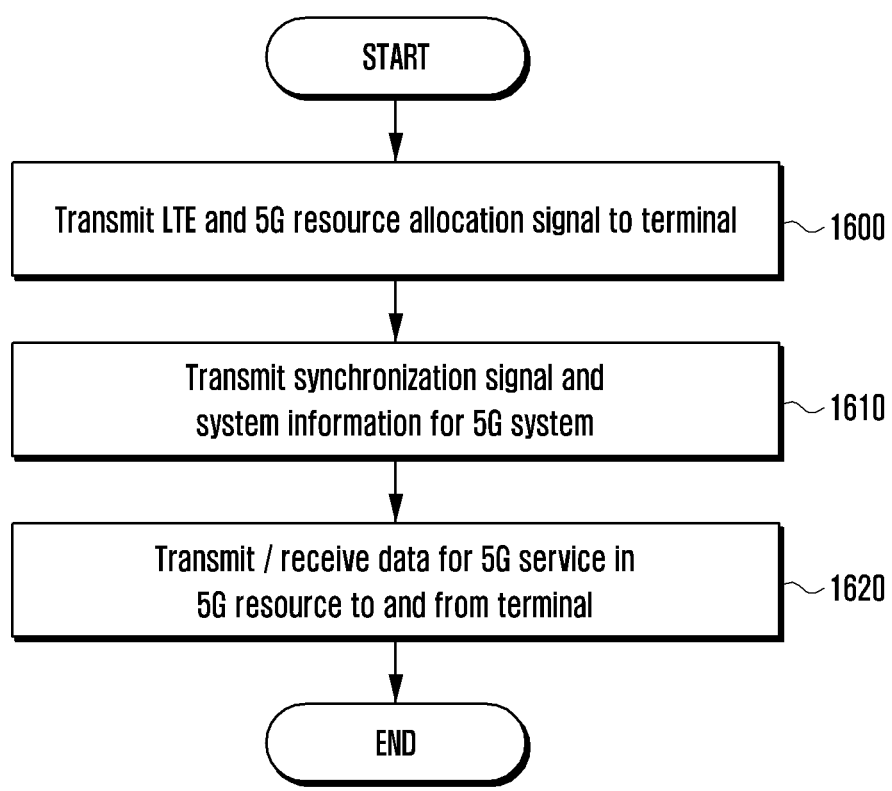
Figure 16B:
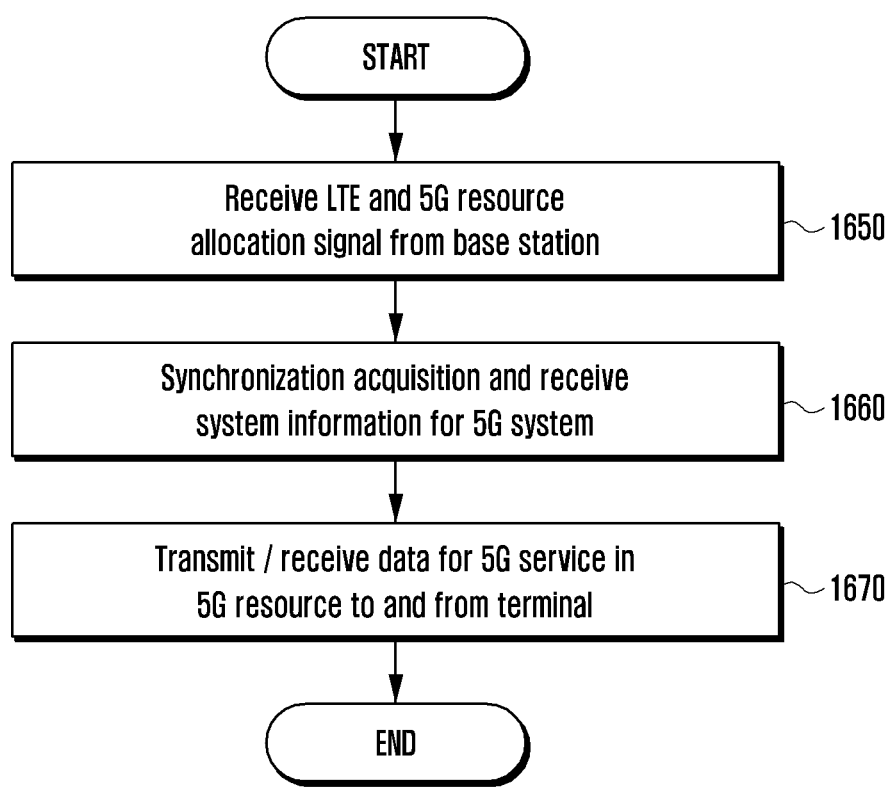

FIGS. 15, 16A, and 16B are diagrams illustrating a 2-1-th embodiment of a communication system according to various embodiments of the present disclosure. Referring to FIG. 15, FIG. 15 illustrates a 2-1-th embodiment in which an LTE cell 1510 and a 5G cell 1520 coexist in one base station 1500 in the network. The terminal 1530 may be an LTE capable terminal having an LTE transmission/reception module, a 5G capable terminal having a 5G transmission/reception module, or a terminal having both of an LTE transmission/reception module and a 5G transmission/reception module.

The terminal 1530 acquires synchronization through a synchronization signal transmitted from the LTE cell 1510 or the 5G cell 1520 and transmits/receives data to/from a base station 1500 through the LTE cell 1510 or the 5G cell 1520. In this case, there are no restrictions on a duplex scheme for the LTE cell 1510 or the 5G cell 1520. The uplink control transmission is transmitted through the LTE cell 1510 when the LTE cell is a P cell and through the 5G cell 1520 when the 5G cell is a P cell. In the system of FIG. 15, the LTE cell and the 5G cell may include a plurality of serving cells and may support a total of 32 serving cells.

It is assumed that the base station 1500 includes both the LTE transmission/reception module (system) and the 5G transmission/reception module (system), and the base station 1500 may manage and operate the LTE system and the 5G system in real time. For example, if the LTE system and the 5G system are operated at different times by dividing resources on time, it is possible to dynamically select the allocation of the time resources of the LTE system and the 5G system. The terminal 1530 receives a signal indicating allocation of resources (time resources, frequency resources, antenna resources, spatial resources, etc.) which are divided and managed by the LTE cell and the 5G cell, from the LTE cell 1510 or the 5G cell 1520, so it is possible to know through which resources the data reception from the LTE cell 1510 and the 5G cell 1520 are made.

FIG. 16A is a diagram illustrating a procedure of configuring, by the base station 1500, a 5G resource and transmitting/receiving data to and from the 5G capable terminal 1530 and the resources for the 5G, according to the 2-1-th embodiment.

In operation 1600, the base station 1500 transmits an LTE or 5G resource allocation signal to the 5G capable terminal 1530. The signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1500.

In operation 1610, the base station 1500 transmits the synchronization signal and the system information for the 5G system to the 5G capable terminal 1530. A separate synchronization signal may be transmitted for the eMBB, mMTC, URLLC using different numerologies as the synchronization signal for the 5G, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 1620, the base station 1500 transmits/receives data for the 5G service from the 5G resource to the 5G capable terminal 1530.

FIG. 16B illustrates a procedure of receiving, by the 5G capable terminal 1530, from the base station 1500 and transmitting/receiving data to and from the 5G resource according to the 2-1-th embodiment.

FIG. 16B illustrates the procedure of transmitting/receiving data to and from the terminal according to the 2-1-th embodiment. In operation 1650, the 5G capable terminal 1530 receives the LTE or 5G resource allocation signal from the base station 1500. The signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1500.

In operation 1660, the 5G capable terminal 1530 acquires synchronization from the synchronization signal for the 5G system transmitted by the base station 1500, and receives the system information transmitted by the base station 1500. The synchronization signal for the 5G system may be a separate synchronization signal for the eMBB, mMTC, URLLC using different numerologies or a common synchronization signal transmitted to a specific 5G resource using one numerology. With the above system information, the common system signal may be received by a specific 5G resource using one numerology, or separate system information may be received for eMBB, mMTC, and URLLC using different numerologies.

In operation 1670, the 5G capable terminal 1530 transmits/receives data for the 5G service from the 5G resource to the base station 1500.

2-2-th Embodiment

Figure 17:
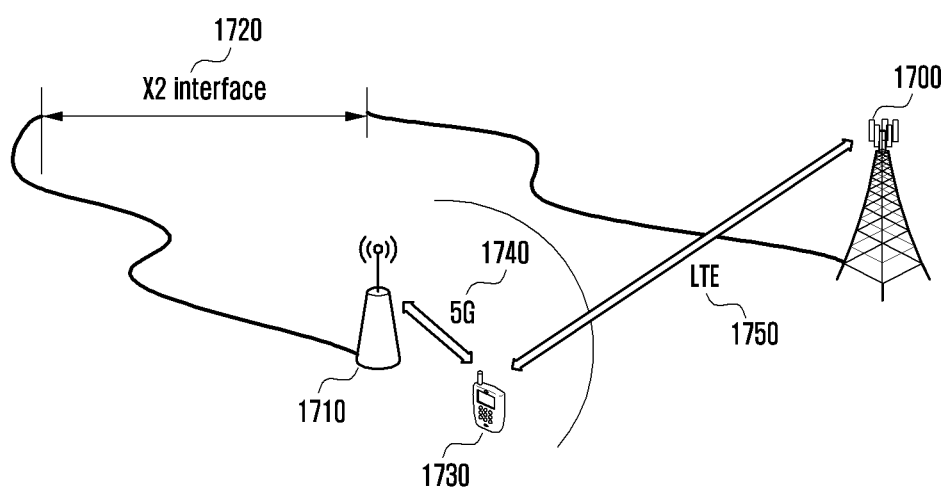
FIGS. 17, 18A, and 18B are diagrams illustrating a 2-2-th embodiment of a communication system according to various embodiments of the present disclosure.
Figure 18A:
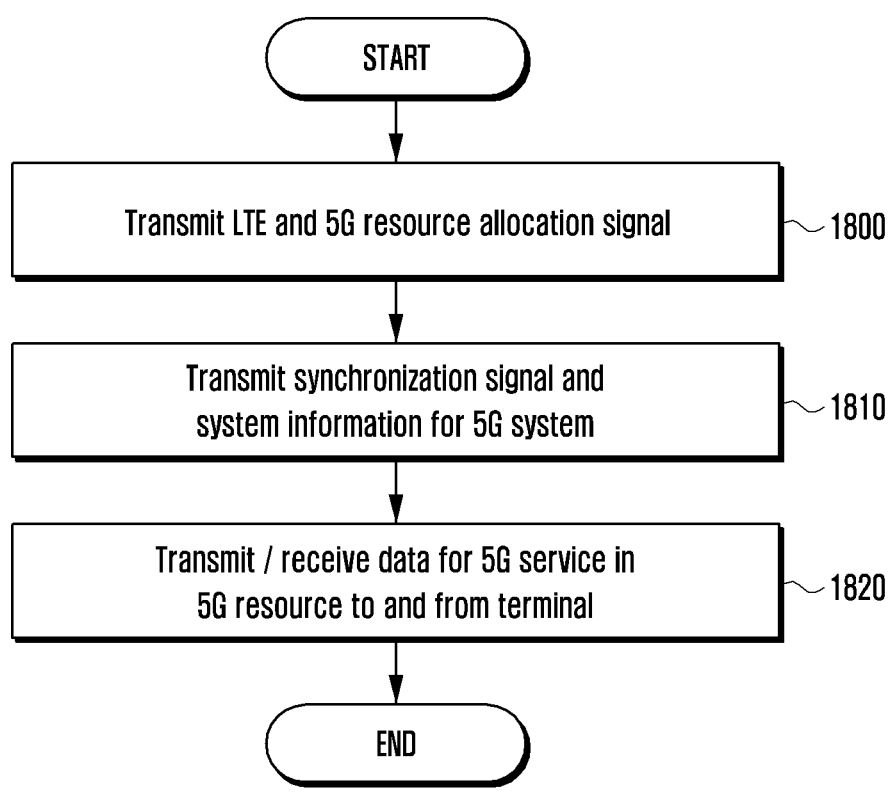
Figure 18B:
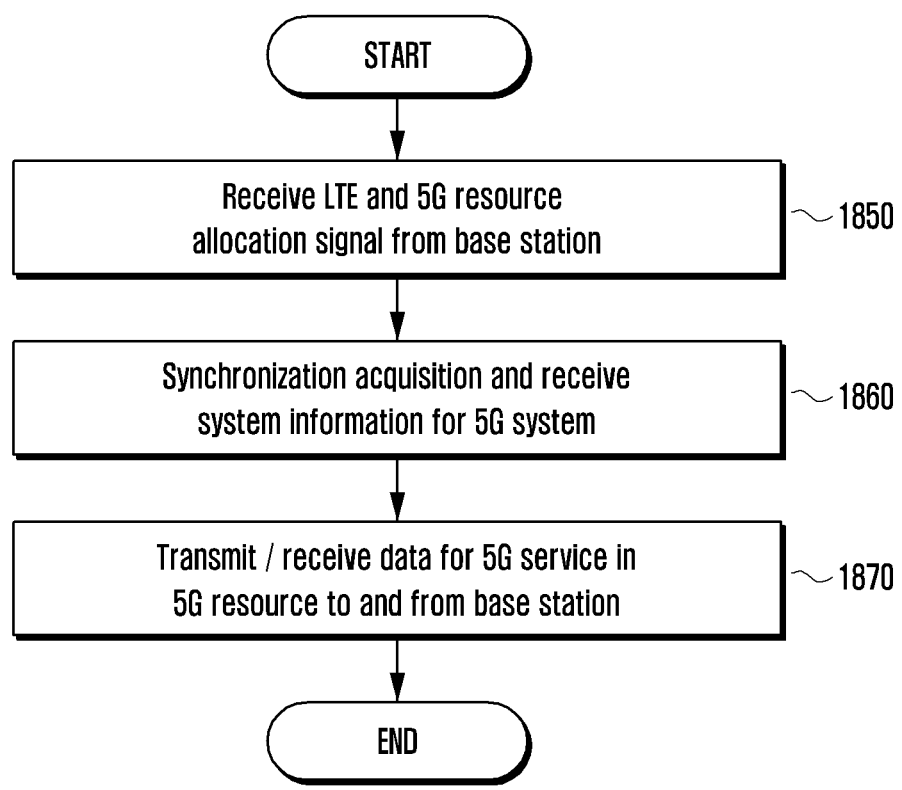

FIGS. 17, 18A, and 18B are diagrams illustrating a 2-2-th embodiment of a communication system according to various embodiments of the present disclosure. Referring to FIG. 17, FIG. 17 illustrates a 2-2-th embodiment which is a case in which an LTE base station 1700 for wide coverage in the network and a 5G small base station 1710 for increasing data transmission amount are installed. The terminal 1730 may be an LTE capable terminal having an LTE transmission/reception module, a 5G capable terminal having a 5G transmission/reception module, or a terminal having both of an LTE transmission/reception module and a 5G transmission/reception module.

The terminal 1730 acquires synchronization through the synchronization signal transmitted from the LTE base station 1700 or the 5G base station 1710 and transmits/receives data through the LTE base station 1700 and the LTE base station 1710 after receiving the system information. In this case, there are no restrictions on a duplex scheme for the LTE base station 1700 or the 5G small base station 1710. The uplink control transmission is transmitted through the LTE cell 1750 when the LTE cell is a P cell and through the 5G cell 1740 when the 5G cell is a P cell.

In this case, it is assumed that the LTE base station 1700 and the 5G base station 5 have an ideal backhaul network. Therefore, when the ideal backhaul network 1720 is provided, X2 communication 1720 may be made between fast base stations and therefore even though the uplink transmission is transmitted only to the LTE base station 1700, the 5G base station 1720 may receive in real time the related control information from the LTE base station 5 through the X2 communication 1710. In the system of FIG. 17, the LTE cell and the 5G cell may include a plurality of serving cells and may support a total of 32 serving cells.

The base station 1700 or 1710 can manage the LTE system and the 5G system in real time. For example, when the base station 1700 divides resources on time and operates the LTE system and the 5G system at different times, it is possible to dynamically select the allocation of time resources of the LTE system and the 5G system and transmit the signal to another base station 1710 by the X2 communication. The terminal 1730 receives a signal indicating allocation of resources (time resources, frequency resources, antenna resources, spatial resources, etc.) which are divided and managed by the LTE cell and the 5G cell, from the LTE base station 1700 or the 5G base station 1710, so it is possible to know through which resources the data transmission/reception from the LTE cell 1750 and the 5G cell 1740 are made.

On the other hand, when the LTE base station 1700 and the 5G base station 1710 have a non-ideal backhaul network 1720, the X2 communication cannot be made between fast base stations. Therefore, the base station 1700 or 1710 can semi-statically operate the LTE system and the 5G system. For example, when the base station 1700 divides resources on time and operates the LTE system and the 5G system at different times, it selects the allocation of time resources of the LTE system and the 5G system and transmits the signal to another base station 1710 by the X2 communication, thereby distinguishing the resources of the LTE system and the 5G system. The terminal 1730 receives a signal indicating allocation of resources (time resources, frequency resources, antenna resources, spatial resources, etc.) which are divided and managed by the LTE cell and the 5G cell, from the LTE base station 1700 or the 5G base station 1710, so it is possible to know through which resources the data transmission/reception from the LTE cell 1750 and the 5G cell 1740 are made.

FIG. 18A is a diagram illustrating a procedure of configuring, by the base station 1700 or 1710, a 5G resource and transmitting/receiving data to and from the 5G capable terminal 1730 and the resources for the 5G system, according to the 2-2-th embodiment.

In operation 1800, the base station 1700 transmits the LTE or 5G resource allocation signal to the 5G base station 1710 by X2 1720 and transmits the LTE or 5G resource allocation signal to the terminal. When the LTE system and the 5G system are operated at different resources by dividing resources, it is possible to distinguish the resources of the LTE system and the 5G system by selecting the allocation of the time resource of the LTE system and the 5G system and transmitting the allocation information to another base station 1710 by the X2.

When the LTE or 5G resource allocation signal is transmitted to the 5G capable terminal 1730, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1700.

In operation 1810, the base station 1700 or 1710 transmits the synchronization signal and the system information for the 5G system to the 5G capable terminal 1730. A separate synchronization signal may be transmitted for the eMBB, mMTC, URLLC using different numerologies as the synchronization signal for the 5G system, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 1820, the base station 1710 transmits/receives data for the 5G service from the 5G resource to the 5G capable terminal 1730.

FIG. 18B illustrates a procedure of receiving, by the 5G capable terminal 1730, from the base station 1700 or 1710 and transmitting/receiving data to and from the 5G resource according to the 2-2-th embodiment.

In operation 1850, the 5G capable terminal 1730 receives the LTE or 5G resource allocation signal from the base station 1700 or 1710. The signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1700.

In operation 1860, the 5G capable terminal 1730 acquires synchronization from the synchronization signal for the 5G system transmitted by the base station 1700 or 1710, and receives the system information transmitted by the base station 1700 or 1710. The synchronization signal for the 5G may be a separate synchronization signal for the eMBB, mMTC, URLLC using different numerologies or a common synchronization signal transmitted to a specific 5G resource using one numerology. With the above system information, the common system signal may be received by a specific 5G resource using one numerology, or separate system information may be received for eMBB, mMTC, and URLLC using different numerologies.

In operation 1870, the 5G capable terminal 1730 transmits/receives data for the 5G service from the 5G resource to the base station 1710.

2-3-th Embodiment

Figure 19:
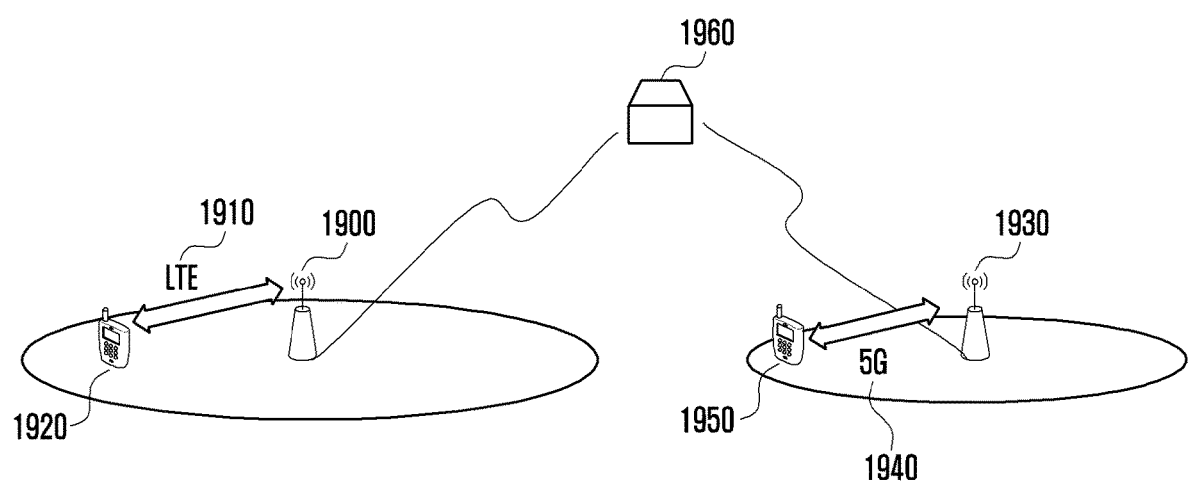
FIGS. 19, 20A, and 20B are diagrams illustrating a 2-3-th embodiment of a communication system according to various embodiments of the present disclosure.
Figure 20A:
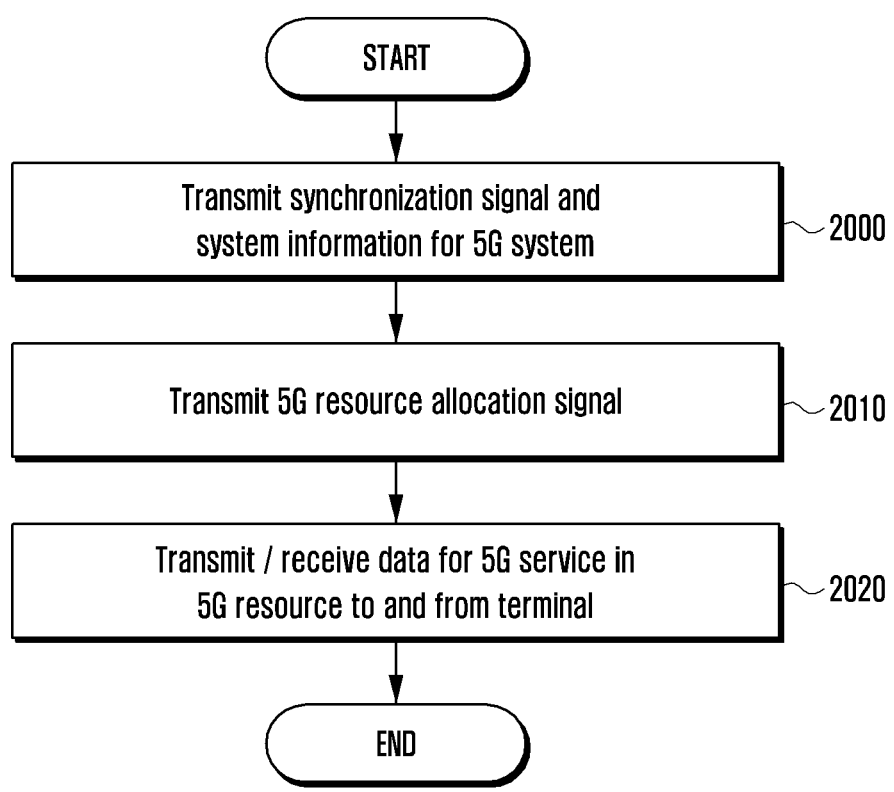
Figure 20B:
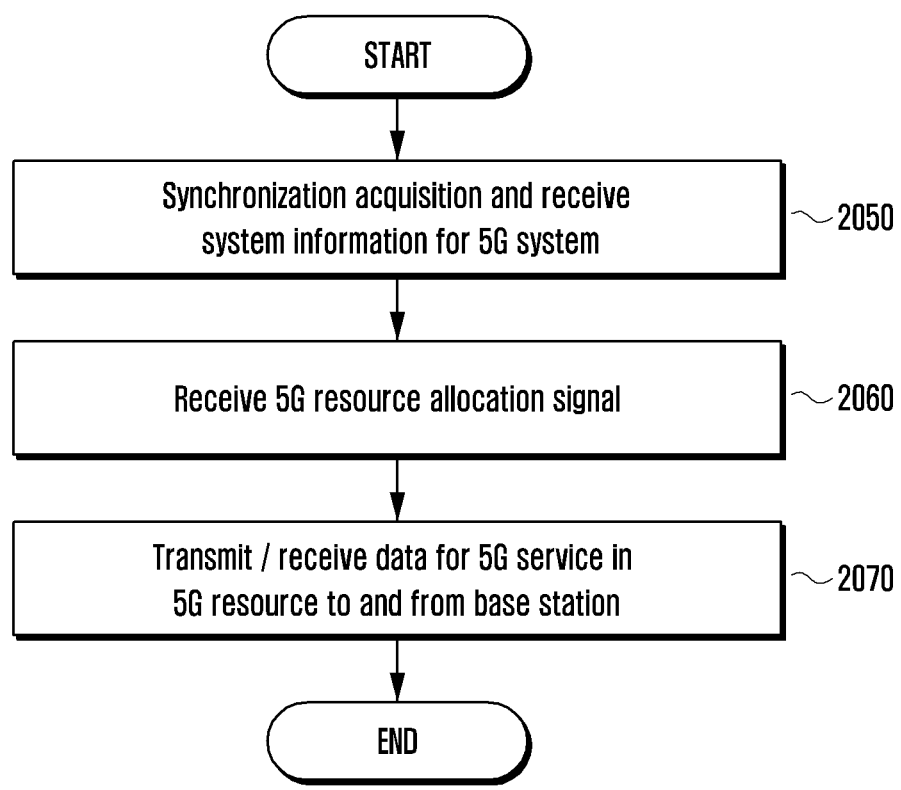

FIGS. 19, 20A, and 20B are diagrams illustrating a 2-3-th embodiment of a communication system according to various embodiments of the present disclosure. Referring to FIG. 19, FIG. 19 illustrates a 2-3-th embodiment in which an LTE base station 1900 and a 5G base station 1930 are installed, respectively. In this case, there are no restrictions on a duplex scheme for the LTE base station 1900 or the 5G base station 1930. The LTE base station 1900 and the 5G base station 1930 are each stand-alone, and the terminal may camp on each base station. The LTE capable terminal 1920 having the LTE transmission/reception module may camp on the LTE base station 1900 and the LTE capable terminal 1920 may acquire synchronization through the synchronization signal transmitted from the LTE base station 1900 and transmit/receive data to/from the LTE base station 1900 after receiving the system information (1910). The 5G capable terminal 1950 having the 5G transmission/reception module may camp on the 5G base station 1930 and the 5G capable terminal 1950 may acquire the synchronization through the synchronization signal transmitted from the 5G base station 1930, and transmit/receive data to/from the 5G base station 1930 after receiving the system information (1940).

When there is an integrated controller 1960 that controls the LTE base station 1900 and the 5G base station 1930, the integrated controller 1960 can manage and operate the LTE base station 1900 and the 5G base station 1930 in real time. For example, when the integrated controller 1960 divides resources on time and operates the LTE system and the 5G system at different times, it is possible to dynamically select the allocation of time resources of the LTE system and the 5G system and transmit the signal to another base station 1900 and the 5G base station 1930. The LTE-capable terminal 1920 may receive a signal indicating a resource capable of transmitting/receiving an LTE signal from the LTE base station 1900, thereby knowing through which resource the data transmission/reception from the LTE base station is made. The 5G capable terminal 1950 may receive a signal indicating a resource (e.g., time resource, a frequency resource, an antenna resource, or a spatial resource) to and from which a 5G signal may be transmitted or received from the 5G base station 1930, thereby knowing through which resource the data transmission/reception from the 5G base station is made.

On the other hand, if there is no integrated controller 1960, the base station and terminal procedures of FIG. 17 are basically followed up. If there is a non-ideal backhaul, it is impossible to perform X2 communication between the fast base stations. Therefore, the base station 1900 or 1930 can semi-statically operate the LTE system and the 5G system. For example, when the base station 1900 or 1930 divides resources on time and operates the LTE system and the 5G system at different times, it selects the allocation of time resources of the LTE system and the 5G system and transmits the signal to another base station 1900 or 1930 by the X2 communication, thereby distinguishing the resources of the LTE system and the 5G system. The LTE-capable terminal 1920 may receive a signal indicating a resource capable of transmitting/receiving an LTE signal from the LTE base station 1900, thereby knowing through which resource the data transmission/reception from the LTE base station is made. The 5G capable terminal 1950 may receive a signal indicating a resource (e.g., time resource, a frequency resource, an antenna resource, or a spatial resource) to and from which a 5G signal may be transmitted or received from the 5G base station 1930, thereby knowing through which resource the data transmission/reception from the 5G base station is made.

FIG. 20A is a diagram illustrating a procedure of configuring, by the base station 1930, a 5G resource and transmitting and receiving data to and from the 5G capable terminal 1950 and the resources for the 5G system, according to the 2-3-th embodiment.

In operation 2000, the base station 1930 transmits the synchronization signal and the system information configured for the 5G transmission to the 5G capable terminal 1950. A separate synchronization signal may be transmitted for the eMBB, mMTC, URLLC using different numerologies as the synchronization signal for the 5G system, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 2010, the 5G base station 1930 transmits an LTE or 5G resource allocation signal to the terminal 1950. When the LTE or 5G resource allocation signal is transmitted to the 5G capable terminal 1950, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1900. If there is the integrated controller 1960, when the LTE system and the 5G system are operated at different resources by dividing resources, the integrated controller 1960 selects the allocation of the time resource of the LTE system and the 5G system and transmits the allocation information to the base station 1900 or 1930 by the X2, thereby distinguishing the resources of the LTE system and the 5G system. If there is no integrated controller 1960, as in the base station procedure of FIG. 17, the LTE base station or the 5G base station may select the LTE or 5G resource allocation and transmit the selected LTE or 5G resource allocation to another base station.

In operation 2020, the base station 1930 transmits/receives data for the 5G service from the 5G resource to the 5G capable terminal 1950.

FIG. 20B illustrates a procedure of receiving, by the 5G capable terminal 1950, from the base station 1930 and transmitting/receiving data to and from the 5G resource according to the 2-3-th embodiment.

In operation 2050, the 5G capable terminal 1950 acquires synchronization from the synchronization signal for the 5G system transmitted by the base station 1930 from the resource configured from the 5G transmission, and receives the system information transmitted by the base station 1930. The synchronization signal for the 5G system may be a separate synchronization signal for the eMBB, mMTC, URLLC using different numerologies or a common synchronization signal transmitted to a specific 5G resource using one numerology. With the above system information, the common system signal may be received by a specific 5G resource using one numerology, or separate system information may be received for eMBB, mMTC, and URLLC using different numerologies.

In operation 2060, the 5G capable terminal 1950 receives the LTE or 5G resource allocation signal from the base station 1930. The signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally obtained by the 5G capable terminal and may be transmitted by the base station 1900.

In operation 2070, the 5G capable terminal 1950 transmits/receives data for the 5G service from the 5G resource to the base station 1930.

Next, a description will be made of a method for temporally dividing and operating LTE data transmission/reception and 5G data transmission/reception in a situation where the LTE system and the 5G system of FIGS. 15 to 20 coexist.

Figure 21:
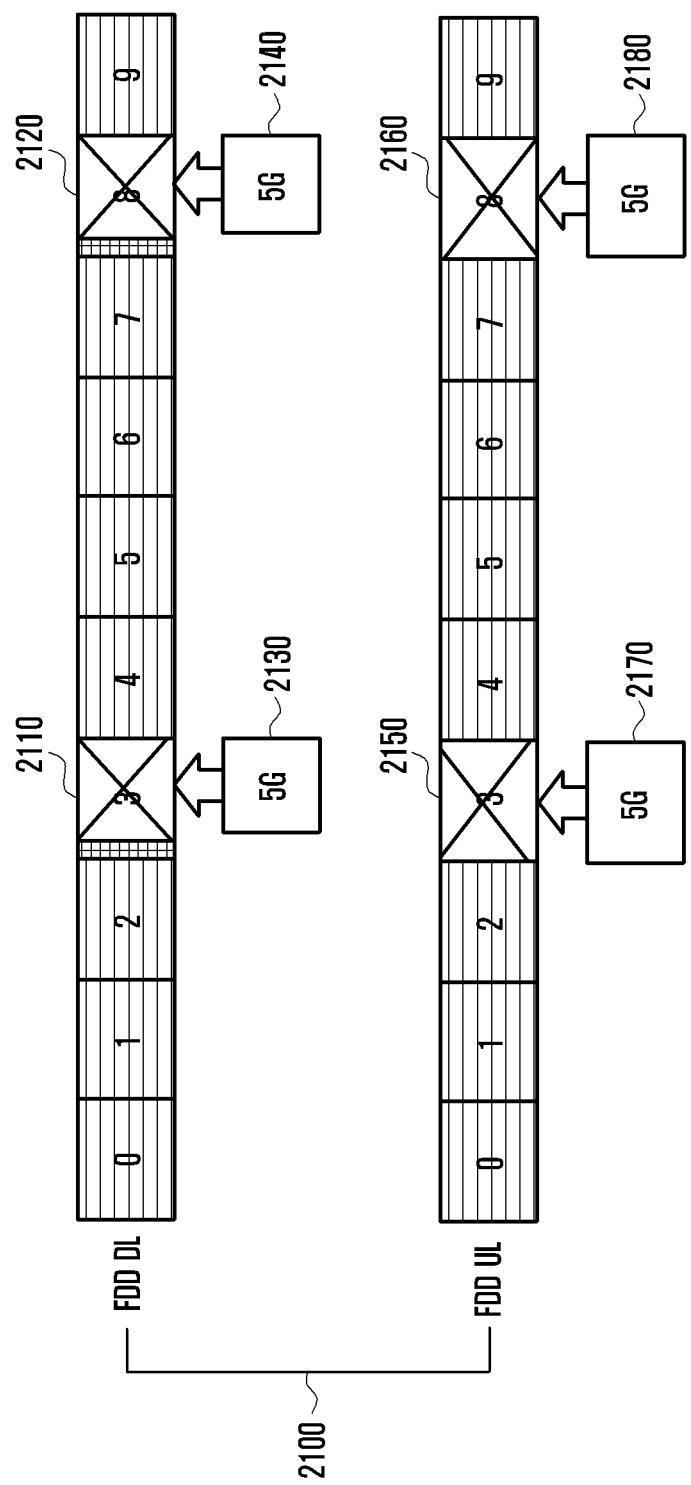
FIG. 21 is a diagram illustrating an example in which the LTE and the 5G system are divided into time based on a multimedia broadcast single frequency network (MBSFN) subframe in one LTE frequency division duplex (FDD) carrier according to various embodiments of the present disclosure.

FIG. 21 is a diagram illustrating an example in which the LTE and the 5G system are divided into time based on a multimedia broadcast single frequency network (MBSFN) subframe in one LTE FDD carrier according to various embodiments of the present disclosure.

In FIG. 21, FDD 2100 information (DL carrier frequency BW and position information, UL carrier frequency BW, and position information) may be transmitted from the 5G base station to the 5G capable terminal, and the 5G capable terminal may acquire the information through the synchronization acquisition and the system information reception. In the case of a carrier in which LTE and 5G systems coexist compared to a carrier in which only 5G transmission exists, the 5G transmission is possible only in the MBSFN subframe, so the synchronization signal may be transmitted in a subframe different from the carrier in which only 5G transmission exists. However, in order to maintain a period (e.g., 5 ms) during which the synchronization signal is transmitted, a specific MBSFN subframe, such as #2, #7, etc., may be configured to be used for 5G transmission only. The terminal receives subframe index and slot index information used for the 5G transmission from the base station, and may utilize the index information for RS and data reception.

The MBSFN subframe in the FDD 2100 may be selectively configured as a higher signal in subframes #1, #2, #3, #6, #7, #8, and the like. The subframes used for the 5G transmission among the configured MBSFN subframes may be transmitted from the 5G base station to the 5G capable terminal. The 5G capable terminal may determine by which resource the 5G transmission is performed based on the subframe information received by the 5G capable terminal. On the other hand, two OFDM symbols at a head part among the fourteen OFDM symbols configuring the MBSFN subframe are used for CRS and control channel transmission for the LTE terminal. Therefore, the 5G transmission 2130 or 2140 is performed in twelve OFDM symbols excluding two OFDM symbols at the head part, and 5G downlink transmission 2130 or 2140 should be performed according to the start of the third OFDM symbol excluding the two OFDM symbols at the head part should be performed.

In the present disclosure, an embodiment for allowing the 5G terminal to receive 5G downlink 2130 or 2140 will be described. The first embodiment instructs the terminal to acquire information about a start point of the 5G downlink transmission or the 5G downlink transmission interval for the reception of the 5G downlink transmission 2130 or 2140, so the terminal knows the timing and the interval where the 5G downlink transmission is performed. That is, the 5G terminal should acquire the start point at which the 5G downlink transmission 2130 or 2140 is performed in synchronization with the start of the third OFDM symbol. In the above description, a reference signal for receiving a downlink control channel or a 5G downlink control channel for the 5G system, a reference signal for the reception of the 5G downlink control channel, or a reference signal for other purposes may be transmitted at the start point where the 5G downlink transmission 2130 or 2140 is performed. Alternatively, an uplink resource 2150 or 2160 for 5G data configured for the 5G uplink transmission may use all fourteen OFDM symbols for the 5G transmission 2170 or 2180. Therefore, for the 5G uplink transmission 2170 or 2180, the 5G uplink transmission should be performed in accordance with a start of a first OFDM symbol, and the 5G terminal should acquire a start point at which the 5G uplink transmission 2170 or 2180 is performed in synchronization with the start of the first OFDM symbol.

The second embodiment is to configure two OFDM symbols used for LTE CRS and LTE control channel transmission as reserved resources or blank resources to receive a 5G downlink transmission 2130 or 2140. In this case, two methods can be applied.

The first method is to apply rate matching for the 5G downlink control channel and the 5G reference signal. That is, the 5G terminal should know the fact (rate matching) that the 5G downlink control channel and the 5G reference signal are not transmitted from the resource corresponding to the two OFDM symbols configured as the reserved resource or the blank resource but is transmitted from the third OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are rate matched, and detects the 5G downlink control channel and the 5G reference signal from the third OFDM symbol. Alternatively, the terminal may perform the rate matching operation as previously determined for each 5G transmission signal. That is, the resources for the 5G downlink control channel and the 5G reference signal positioned in the reserved resource or the blank resource may be previously determined to perform the rate matching. As a result, the 5G terminal transmits the 5G downlink control channel and the 5G downlink control channel from the resources configured for the 5G downlink control channel and the 5G reference signal by determining that the 5G downlink control channel and the 5G reference signal are transmitted from the resource configured for the remaining 5G downlink control channel and 5G reference signal excluding the overlapping resource with the reserved resource or the blank resource. As a result, resources for the 5G downlink control channel transmission become small, so that only a part (e.g., 4 and 8) of CCE aggregation levels may be configured to be decoded by the terminal.

The second method is to apply puncturing for the 5G downlink control channel and the 5G reference signal. That is, the 5G terminal should know the fact (puncturing) that the 5G downlink control channel and the 5G reference signal are not transmitted from the resource corresponding to the two OFDM symbols configured as the reserved resource or the blank resource and the 5G downlink control channel and the 5G reference signal is transmitted from the first OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are punctured, and detects the 5G downlink control channel and the 5G reference signal from the first OFDM symbol. Alternatively, the terminal may perform the puncturing operation as previously determined for each 5G transmission signal. That is, the resources for the 5G downlink control channel and the 5G reference signal positioned in the reserved resource or the blank resource may be previously determined to perform the puncturing. As a result, the 5G terminal determines that the 5G downlink control channel and the 5G reference signal are transmitted from the first OFDM symbol, so the overlapping resource with the reserved resource or the blank resource maps a received signal value to 0 and the resource configured for the 5G downlink control channel and the 5G reference signal other than the overlapping resource with the reserved resource or the blank resource maps the received values to receives the 5G downlink control channel and the 5G reference signal. As a result, the resource for the 5G downlink control channel transmission is not reduced, but may be used for the terminal when the received channel state is good.

A signal indicating whether the 5G signal is rate-matched or punctured in the reserved resource or the blank resource is transmitted to the 5G terminal by one field, for example, 1-bit information, which may in turn be received by the 5G terminal.

The third embodiment sets, in the terminal, the downlink control channel for the 5G system to receive the 5G downlink transmission 2130 or 2140 or the OFDM symbol position at which the reference signal for receiving the 5G downlink control channel or the reference signal for other purposes is transmitted and knows the time when the terminal performs the 5G downlink transmission from the information. That is, the 5G terminal receives from the higher signal that the downlink control channel or the 5G reference signal for the 5G system is transmitted in the third OFDM symbol. In this case, the downlink control channel or 5G reference signal for the 5G system may be transmitted to the OFDM symbol configured to transmit the 5G downlink control channel and the OFDM symbol from the third OFDM symbol.

All of the above embodiments can be used by the base station according to the channel state of the terminal. For example, if the channel state of the terminal is good, the second embodiment may be applied to the terminal, and if the channel state of the terminal is poor, the first and third embodiments may be applied to the terminal. In a case where another embodiment is applied to the terminal according to the state of each channel, the terminal receives the setting according to each embodiment from the base station and performs the terminal operation in each embodiment according to the signal received from the base station.

In addition, as described with reference to FIG. 15 or 17, if the terminal has both the LTE transmission/reception module and the 5G transmission/reception module, it can receive the PCFICH of the LTE system from the base station and acquire the starting OFDM symbol of the 5G transmission. For example, if the PCFICH indicates that the downlink control channel transmission interval of the LTE system is up to the second OFDM symbol, the terminal may acquire starting the transmission for the 5G system from the third OFDM symbol. Although the example in which the two OFDM symbols at the head part among the fourteen OFDM symbols configuring the MBSFN subframe are used for the CRS and control channel transmission for the LTE terminal is described, an example in which one OFDM symbol at the head part is used for the CRS and control channel transmission for the LTE terminal can be applied. In this case, thirteen OFDM symbols are used for the 5G transmission.

In addition, since the LTE terminals capable of supporting the transmission modes TM9 and 10 in the LTE cell can transmit data through a demodulation reference signal (DMRS) and a channel statement information reference signal (CSI-RS) in the MBSFN subframe, it is possible to divide the LTE transmission and the 5G transmission based on frequency resources in the MBSFN subframe for the 5G terminal and the LTE terminals. At this time, the LTE transmission and the 5G transmission should have the same numerology. For example, subcarrier spacing of 15 kHz in LTE should also be used for the 5G transmission. By applying the above method, the LTE and 5G transmission may be performed without having an effect on each other. In order to support the LTE and the 5G having different numerologies, a guard band is required to protect LTE transmission between the LTE and 5G resources, signaling to the 5G terminal may be made when the guard band is set, and the 5G terminal may receive the signal to receive the 5G control information and the reference signal or the data information from the 5G resource except for the guard band. The base station and terminal procedures illustrated in FIGS. 15 to 20B may be applied for the division in the frequency resource.

In FIG. 21, MBSFN subframe #3 2110 and #8 2120 are used for the 5G data transmission 2130 or 2140 according to an embodiment, and a specific procedure for the 5G data transmission/reception follows the terminal and terminal procedure proposed in FIGS. 15 to 20B. The uplink resources 2170 or 2180 for the 5G data are also configured for the 5G system for the uplink control information transmission to the 5G data. The position of the uplink resource may be changed depending on the 5G HARQ feedback timing or the uplink control information design. For example, if the uplink feedback timing for the 5G downlink data is positioned in a next uplink subframe #4 or #9, the uplink subframe #4 or #9 may be set.

Figure 22:
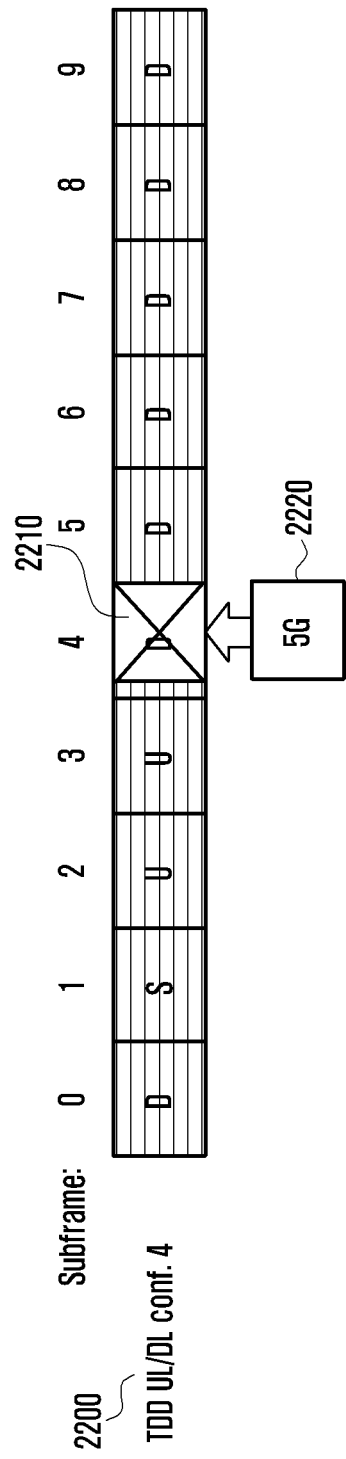
FIG. 22 is a diagram illustrating an example in which the LTE and the 5G system are divided into time based on the MBSFN subframe in one LTE FDD carrier according to various embodiments of the present disclosure.

FIG. 22 is a diagram illustrating an example in which LTE and the 5G system are divided into time based on the MBSFN subframe in one LTE TDD carrier according to various embodiments of the present disclosure.

In FIG. 22, TDD 2200 information (DL carrier frequency BW and position information, TDD UL-DL configuration information, TDD special subframe configuration information, dynamic TDD UL-DL configuration for eIMTA, or the like) may be transmitted from the 5G base station to the 5G capable terminal, and the 5G capable terminal may acquire the information through the synchronization acquisition and the system information reception.

In the case of a carrier in which the LTE and the 5G coexist compared to a carrier in which only 5G transmission exists, the 5G transmission is possible only in the MBSFN subframe, so the synchronization signal may be transmitted in a subframe different from the carrier in which only 5G transmission exists. However, in order to maintain a period (e.g., 5 ms) during which the synchronization signal is transmitted, a specific MBSFN subframe, such as #2, #7, etc., may be configured to be used for 5G transmission only. The terminal receives subframe index and slot index information used for the 5G transmission from the base station, and may utilize the index information for RS and data reception.

If the MBSFN subframe in the TDD 2200 is the downlink subframe, it may be selectively configured as a higher signal in subframes #1, #2, #3, #6, #7, #8, #9, and the like. The subframes used for the 5G transmission among the configured MBSFN subframes may be transmitted from the 5G base station to the 5G capable terminal. The 5G capable terminal may determine by which resource the 5G transmission is performed based on the subframe information received by the 5G capable terminal. On the other hand, two OFDM symbols at a head part among the fourteen OFDM symbols configuring the MBSFN subframe are used for CRS and control channel transmission for the LTE terminal. Therefore, the 5G transmission 2210 or 2220 is performed in twelve OFDM symbols excluding two OFDM symbols at the head part, and 5G uplink downlink transmission 2220 should be performed according to the start of the third OFDM symbol excluding the two OFDM symbols at the head part should be performed.

In the present disclosure, an embodiment for allowing the 5G terminal to transmit/receive the 5G uplink and downlink transmission 2220 will be described. The first embodiment instructs the terminal to acquire information about a start point of the 5G uplink and downlink transmission or the 5G uplink and downlink transmission interval for the transmission/reception of the 5G uplink and downlink transmission 2220, so the terminal knows the timing and the interval where the 5G uplink and downlink transmission is performed. That is, the 5G terminal should acquire the start point at which the 5G uplink and downlink transmission 2220 is performed in synchronization with the start of the third OFDM symbol. In the above description, a reference signal for receiving a downlink control channel or a 5G downlink control channel for the 5G system, a reference signal for the reception of the 5G uplink and downlink control channel, or a reference signal for other purposes may be transmitted at the start point where the 5G uplink and downlink transmission 2220 is performed.

The second embodiment is to configured two OFDM symbols used for LTE CRS and LTE control channel transmission as reserved resources or blank resources to transmit/receive the 5G downlink transmission 2220. In this case, two methods can be applied.

The first method is to apply rate matching for the 5G downlink control channel and the 5G reference signal. That is, the 5G terminal should know the fact (rate matching) that the 5G downlink control channel and the 5G reference signal are not transmitted from the resource corresponding to the two OFDM symbols configured as the reserved resource or the blank resource but is transmitted from the third OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are rate matched, and detects the 5G downlink control channel and the 5G reference signal from the third OFDM symbol. Alternatively, the terminal may perform the rate matching operation as previously determined for each 5G transmission signal. That is, the resources for the 5G downlink control channel and the 5G reference signal positioned in the reserved resource or the blank resource may be previously determined to perform the rate matching. As a result, the 5G terminal transmits the 5G downlink control channel and the 5G downlink control channel from the resources configured for the 5G downlink control channel and the 5G reference signal by determining that the 5G downlink control channel and the 5G reference signal are transmitted from the resource configured for the remaining 5G downlink control channel and 5G reference signal excluding the overlapping resource with the reserved resource or the blank resource. As a result, resources for the 5G downlink control channel transmission become small, so that only a part (e.g., 4 and 8) of CCE aggregation levels may be configured to be decoded by the terminal.

The second method is to apply puncturing for the 5G downlink control channel and the 5G reference signal. That is, the 5G terminal should know the fact (puncturing) that the 5G downlink control channel and the 5G reference signal are not transmitted from the resource corresponding to the two OFDM symbols configured as the reserved resource or the blank resource and the 5G downlink control channel and the 5G reference signal is transmitted from the first OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are punctured, and detects the 5G downlink control channel and the 5G reference signal from the first OFDM symbol. Alternatively, the terminal may perform the puncturing operation as previously determined for each 5G transmission signal. That is, the resources for the 5G downlink control channel and the 5G reference signal positioned in the reserved resource or the blank resource may be previously determined to perform the puncturing. As a result, the 5G terminal determines that the 5G downlink control channel and the 5G reference signal are transmitted from the first OFDM symbol, so the overlapping resource with the reserved resource or the blank resource maps a received signal value to 0 and the resource configured for the 5G downlink control channel and the 5G reference signal other than the overlapping resource with the reserved resource or the blank resource maps the received values to receives the 5G downlink control channel and the 5G reference signal. As a result, the resource for the 5G downlink control channel transmission is not reduced, but may be used for the terminal when the received channel state is good.

A signal indicating whether the 5G signal is rate-matched or punctured in the reserved resource or the blank resource is transmitted to the 5G terminal by one field, for example, 1-bit information, which may in turn be received by the 5G terminal.

The third embodiment sets, in the terminal, the downlink control channel for the 5G to transmit/receive the 5G uplink and downlink transmission 2220 or the OFDM symbol position at which the reference signal for receiving the 5G downlink control channel or the reference signal for other purposes is transmitted and knows the time when the terminal performs the 5G downlink transmission from the information. That is, the 5G terminal receives from the higher signal that the downlink control channel or the 5G reference signal for the 5G is transmitted in the third OFDM symbol. In this case, the downlink control channel or 5G reference signal for the 5G may be transmitted to the OFDM symbol configured to transmit the 5G downlink control channel and the OFDM symbol from the third OFDM symbol.

All of the above embodiments can be used by the base station according to the channel state of the terminal. For example, if the channel state of the terminal is good, the second embodiment may be applied to the terminal, and if the channel state of the terminal is poor, the first and third embodiments may be applied to the terminal. In a case where another embodiment is applied to the terminal according to the state of each channel, the terminal receives the setting according to each embodiment from the base station and performs the terminal operation in each embodiment according to the signal received from the base station.

In addition, as described with reference to FIG. 15 or 17, if the terminal has both the LTE transmission/reception module and the 5G transmission/reception module, it can receive the PCFICH of the LTE system from the base station and acquire the starting OFDM symbol of the 5G transmission. For example, if the PCFICH indicates that the downlink control channel transmission interval of the LTE system is up to the second OFDM symbol, the terminal may acquire starting the transmission for the 5G system from the third OFDM symbol.

In addition, since the LTE terminals capable of supporting the transmission modes TM9 and 10 in the LTE cell can transmit data through a demodulation reference signal (DMRS) and a channel statement information reference signal (CSI-RS) in the MBSFN subframe, it is possible to divide the LTE transmission and the 5G transmission based on frequency resources in the MBSFN subframe for the 5G terminal and the LTE terminals. At this time, the LTE transmission and the 5G transmission should have the same numerology. For example, subcarrier spacing of 15 kHz in LTE should also be used for the 5G transmission. By applying the above method, the LTE and 5G transmission may be performed without having an effect on each other. In order to support the LTE and the 5G having different numerologies, a guard band is required to protect LTE transmission between the LTE and 5G resources, signaling to the 5G terminal may be made when the guard band is set, and the 5G terminal may receive the signal to receive the 5G control information and the reference signal or the data information from the 5G resource except for the guard band. The base station and terminal procedures illustrated in FIGS. 15 to 20B may be applied for the division in the frequency resource.

In FIG. 22, MBSFN subframe #4 2210 is used for the 5G data transmission 2200 according to an embodiment, and a specific procedure for the 5G data transmission/reception follows the terminal and terminal procedure proposed in FIGS. 15 to 20B. The uplink control information transmission for the 5G data is also performed in the subframe #4. The specific position in the subframe #4 may be changed depending on the 5G HARQ feedback timing or the uplink control information design.

Although the example in which the two OFDM symbols at the head part among the fourteen OFDM symbols configuring the MBSFN subframe are used for the CRS and control channel transmission for the LTE terminal is described, an example in which one OFDM symbol at the head part is used for the CRS and control channel transmission for the LTE terminal can be applied. In this case, thirteen OFDM symbols are used for the 5G transmission.

Figure 23:
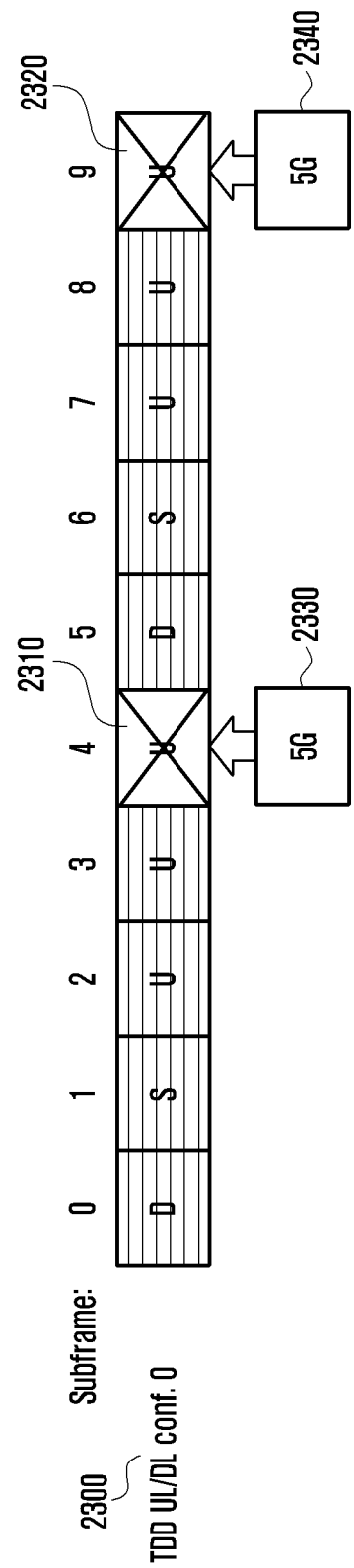
FIG. 23 is a diagram illustrating an example in which the LTE and the 5G system are divided into time based on an uplink subframe in one LTE FDD carrier according to various embodiments of the present disclosure.

FIG. 23 is a diagram illustrating an example in which LTE and the 5G system are divided into time based on the uplink subframe in one LTE TDD carrier according to various embodiments of the present disclosure.

In FIG. 23, TDD 2300 information (DL carrier frequency BW and position information, TDD UL-DL configuration information, TDD special subframe configuration information, dynamic TDD UL-DL configuration for eIMTA, or the like) may be transmitted from the 5G base station to the 5G capable terminal, and the 5G capable terminal may acquire the information through the synchronization acquisition and the system information reception.

In the case of a carrier in which the LTE and the 5G coexist compared to a carrier in which only 5G transmission exists, the 5G transmission is possible only in the uplink subframe, so the synchronization signal may be transmitted in a subframe different from the carrier in which only 5G transmission exists. However, in order to maintain a period (e.g., 5 ms) during which the synchronization signal is transmitted, a specific uplink subframe, such as #2, #7, etc., may be set to be used for 5G transmission only. The terminal receives subframe index and slot index information used for the 5G transmission from the base station, and may utilize the index information for RS and data reception.

The uplink subframes used for the 5G transmission in the TDD 2300 may be transmitted from the 5G base station to the 5G capable terminal. The 5G capable terminal may determine by which resource the 5G transmission is performed based on the subframe information received by the 5G capable terminal.

Alternatively, a resource 2310 or 2320 for the 5G data configured for the 5G uplink and downlink transmission may use all fourteen OFDM symbols for 5G transmission 2330 or 2340. Therefore, for the 5G uplink and downlink transmission 2330 or 2340, the 5G uplink and downlink transmission should be performed in accordance with a start of a first OFDM symbol, and the 5G terminal should acquire a start point at which the 5G uplink and downlink transmission 2330 or 2340 is performed in synchronization with the start of the first OFDM symbol.

In FIG. 23, the uplink subframe #4 2310 and #9 2320 are used for the 5G data transmission 2330 or 2340 according to an embodiment, and a specific procedure for the 5G data transmission/reception follows the terminal and terminal procedure proposed in FIGS. 15 to 20B. The uplink control information transmission for the 5G data is also performed in the subframe #4 or the subframe #9. The specific position in the subframe #4 or #9 may be changed depending on the 5G HARQ feedback timing or the uplink control information design.

Figure 24:
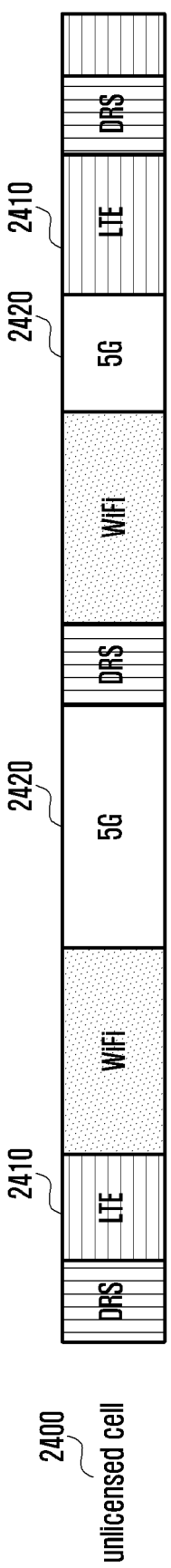
FIG. 24 is a diagram illustrating an example in which the LTE and the 5G system are divided into time based on a licensed assisted access (LAA) operation in one carrier of an unlicensed according to various embodiments of the present disclosure.

FIG. 24 illustrates an example in which the LTE and the 5G system are divided into time based on the LAA operation in one carrier of an unlicensed band according to various embodiments of the present disclosure. Although an example of applying the LAA operation in one carrier in the unlicensed band is described with reference to FIG. 24, it is also possible to apply the LAA operation in one carrier in the licensed band.

In FIG. 24, carrier 2400 information (carrier frequency BW and position information, discovery reference signal (DRS) configuration information, or the like) may be transmitted from the 5G base station to the 5G capable terminal, and the 5G capable terminal may acquire the information through the synchronization acquisition and the system information reception.

The uplink subframes used for the 5G transmission in the carrier 2400 may be transmitted from the 5G base station to the 5G capable terminal. The 5G capable terminal may determine by which resource the 5G transmission is performed based on the subframe information received by the 5G capable terminal.

In FIG. 24, according to one embodiment, the LTE transmission is performed in a resource 2410, and the 5G transmission is performed in a resource 2420. A specific procedure for transmitting/receiving 5G data follows the base station and terminal procedures illustrated in FIGS. 15, 16A, 16B, 17, 18A, 18B, 19, 20A, and 20B. The uplink control information transmission for the 5G data is also performed in a resource $2i$-03 for 5G transmission. The specific position in the resource $2i$-03 may be changed depending on the 5G HARQ feedback timing or the uplink control information design.

Figure 25:
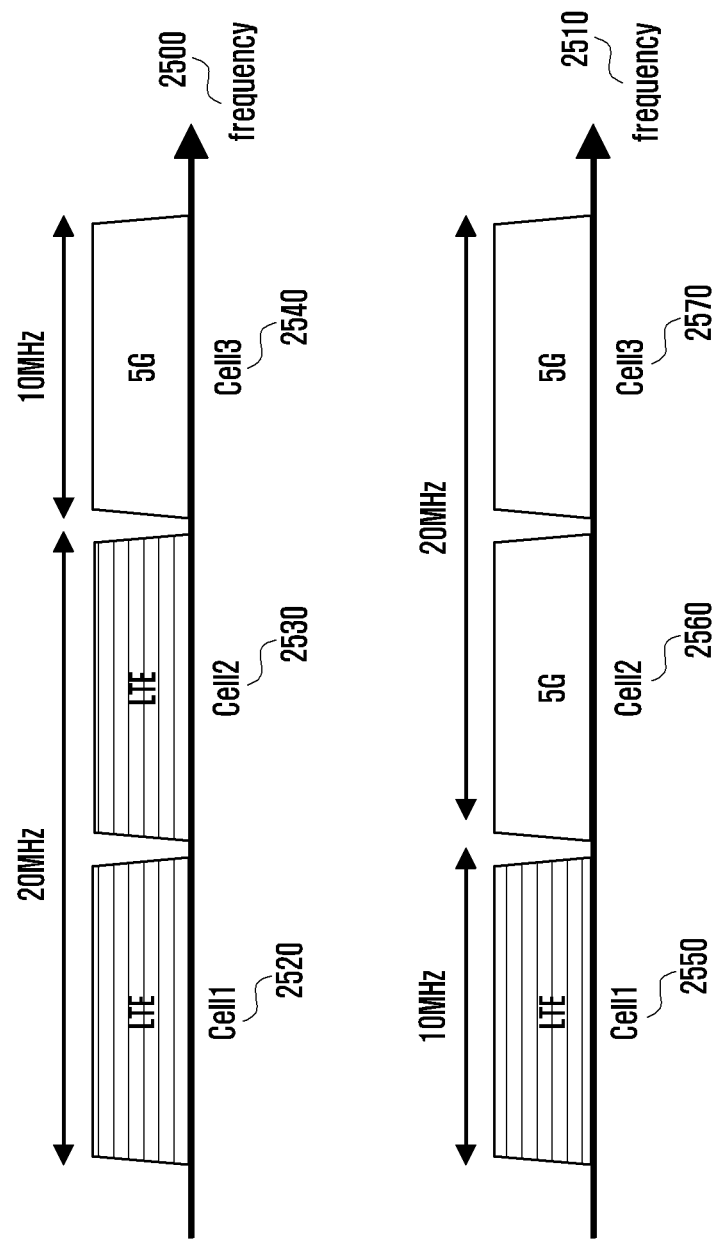
FIG. 25 is a diagram illustrating an example in which LTE and the 5G system are divided based on activation and deactivation operations of a carrier aggregation (CA) in a plurality of LTE carriers according to various embodiments of the present disclosure.

FIG. 25 is a diagram illustrating that LTE and the 5G system are divided into frequencies and operated based on cell activation and/or deactivation of carrier aggregation (CA) in a plurality of LTE carriers according to various embodiments of the present disclosure.

In FIG. 25, cells 2520 to 2570 may be set to be the duplexes of the FDD, the TDD, and the LAA, and FDD cell information (DL carrier frequency BW and position information, UL carrier frequency BW and position information), TDD cell information (carrier frequency BW and position information, TDD UL-DL configuration information, TDD special subframe configuration information, and dynamic TDD UL-DL configuration information for operating eIMTA, or the like), LAA cell information (carrier frequency BW and position information, discovery reference signal (DRS) configuration information, etc.) may be transmitted from the 5G base station to the 5G capable terminal, and the 5G capable terminal may acquire the above information through synchronization acquisition and system information reception.

By activating or deactivating cells for the LTE and 5G transmission, it is possible to prevent or again enable the data transmission/reception of LTE terminal in the corresponding cell. Also, it is possible to prevent or again enable the data transmission/reception of the 5G terminals. In the embodiment of FIG. 25, only an example of activating or deactivating cells is proposed. However, it is also possible to divide LTE transmission and the 5G transmission into frequencies by configuring/deconfiguring cells in the CA.

The cells used for 5G transmission may be deactivated for the LTE terminals, the cells may be transmitted from the 5G base station to the 5G capable terminal, and the 5G terminal may determine through which resource the 5G data transmission is performed based on the information on the cells which the 5G capable terminal receives.

FIG. 25 illustrates as an embodiment that cell 3 2540 is deactivated for the LTE terminal cell 3 2540 so that for frequency 2500 the cell 3 2540 is used for the 5G data transmission while cell 1 2520, and cell 2 2530 are used for the LTE terminal. When more cells are deactivated for LTE terminals to support more 5G transmissions and need to be used for the 5G transmission, cell 2 2560 is deactivated for the LTE terminal and used for additional 5G transmission so that for frequency 2510 the cell 3 2570 and cell 2 2560 are used for the 5G data transmission while cell 1 2550 is used for the LTE terminal.

Figure 26:
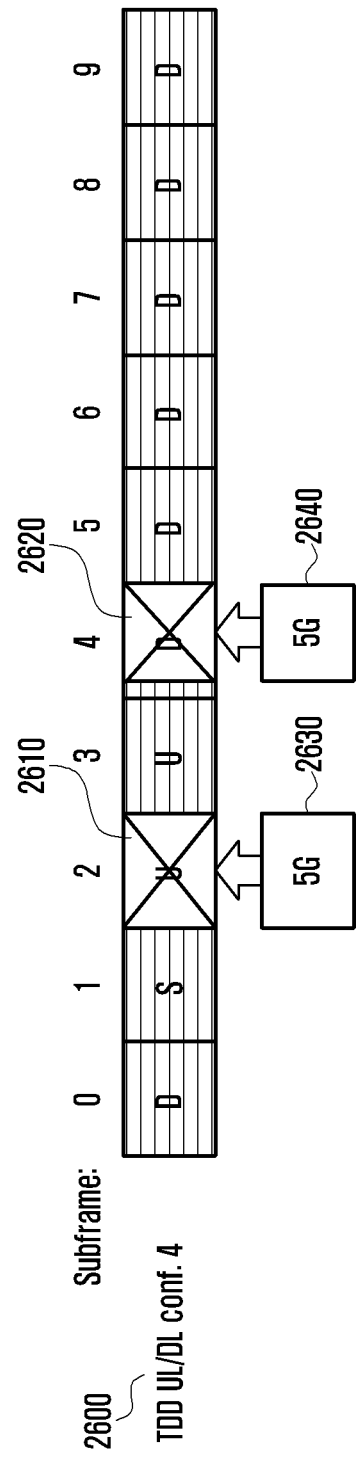
FIGS. 26, 27A, and 27B illustrate an example in which LTE data transmission/reception and 5G data transmission/reception are divided into time based on the MBSFN or the uplink subframe in one LTE time division duplex (TDD) carrier according to various embodiments of the present disclosure.
Figure 27A:
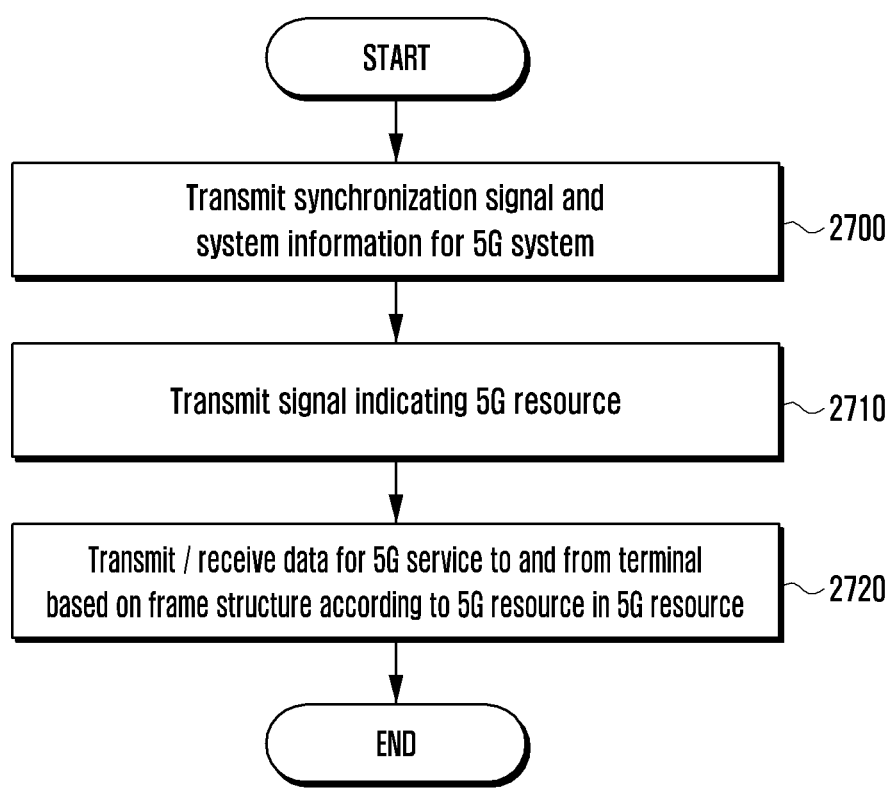
Figure 27B:
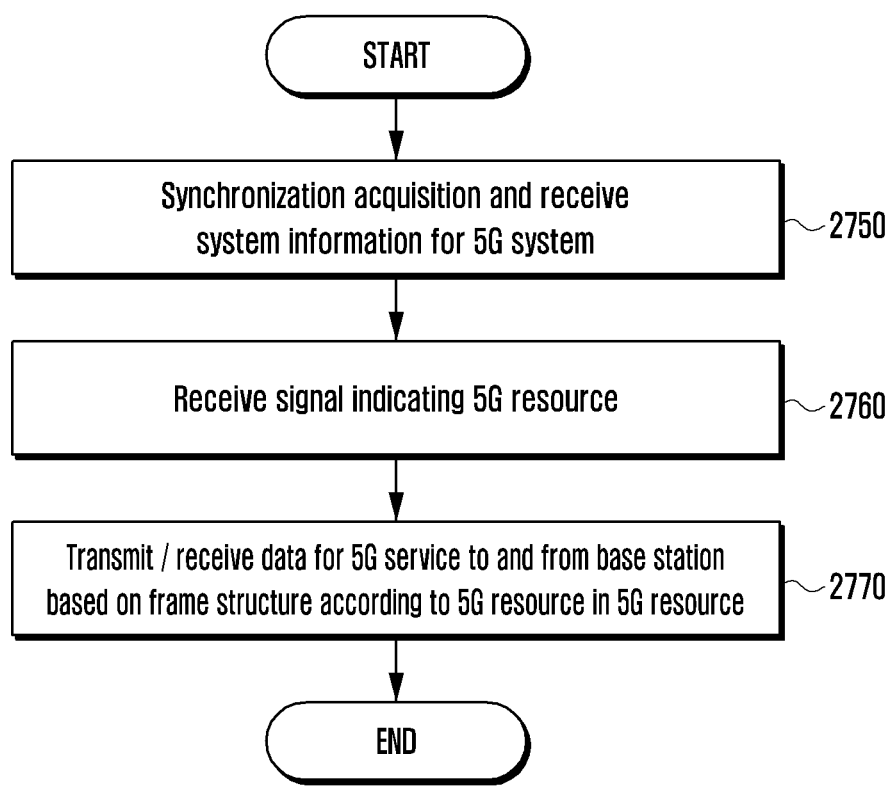

FIGS. 26, 27A, and 27B illustrate an example in which LTE data transmission/reception and 5G data transmission/reception are divided into time based on the MBSFN or the uplink subframe in one LTE time division duplex (TDD) carrier according to various embodiments of the present disclosure.

In FIG. 26, TDD 2600 information (DL carrier frequency BW and position information, TDD UL-DL configuration information, TDD special subframe configuration information, dynamic TDD UL-DL configuration for eIMTA, or the like) may be transmitted from the 5G base station to the 5G capable terminal, and the 5G capable terminal may acquire the information through the synchronization acquisition and the system information reception.

In the case of a carrier in which the LTE and the 5G coexist compared to a carrier in which only 5G transmission exists, the 5G transmission is possible only in the uplink subframe or the MBSFN subframe, so the synchronization signal may be transmitted in a subframe different from the carrier in which only 5G transmission exists. However, in order to maintain a period (e.g., 5 ms) during which the synchronization signal is transmitted, the specific uplink subframe or the MBSFN subframe, such as #2, #7, etc., may be set to be used for 5G transmission only. The terminal receives subframe index and slot index information used for the 5G transmission from the base station, and may utilize the index information for RS and data reception.

If the MBSFN subframe in the TDD 2600 is the downlink subframe, it may be selectively set as a higher signal in subframes #1, #2, #3, #6, #7, #8, #9, and the like. The subframes used for the 5G transmission among the set MBSFN subframes or the uplink subframes may be transmitted from the 5G base station to the 5G capable terminal. The 5G capable terminal may determine by which resource the 5G transmission is performed based on the subframe information received by the 5G capable terminal. On the other hand, two OFDM symbols at a head part among the fourteen OFDM symbols configuring the MBSFN subframe are used for CRS and control channel transmission for the LTE terminal. Therefore, 5G transmission 2640 is performed in twelve OFDM symbols 2620 except for the two OFDM symbols at the head, 5G uplink and downlink transmission 2640 is performed according to the start of the third OFDM symbol excluding the two OFDM symbols at the head, and the 5G terminal should acquire the start point at which the 5G uplink and downlink transmission 2640 is performed in synchronization with the start of the third OFDM symbol.

In addition, since the LTE terminals capable of supporting the transmission modes TM9 and 10 in the LTE cell can transmit data through a demodulation reference signal (DMRS) and a channel statement information reference signal (CSI-RS) in the MBSFN subframe, it is possible to divide the LTE transmission and the 5G transmission based on frequency resources in the MBSFN subframe for the 5G terminal and the LTE terminals. At this time, the LTE transmission and the 5G transmission should have the same numerology. For example, subcarrier spacing of 15 kHz in LTE should also be used for the 5G transmission. By applying the above method, the LTE and 5G transmission may be performed without having an effect on each other. In order to support the LTE and the 5G having different numerologies, a guard band is required to protect LTE transmission between the LTE and 5G resources, signaling to the 5G terminal may be made when the guard band is set, and the 5G terminal may receive the signal to receive the 5G control information and the reference signal or the data information from the 5G resource except for the guard band. The base station and terminal procedures illustrated in FIGS. 15 to 20B may be applied for the division in the frequency resource.

On the other hand, in the uplink subframe 2610 configured for the 5G uplink and downlink transmission, all fourteen OFDM symbols may be used for the 5G transmission 2630. Therefore, for the 5G uplink and downlink transmission 2630, the 5G uplink and downlink transmission should be performed according to the start of the first OFDM symbol. In the present disclosure, an embodiment for allowing the 5G terminal to receive 5G uplink and downlink 2630 or 2640 will be described.

The first embodiment instructs the terminal to acquire information about a start point of the 5G uplink and downlink transmission or the 5G uplink and downlink transmission interval for the transmission/reception of the 5G uplink and downlink transmission 2630 or 2640, so the terminal knows the timing and the interval where the 5G uplink and downlink transmission is performed. That is, the 5G terminal should acquire the start point at which the 5G uplink transmission 2630 or 2640 is performed in synchronization with the start of the first OFDM symbol. In the above description, a reference signal for receiving a downlink control channel or a 5G downlink control channel for the 5G, a reference signal for the reception of the 5G downlink control channel, or a reference signal for other purposes may be transmitted at the start point where the 5G uplink and downlink transmission 2630 or 2640 is performed.

When the uplink subframe 2610 and the MBSFN subframe 2620 are used for 5G transmission in the TDD 2600 and the TDD UL-DL configuration is changed every radio frame by the eIMTA, the 5G base station should instruct the terminal through the signal transmission to know whether the resource configured for the 5G transmission is the UL subframe or the MBSFN subframe. That is, the terminal determines the start point of the 5G transmission by acquiring the signal indicating the information by receiving the notification on whether the resource configured for the 5G transmission starts from the first OFDM symbol, starts from the second OFDM symbol, or starts from the third OFDM symbol, and may perform the 5G control channel, the 5G reference signal, and the 5G data reception according to the 5G frame structure based on the start point.

The second embodiment is to set two OFDM symbols used for LTE CRS and LTE control channel transmission as reserved resources or blank resources to transmit/receive the 5G uplink and downlink transmission 2630 or 2640. In this case, two methods can be applied.

The first method is to apply rate matching for the 5G downlink control channel and the 5G reference signal. That is, the 5G terminal should know the fact (rate matching) that the 5G downlink control channel and the 5G reference signal are not transmitted from the resource corresponding to the two OFDM symbols configured as the reserved resource or the blank resource but is transmitted from the third OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are rate matched, and detects the 5G downlink control channel and the 5G reference signal from the third OFDM symbol. Alternatively, the terminal may perform the rate matching operation as previously determined for each 5G transmission signal. That is, the resources for the 5G downlink control channel and the 5G reference signal positioned in the reserved resource or the blank resource may be previously determined to perform the rate matching. As a result, the 5G terminal transmits the 5G downlink control channel and the 5G downlink control channel from the resources configured for the 5G downlink control channel and the 5G reference signal by determining that the 5G downlink control channel and the 5G reference signal are transmitted from the resource configured for the remaining 5G downlink control channel and 5G reference signal excluding the overlapping resource with the reserved resource or the blank resource. As a result, resources for the 5G downlink control channel transmission become small, so that only a part (e.g., 4 and 8) of CCE aggregation levels may be set to be decoded by the terminal.

The second method is to apply puncturing for the 5G downlink control channel and the 5G reference signal. That is, the 5G terminal should know the fact (puncturing) that the 5G downlink control channel and the 5G reference signal are not transmitted from the resource corresponding to the two OFDM symbols configured as the reserved resource or the blank resource and the 5G downlink control channel and the 5G reference signal is transmitted from the first OFDM symbol. Therefore, the 5G terminal receives the reserved resource or the blank resource setting from the higher signal or the physical signal, receives from the higher signal or the physical signal information indicating that resources for the 5G downlink control channel and the 5G reference signal positioned in the reserved resource or the blank resource are punctured, and detects the 5G downlink control channel and the 5G reference signal from the first OFDM symbol. Alternatively, the terminal may perform the puncturing operation as previously determined for each 5G transmission signal. That is, the resources for the 5G downlink control channel and the 5G reference signal positioned in the reserved resource or the blank resource may be previously determined to perform the puncturing. As a result, the 5G terminal determines that the 5G downlink control channel and the 5G reference signal are transmitted from the first OFDM symbol, so the overlapping resource with the reserved resource or the blank resource maps a received signal value to 0 and the resource configured for the 5G downlink control channel and the 5G reference signal other than the overlapping resource with the reserved resource or the blank resource maps the received values to receives the 5G downlink control channel and the 5G reference signal. As a result, the resource for the 5G downlink control channel transmission is not reduced, but may be used for the terminal when the received channel state is good.

A signal indicating whether the 5G signal is rate-matched or punctured in the reserved resource or the blank resource is transmitted to the 5G terminal by one field, for example, 1-bit information, which may in turn be received by the 5G terminal.

The third embodiment sets, in the terminal, the downlink control channel for the 5G system to transmit/receive the 5G uplink and downlink transmission 2630 or 2640 or the OFDM symbol position at which the reference signal for receiving the 5G downlink control channel or the reference signal for other purposes is transmitted and knows the time when the terminal performs the 5G downlink transmission from the information. That is, the 5G terminal receives from the higher signal that the downlink control channel or the 5G reference signal for the 5G is transmitted in the third OFDM symbol. In this case, the downlink control channel or 5G reference signal for the 5G may be transmitted to the OFDM symbol configured to transmit the 5G downlink control channel and the OFDM symbol from the third OFDM symbol.

All of the above embodiments can be used by the base station according to the channel state of the terminal. For example, if the channel state of the terminal is good, the second embodiment may be applied to the terminal, and if the channel state of the terminal is poor, the first and third embodiments may be applied to the terminal. In a case where another embodiment is applied to the terminal according to the state of each channel, the terminal receives the setting according to each embodiment from the base station and performs the terminal operation in each embodiment according to the signal received from the base station.

In addition, as described with reference to FIG. 15 or 17, if the terminal has both the LTE transmission/reception module and the 5G transmission/reception module, it can receive the PCFICH of the LTE system from the base station and acquire the starting OFDM symbol of the 5G transmission. For example, if the PCFICH indicates that the downlink control channel transmission interval of the LTE system is up to the second OFDM symbol, the terminal may acquire starting the transmission for the 5G system from the third OFDM symbol.

Although the example in which the two OFDM symbols at the head part among the fourteen OFDM symbols configuring the MBSFN subframe are used for the CRS and control channel transmission for the LTE terminal is described, an example in which one OFDM symbol at the head part is used for the CRS and control channel transmission for the LTE terminal can be applied. In this case, thirteen OFDM symbols are used for the 5G transmission.

In FIGS. 27A and 27B, when the uplink subframe #2 2610 and the MBSFN subframe #4 2620 are used for the 5G data transmission 2630 or 2640, the 5G base station and the 5G terminal procedures of changing the start point according to which subframe the configured 5G resource is will be described. The specific procedure for the 5G data transmission/reception follows the procedures of the base station and the terminal described with reference to FIGS. 15 to 20B.

FIG. 27A is a diagram illustrating the 5G base station procedure.

In operation 2700, the 5G base station transmits the synchronization signal and the system information for the 5G system from the resource configured for the 5G transmission to the 5G capable terminal. The synchronization signal for the 5G system may always be designed to be transmitted from the third OFDM. Therefore, in order to obtain the synchronization and system information for the 5G system, it is possible to eliminate the influence on whether the subframe for 5G transmission starts from the first OFDM symbol, starts from the second OFDM symbol, or starts from the third OFDM symbol. Meanwhile, a separate synchronization signal may be transmitted for the eMBB, mMTC, URLLC using different numerologies as the synchronization signal for the 5G system, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 2710, the 5G base station transmits a signal indicating 5G resource allocation to the 5G terminal. When the 5G resource allocation signal is transmitted to the 5G capable terminal, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE or/and 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may include whether the 5G resource starts from the first OFDM symbol, starts from the second OFDM symbol, or starts from the third OFDM symbol, and determines from what number of the OFDM symbols the 5G downlink control channel or 5G reference signal is transmitted. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally acquired by the 5G capable terminal and a value for the difference from the LTE synchronization with the 5G synchronization may be transmitted by the 5G base station.

If there is the integrated controller, when the LTE system and the 5G system are operated at different resources by dividing resources, the integrated controller 1960 selects the allocation of the time resource of the LTE system and the 5G system and transmits the allocation information to the base station by the X2, thereby distinguishing the resources of the LTE system and the 5G system. If there is no integrated controller, as in the base station procedure of FIG. 17, the LTE base station or the 5G base station may select the LTE or 5G resource allocation and transmit the selected LTE or 5G resource allocation to another base station.

In operation 2720, the 5G base station transmits/receives the data, the control information, and the reference signal for the 5G service based on the frame structure according to the position (e.g., whether the OFDM symbol from which the 5G transmission starts is the first OFDM symbol, the second OFDM symbol, or the third OFDM symbol) at which the 5G resource starts from the 5G capable terminal and the 5G resource or the 5G resource size (e.g., whether the 5G transmission is transmitted over fourteen OFDM symbols, thirteen OFDM symbols, or twelve OFDM symbols).

FIG. 27B is a diagram illustrating the 5G terminal procedure.

In operation 2750, the 5G terminal acquires the synchronization and system information for the 5G system from the 5G base station. The synchronization signal for the 5G system may always be designed to be transmitted from the third OFDM. Therefore, in order to obtain the synchronization and system information for the 5G system, it is possible to eliminate the influence on whether the subframe for 5G transmission starts from the first OFDM symbol, starts from the second OFDM symbol, or starts from the third OFDM symbol. Meanwhile, the synchronization signal for the 5G system may be a separate synchronization signal for the eMBB, mMTC, URLLC using different numerologies, or may be a common synchronization signal to a specific 5G resource using one numerology. With the above system information, the common system signal may be transmitted to a specific 5G resource using one numerology, or separate system information may be transmitted for eMBB, mMTC, and URLLC using different numerologies.

In operation 2760, the 5G terminal receives a signal indicating 5G resource allocation from the 5G base station. The 5G resource allocation signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may include whether the 5G resource starts from the first OFDM symbol, starts from the second OFDM symbol, or starts from the third OFDM symbol, and determines from what number of the OFDM symbols the 5G downlink control channel or 5G reference signal is transmitted. Also, the 5G resource allocation signal may include offset information indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally acquired by the 5G capable terminal and a value for the difference from the LTE synchronization with the 5G synchronization may be received from the 5G base station.

In operation 2770, the 5G terminal determines the position (e.g., whether the OFDM symbol from which the 5G transmission starts is the first OFDM symbol, the second OFDM symbol, or the third OFDM symbol) at which the 5G resource starts from the 5G transmission resource or the 5G resource size (e.g., whether the 5G transmission is transmitted over fourteen OFDM symbols, thirteen OFDM symbols, or twelve OFDM symbols) occupied in on subframe based on the signal received in operation 2760, and transmits/receives the data and control information and reference signal for the 5G signal to and from the base station based on the frame structure according to the start position.

Figure 28A:
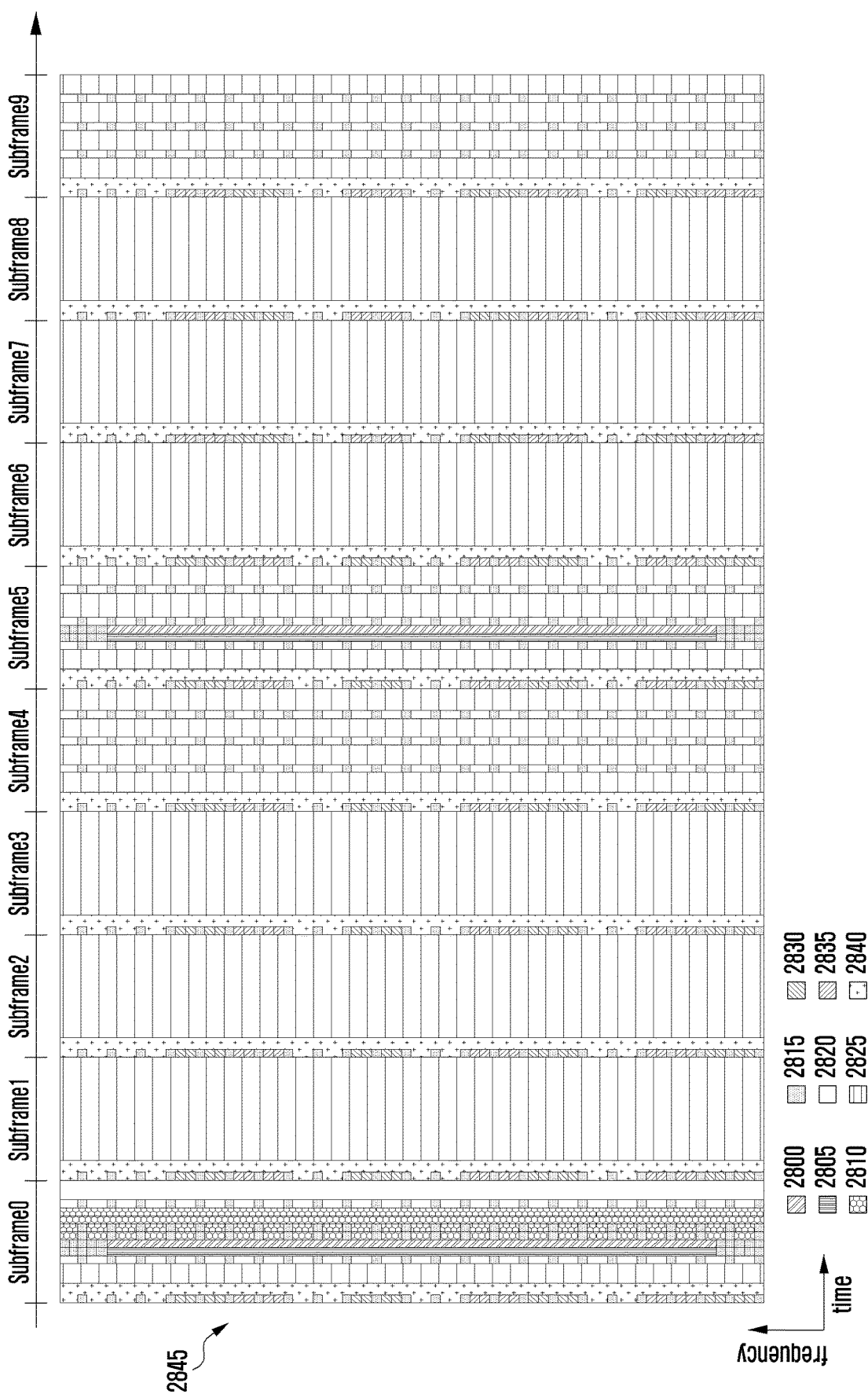
FIG. 28A is a diagram illustrating an example of performing new radio (NR) transmission according to various embodiments of the present disclosure.

FIG. 28A is a diagram illustrating an example of performing new radio (NR) transmission according to various embodiments of the present disclosure. In particular, FIG. 28A is a diagram illustrating an example of performing NR transmission using an MBSFN subframe as well as a general downlink subframe (i.e., non-MBSFN subframe) in the LTE system.

Reference numeral 2845 is a diagram illustrating a state in which downlink channels and downlink signals are transmitted in subframes in the LTE. Reference numeral 2845 illustrates a state in which the subframes 1, 2, 3, 6, 7, and 8 of the LTE are configured and operated as MBSFN subframes, and illustrates a state in which the remaining subframes 0, 4, 5, and 9 are operated as a non-MBSFN subframe. The subframe in which the MBSFN subframe is configured may be changed according to the operation of the LTE base station and the present embodiment may be applied regardless of the number or position of configured MBSFN subframes.

Reference numeral 2800 denotes a primary synchronization signal, reference numeral 2805 denotes a secondary synchronization signal, reference numeral 2810 denotes a PBCH, reference numeral 2830 denotes a PCFICH, reference numeral 2835 denotes a PHICH, reference numeral 2840 denotes a PDCCH, reference numeral 2815 denotes a CRS, reference numeral 2820 denotes a resource element (RE) which is not used for LTE transmission, and reference numeral 2825 denotes an RE of the OFDM symbols which may be utilized for the NR transmission. Reference numeral 2800, reference numeral 2805, reference numeral 2810, reference numeral 2830, reference numeral 2835, reference numeral 2840, reference numeral 2815, or the like are LTE channels or signals which are necessarily transmitted for an LTE terminal and are not affected by the NR transmission. Reference numeral 2820 denotes an RE to which LTE channels or LTE signals are not transmitted, but is a resource that may not be utilized for the NR transmission because LTE channels or LTE signals are transmitted to other REs of the same OFDM symbol. All REs of one OFDM symbol of reference numeral 2825 can perform the NR transmission in consideration of only OFDM symbols in which an LTE channel or an LTE signal is not transmitted.

Considering the above resources, the NR base station that is co-located with the LTE base station may acquire in real time the resource information that may be utilized for the NR transmission, that is, the position or the number of OFMD symbols of MBSFN subframes or non-MBSFN subframes by the method like the ideal backhaul transmission. The resource which may be utilized for the NR transmission or the resources which may not be utilized for the NR transmission may be represented in a time unit or a mini slot operated by the NR terminal or a time unit like the OFDM symbol to be configured in the NR terminal. The configuration is a reserved resource or resource for NR scheduling, and the configuration information is transmitted to the NR terminal by a higher signal or a physical signal. The NR terminal receives the higher signal to acquire frequency position of the resource which is utilized for the NR transmission or the resource which is not utilized for the NR transmission.

Figure 28B:
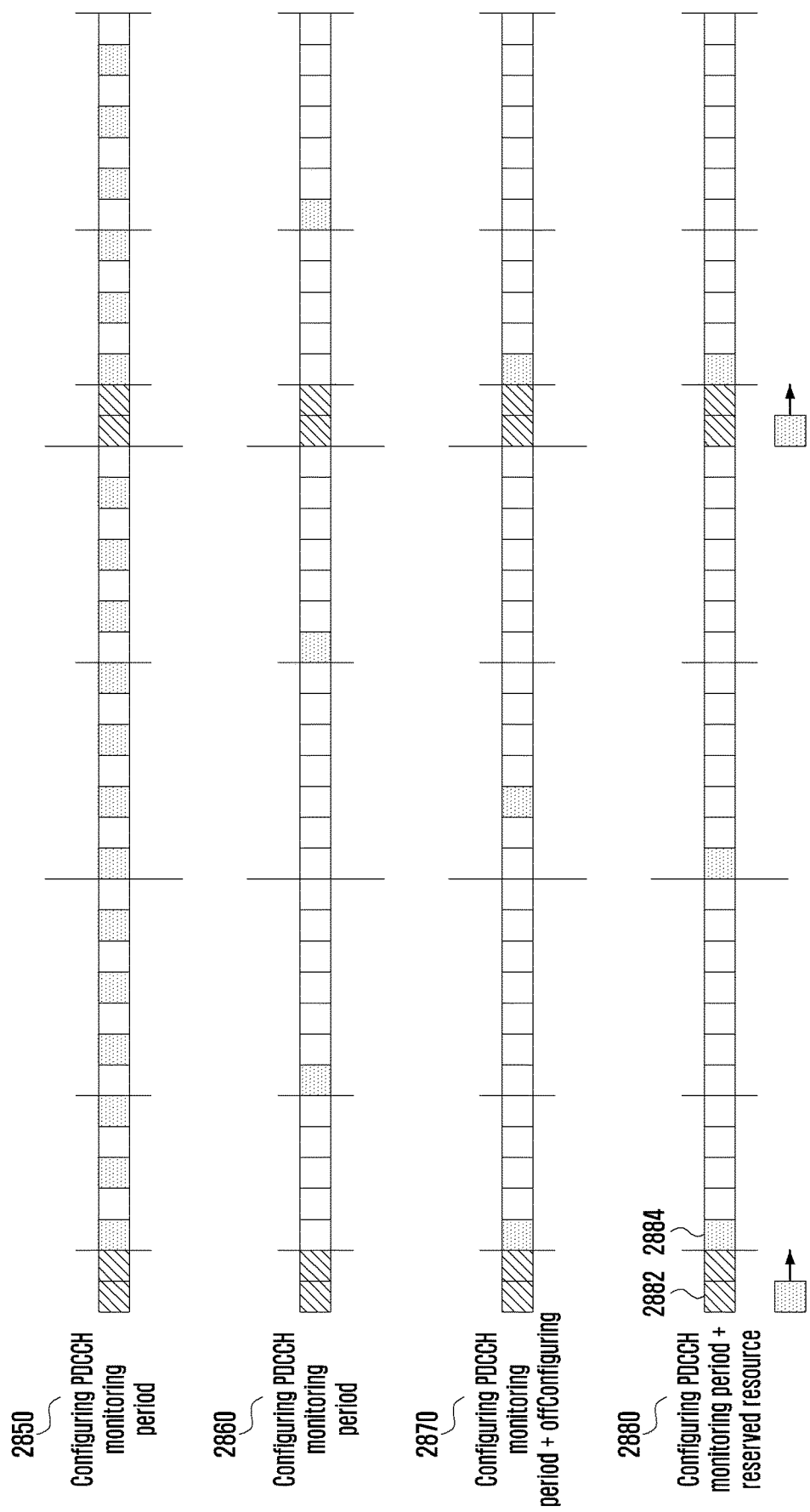
FIG. 28B is a diagram illustrating a method for scheduling and transmitting data to an NR terminal by the NR base station according to various embodiments of the present disclosure.

FIG. 28B is a diagram illustrating a method for scheduling and transmitting data to an NR terminal by the NR base station according to various embodiments of the present disclosure. Referring to FIG. 28B, a method for scheduling and transmitting data to an NR-type base station in a resource available for NR transmission, i.e., an MBSFN subframe or OFMD symbols of non-MBSFN subframes will be described with reference to each embodiment based on reference numerals 2850 to 2880.

Reference numeral 2850 is a first embodiment. Reference numeral 2850 denotes an example in which the NR base station configures a transmission period or a decoding period of an NR PDCCH that the NR terminal should monitor. In the above embodiment, the NR terminal attempts to decode the NR PDCCH at the corresponding position (or OFDM symbol) according to the period in which the NR PDCCH is transmitted. The NR PDCCH transmission period or the decoding period may be transmitted to the NR terminal by a higher signal, and the NR terminal may receive the higher signal to acquire the NR PDCCH transmission and decoding period.

Reference numeral 2860 is a second embodiment. Reference numeral 2860 denotes an example in which the NR base station configures a transmission period or a decoding period of an NR PDCCH that the NR terminal should monitor to be longer than the first embodiment.

Reference numeral 2870 is a third embodiment. Reference numeral 2870 denotes an example in which the NR base station configures a transmission period or a decoding period and an offset of an NR PDCCH that the NR terminal should monitor. In the above embodiment, the NR terminal attempts to decode the NR PDCCH at the corresponding position (or OFDM symbol) according to the period and the offset in which the NR PDCCH is transmitted. The NR PDCCH transmission period or the decoding period and the offset may be transmitted to the NR terminal by a higher signal, and the NR terminal may receive the higher signal to acquire the NR PDCCH transmission and decoding period and the offset.

Reference numeral 2880 is a fourth embodiment. Reference numeral 2880 denotes an example in which the NR base station configures a transmission period or a decoding period of an NR PDCCH that the NR terminal base station should monitor and avoids LTE channels and LTE signals that are essentially transmitted for the LTE terminals described in FIG. 28A based on the reserved resource configuration and the NR PDCCH decoding of the NR terminal is reduced. In the above embodiment, the NR terminal attempts to decode the NR PDCCH at the corresponding position (or OFDM symbol) according to the period and the offset in which the NR PDCCH is transmitted. If the OFDM symbol in which the NR PDCCH should be decoded is configured as the reserved resource, the NR terminal determines that the transmission of the NR PDCCH has been moved to the first OFDM symbol in which the reserved resource is not configured. In this embodiment, if two OFDM symbols 2882 represented by a red color are configured as the reserved resource for the NR terminal, the NR PDCCH transmission is shown to be transmitted from a third OFDM symbol 2884. The NR PDCCH transmission period or the decoding period and the offset may be transmitted to the NR terminal by a higher signal, and the NR terminal may receive the higher signal to acquire the NR PDCCH transmission and decoding period and the offset. The reserved resource configuration information may be transmitted to the NR terminal by the higher signal or the physical signal. The NR terminal may receive the higher signal or the physical signal to acquire the period or the time/frequency position of the reserved resource to determine that the NR PDCCH is transmitted in another OFDM symbol.

Each of the above embodiments may apply different values to different slots. That is, for example, when the third embodiment is applied, if it is operated as set 1 of specific slots (e.g., when NR is operated at 15 KHz, 1 ms (fourteen OFDM symbols)), for slots 2, 3, 4, 5, 6, 7, 12, 13, 14, 15, 16, and 17 corresponding to the MBSFN subframe, a period may be set to be 1 slot and an offset may be set to be three OFDM symbols, and if it is operated as set 2 (e.g., NR is 15 KHz, 1 ms (fourteen OFDM symbols)) of another specific slot, for slots 0, 1, 8, 9, 10, 11, 18, and 19 corresponding to a non-MBSFN subframe, a period may be set to be two OFDM symbols and an offset may be set to be two OFDM symbols. Therefore, the NR terminal may apply another NR PDCCH decoding offset or period to the slot set 1 and the slot set 2. The information on the set of the specific slots, and the like is transmitted from the NR base station by the higher signal, and the NR terminal may receive and acquire the signal. Other embodiments may also be set to be an upper level signal for the terminal to apply different values or different parameters to a specific slot and the terminal may receive the signal and apply different values or different parameters to different slots.

Also, in all of the above embodiments, after the NR terminal transmits a capability signal for NR PDCCH decoding to the base station, the NR base station sets parameter values (e.g., in the third embodiment, NR PDCCH decoding period and offset, and the like) according to each embodiment based on the capability signal to be the higher signal, and the NR terminal may receive the higher signal to perform decoding according to parameter values (e.g., in the third embodiment, decoding period and offset) for the NR PDCCH.

Figure 29:
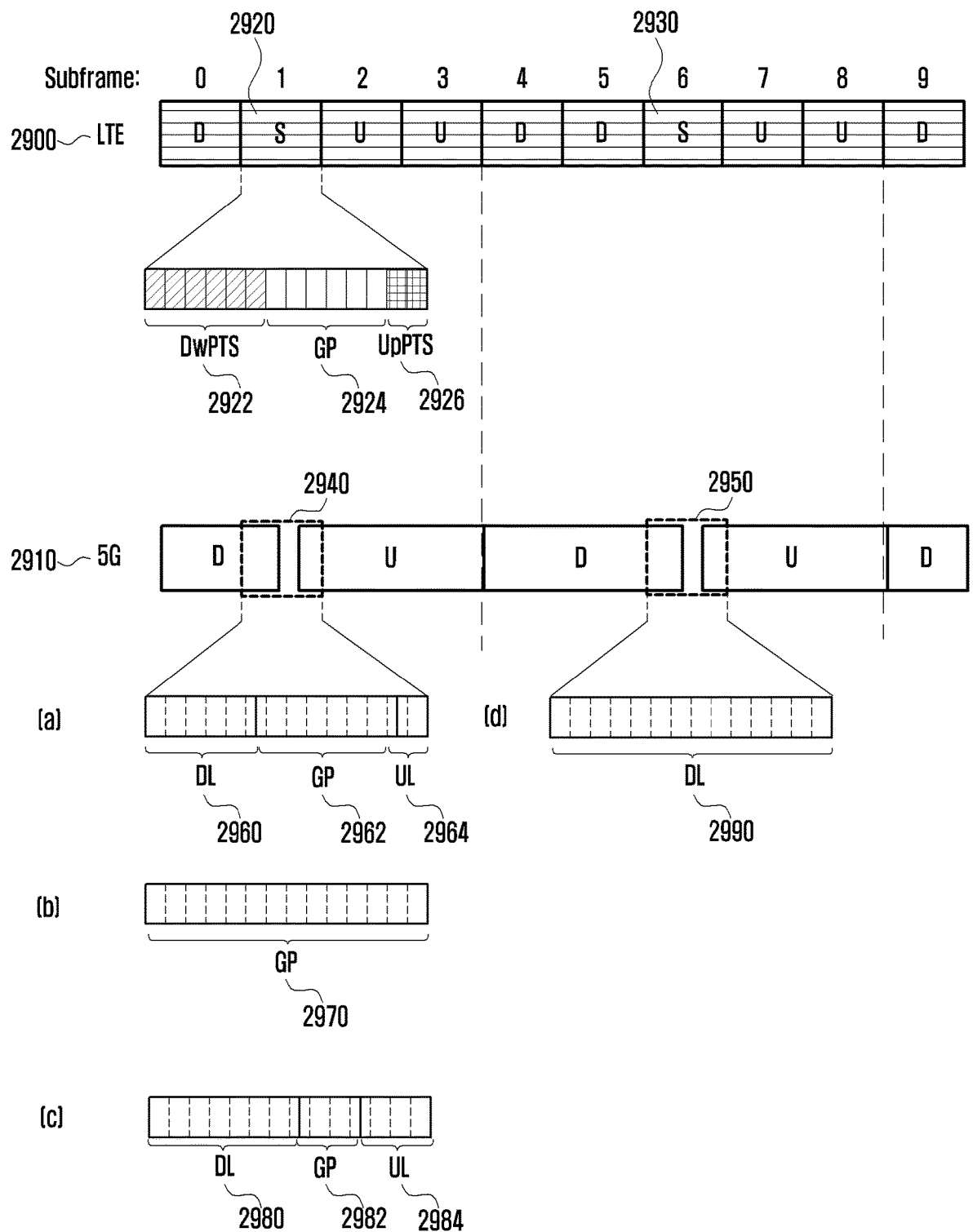
FIG. 29 is a diagram illustrating that the LTE base station and the 5G base station independently operate each LTE transmission/reception and 5G transmission/reception without dividing resources in one LTE TDD carrier into time or frequency according to various embodiments of the present disclosure.

FIG. 29 is a diagram illustrating that the LTE base station and the 5G base station independently operate each LTE transmission/reception and 5G transmission/reception without dividing resources in one LTE TDD carrier into time or frequency according to various embodiments of the present disclosure. When the LTE base station and the 5G base station independently operate each transmission/reception, the interference problem should be considered. Interference (i.e., interference between the LTE downlink transmission and the 5G downlink transmission, or interference between the LTE uplink transmission and the 5G uplink transmission) is similar to the interference problem between the LTE base stations, and the LTE base station or the 5G base station can be solved by implementing the interference problem. However, there is a need for a method for eliminating interferences (i.e., interference between the LTE downlink transmission and the 5G uplink transmission or interference between the LTE uplink transmission and the 5G downlink transmission) between the LTE base station and the 5G base station in different directions. A method for eliminating interference in the present disclosure is provided.

FIG. 29 illustrates that an LTE base station 2900 and a 5G base station 2910 each operate TDD, in which TDD information (carrier frequency BW and position information, TDD UL-DL configuration information, TDD special subframe configuration information, dynamic TDD UL-DL configuration for eIMTA, or the like) each base station may be transmitted from the 5G base station to the 5G capable terminal, and the 5G capable terminal may acquire the information through the synchronization acquisition and the system information reception. The LTE base station 2900 operates transmission/reception according to the TDD UL-DL configuration, and the 5G base station 2910 performs the uplink and downlink transmission based on the TDD UL-DL configuration operated by the LTE base station 2900. That is, in the subframes #0, #4, #5 and #9 operated downward by the LTE base station 2900, the 5G base station 1910 also operates downward resources of the same frequency and the 5G base station 2910 also operates upward the same frequency resource in the operating subframes #2, #3, #7, and #8 in which the LTE base station 2900 operates upward. By the above method, the LTE base station and the 5G base station can eliminate the interference problem due to transmission in the other direction. The 5G terminal acquires information on whether the 5G base station 2910 operates upwards or downwards through a signal from the 5G base station and may know the uplink and downlink resource operation information of the 5G base station through the information.

Meanwhile, in the LTE UL-DL configuration, a special subframe 2920 or 2930 exists. The special subframe 2920 or 2930 includes a DwPTS 2922 in which downlink transmission is performed, a GP 2924 for a propagation delay time and a terminal RF switching delay time, and an UpPTS 2926 in which the uplink transmission is performed. When the 5G base station operates the same frequency resource (2940 or 2950) in subframes #1 and #6 in which the LTE base station operates the special subframe, a method for eliminating an interference problem in different directions to the LTE base station is required.

If LTE transmission and 5G transmission have the same numerology, for example, when 15 kHz subcarrier spacing in the LTE is also used for the 5G transmission, the 5G base station may perform the downward transmission in six OFDM symbols in which the LTE base station is operated by the DwPTS 2922 and the LTE base station may perform the uplink transmission in the two OFDM symbols operated by the UpPTS 2926. If the LTE transmission and the 5G transmission have different numerologies, for example, if subcarrier spacing greater than 15 kHz is used in a 5G system, or if a shorter transmission time instance (TTI) is used, the method based on the first to fourth embodiments of FIG. 29 is provided.

In a first embodiment of FIG. 29, the 5G base station performs the downlink transmission in a resource 2960 in a duration of the DwPTS 2922, the uplink transmission in a resource 2964 in a duration of the UpPTS 2926 interval, and a GP 2962 between the resource 2960 and the resource 2964. Since the LTE transmission and the 5G transmission have different numerologies, the TTI is different. Therefore, the downlink transmission is performed (2964) so as not to exceed the duration of the DwPTS 2922 according to the TTI in which the 5G transmission may be performed, and the uplink transmission is performed (2964) so as not to exceed the time when the UpPTS 2926 ends according to the TTI in which the 5G transmission may be performed.

In a second embodiment of FIG. 29, the 5G base station does not perform any transmission in a subframe operated as a special subframe by the LTE base station (2970). The subframe may be used as a resource to be reserved for future services.

In a third embodiment of FIG. 29, the 5G base station performs the downlink transmission in a resource 2980 exceeding the duration of the DwPTS 2922 interval, the uplink transmission in the resource 2984 exceeding the duration of the UpPTS 2926, and a GP 2982 between the resource 2980 and the resource 2984, within a range in which the interference in different directions has an effect on the LTE base station. If the cell coverage is smaller than that of LTE, the 5G base station may perform the uplink and downlink transmission with more resources based on the above method.

In a fourth embodiment of FIG. 29, if the LTE base station uses a special subframe as a downlink subframe through the eIMTA, the 5G base station can use the entire special subframe 2930 for downlink transmission 2990.

In the first, second, third, and fourth embodiments of FIG. 29, the 5G base station transmits information on an interval in which the downlink transmission is performed and an interval in which the uplink transmission is performed to a 5G terminal through a signal. The 5G terminal receives the signal and acquires the information, thereby knowing whether the TDD frequency resource is operated downward or upward.

As the arrangement of the LTE base station and the 5G base station in the TDD frequency resource, the arrangement illustrated in FIGS. 15 to 20B may be applied, and the base station and the terminal procedure illustrated in FIGS. 15 to 20B may be applied.

Figure 30A:
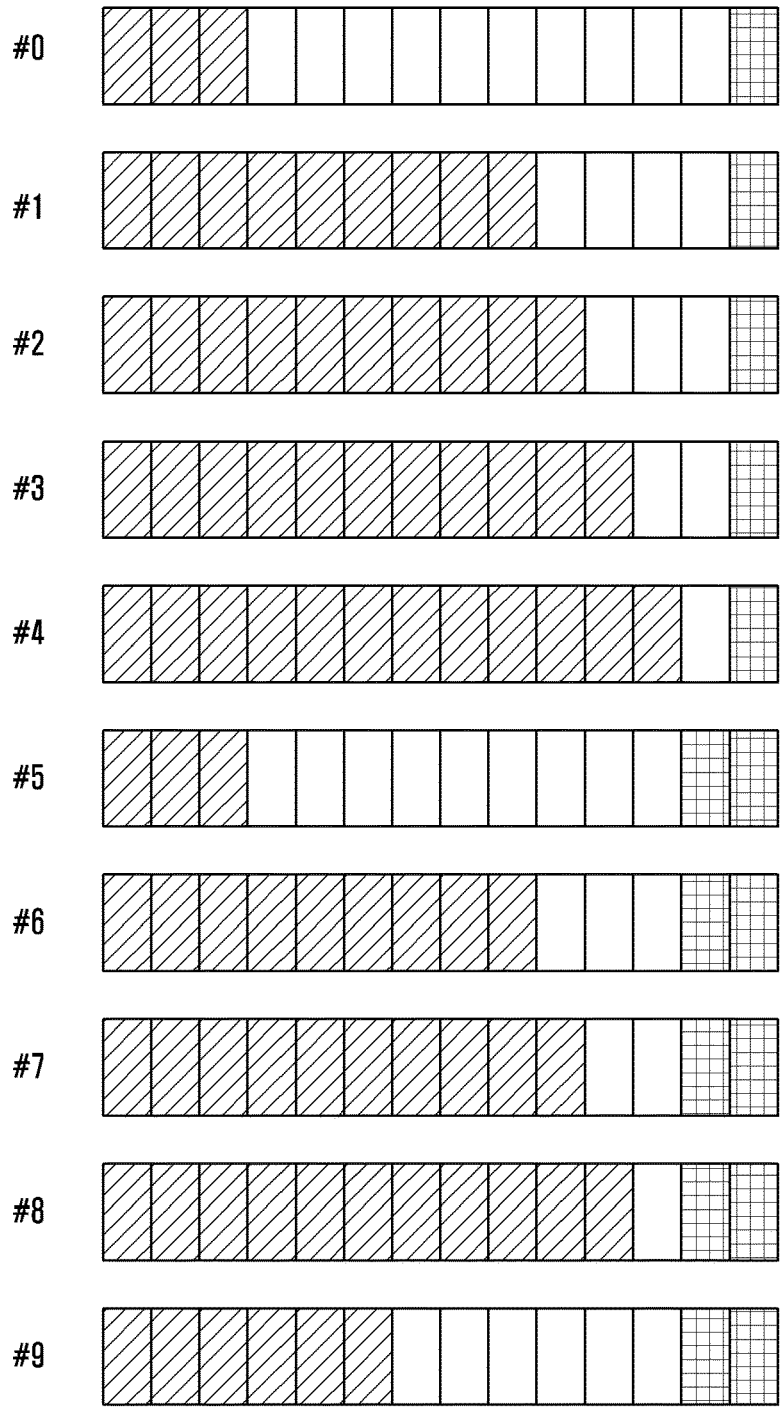
FIGS. 30A and 30B are diagrams illustrating a special subframe configuration in the LTE according to various embodiments of the present disclosure.
Figure 30B:
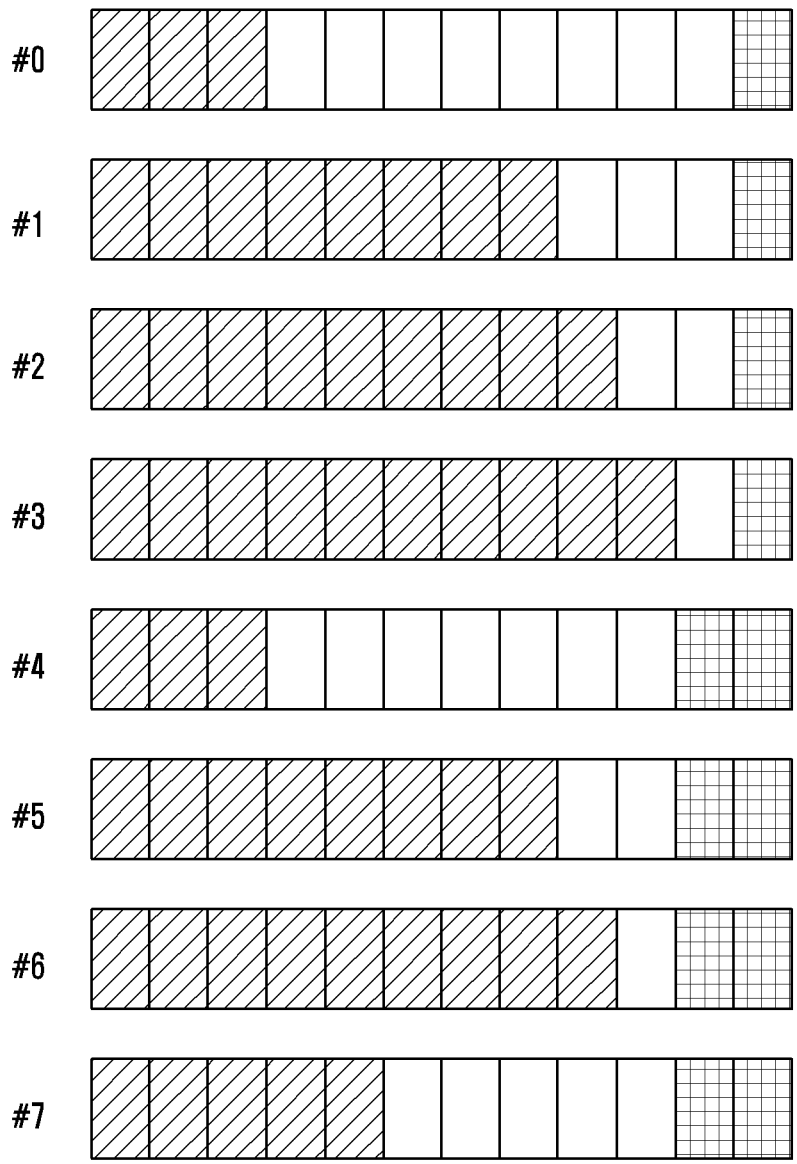
Figure 30B:
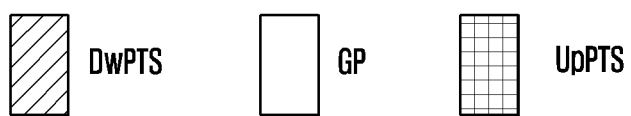

FIGS. 30A and 30B are diagrams illustrating a special subframe configuration in the LTE according to various embodiments of the present disclosure.

The special subframe configuration in which the lengths of DwPTS, the GP, and the UpPTS of the special subframe defined in the LTE are defined is determined as ten special subframe configurations (3000 of FIG. 30A) and eight special subframe configurations (3010 of FIG. 30B), respectively, according to whether the cyclic prefix applied in the downlink is a normal cyclic prefix or an extended cyclic prefix. The terminal may acquire whether the cyclic prefix applied in the downlink is a normal cyclic prefix or an extended cyclic prefix by decoding the synchronization signal received in the cell, or the like. If it is determined that the cyclic prefix is a normal cyclic prefix in each special subframe of the TDD operated by the LTE base station of FIG. 29, one of the ten special subframe configurations 3000 is selected according to the cell coverage and if the cyclic prefix is an extended cyclic prefix, one of the eight special subframe configurations 3010 is selected according to the cell coverage. When the LTE base station performs the LTE transmission with the above-mentioned selected special subframe configuration, the 5G base station transmits signaling for 5G resources to the 5G terminals according to the embodiment of FIG. 29 in order to not affect the LTE transmission and the 5G terminals receive the signaling and know resources for the 5G downlink transmission and uplink transmission.

Figure 31A:
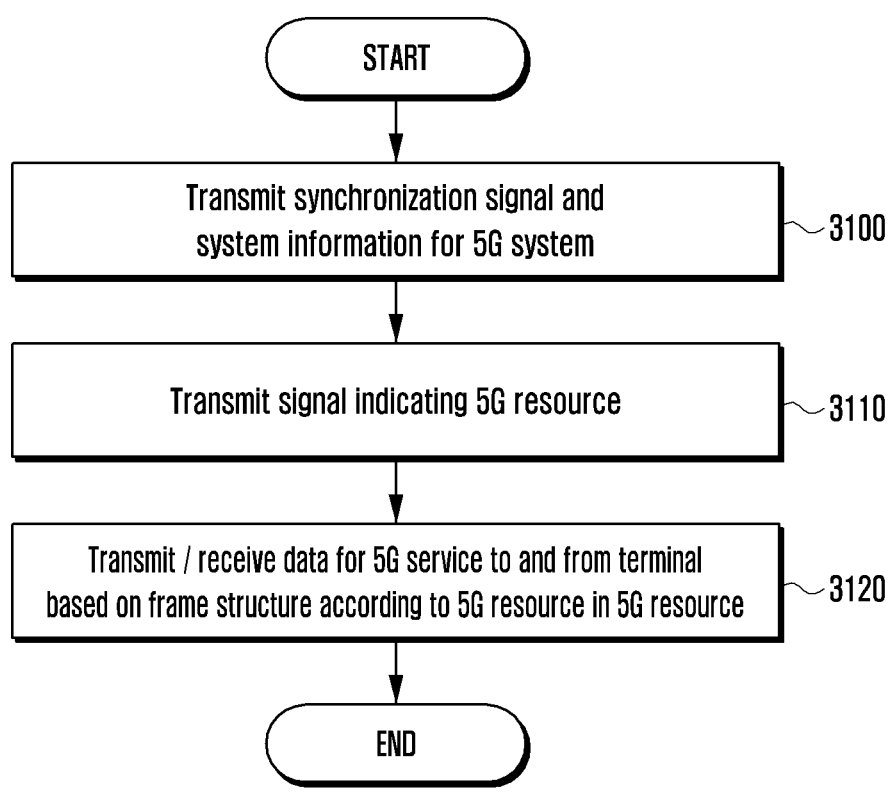
FIGS. 31A and 31B are diagrams illustrating base station and terminal procedures illustrated in FIG. 29 according to various embodiments of the present disclosure.
Figure 31B:
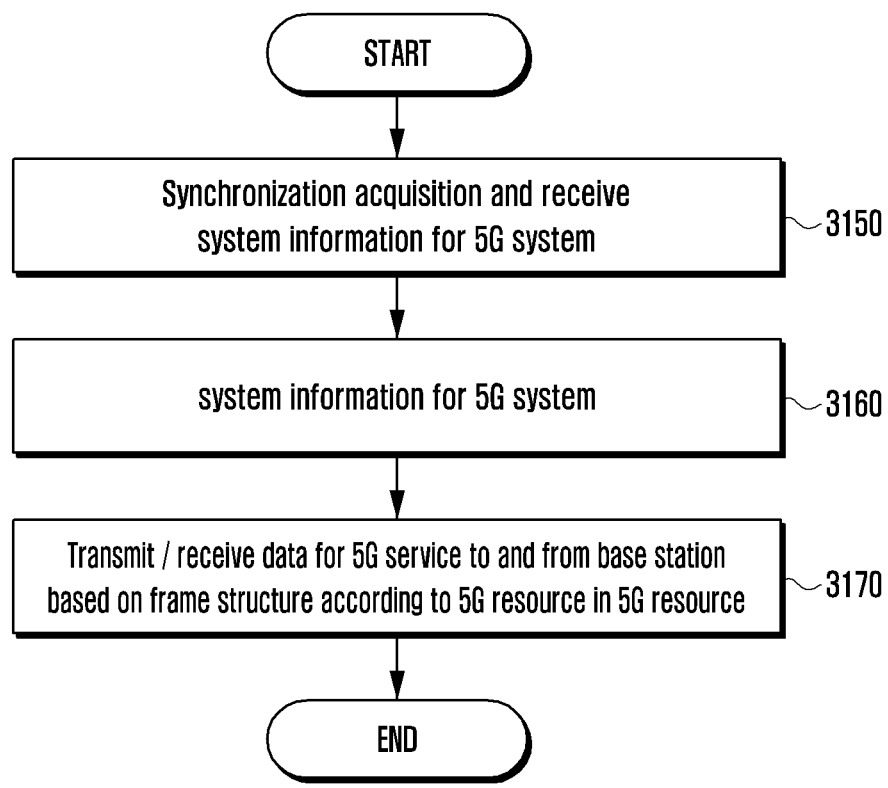

FIGS. 31A and 31B are diagrams illustrating base station and terminal procedures illustrated in FIG. 29 according to various embodiments of the present disclosure.

FIG. 31A is a diagram illustrating the 5G base station procedure.

In operation 3100, the 5G base station transmits the synchronization signal and the system information for the 5G system from the resource configured for the 5G transmission to the 5G capable terminal. A separate synchronization signal may be transmitted for the eMBB, mMTC, URLLC using different numerologies as the synchronization signal for the 5G system, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 3110, the 5G base station transmits a signal indicating 5G resource allocation to the 5G terminal. When the 5G resource allocation signal is transmitted to the 5G capable terminal, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE/5G resource depending on the reference signal or the synchronization signal transmission, and the like. In addition, the 5G resource allocation signal may include whether the 5G resource illustrated in FIGS. 29, 30A, and 30B is the LTE special subframe. Also, the 5G resource allocation signal may be a signal indicating where the 5G uplink transmission starts and ends, and where the 5G downlink transmission starts and ends in the 5G uplink transmission according to FIG. 29 and FIGS. 30A and 30B. The synchronization information in the LTE system may be additionally acquired by the 5G capable terminal and a value for the difference from the LTE synchronization with the 5G synchronization may be transmitted by the 5G base station.

If there is the integrated controller, when the LTE system and the 5G system are operated at different resources by dividing resources, the integrated controller 1960 selects the allocation of the time resource of the LTE system and the 5G system and transmits the allocation information to the base station by the X2, thereby distinguishing the resources of the LTE system and the 5G system. If there is no integrated controller, as in the base station procedure of FIG. 17, the LTE base station or the 5G base station may select the LTE or 5G resource allocation and transmit the selected LTE or 5G resource allocation to another base station.

In operation 3120, the 5G base station transmits and receives data, control information, and reference signals for the 5G service based on the position at which the 5G uplink and downlink transmission starts and ends in the 5G capable terminal and the 5G resource.

FIG. 31B is a diagram illustrating the 5G terminal procedure.

In operation 3150, the 5G terminal acquires the synchronization and system information for the 5G system from the 5G base station. A separate synchronization signal may be transmitted for the eMBB, mMTC, URLLC using different numerologies as the synchronization signal for the 5G system, or a common synchronization signal may be transmitted to a specific 5G resource using one numerology. With the above system information, the common system signal may be transmitted to a specific 5G resource using one numerology, or separate system information may be transmitted for eMBB, mMTC, and URLLC using different numerologies.

In operation 3160, the 5G terminal receives a signal indicating 5G resource allocation from the 5G base station. The 5G resource allocation signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. In addition, the 5G resource allocation signal may include whether the 5G resource is the LTE special subframe illustrated in FIGS. 29, 30A, and 30B. Also, the 5G resource allocation signal may be a signal indicating where the 5G uplink transmission starts and ends, and where the 5G downlink transmission starts and ends in the 5G uplink transmission according to FIG. 29 and FIGS. 30A and 30B. The synchronization information in the LTE system may be additionally acquired by the 5G capable terminal and a value for the difference from the LTE synchronization with the 5G synchronization may be received from the 5G base station.

In operation 3170, the 5G terminal transmits/receives data, control information, and reference signals for the 5G service to and from the base station based on the 5G resource size determined based on the position at which the 5G uplink and downlink transmission starts and ends from the signal received in operation 3160.

Figure 32:
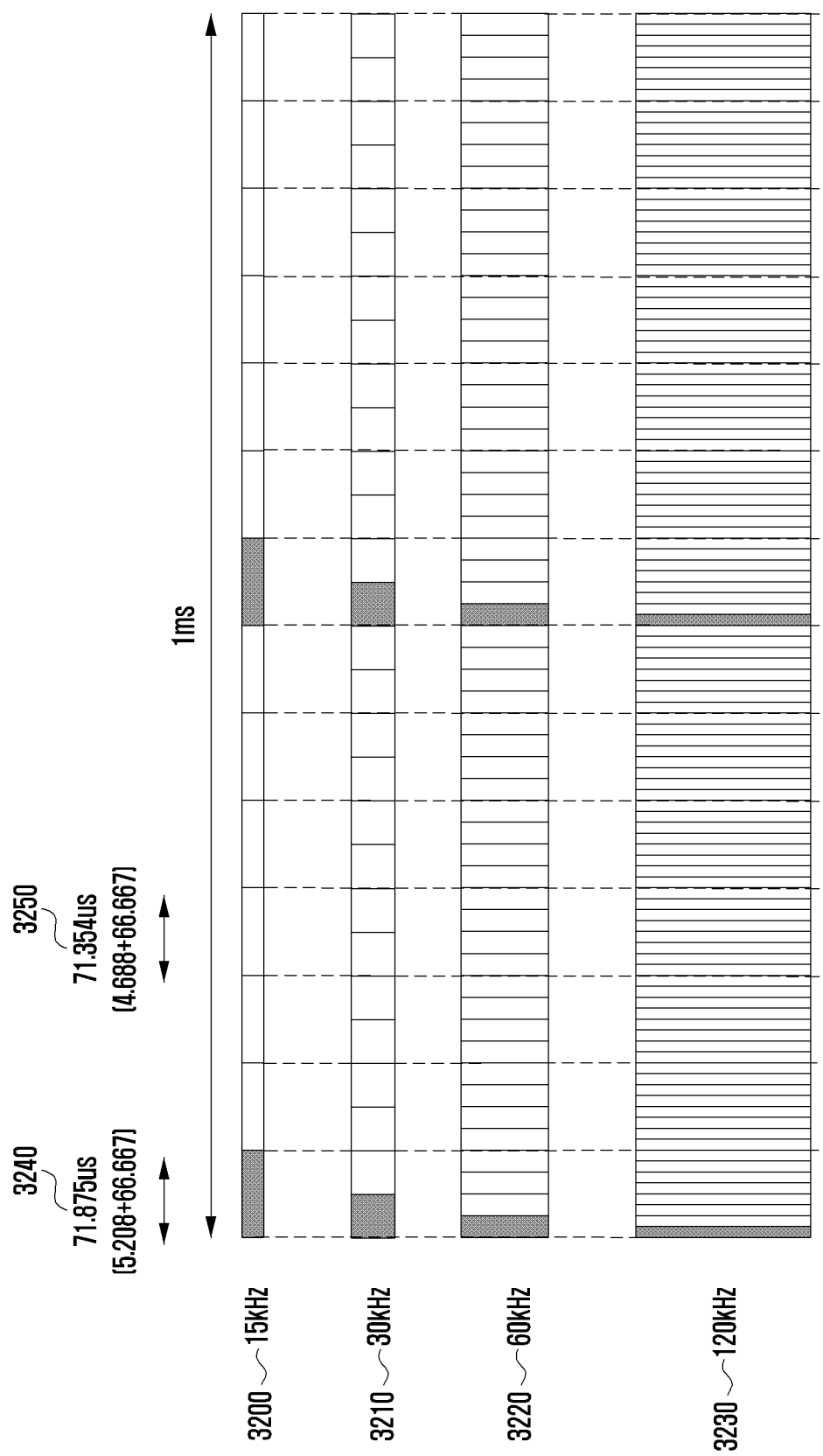
FIG. 32 is a diagram for explaining that OFDM symbol lengths of frame structures based on various numerologies are aligned (matched) according to various embodiments of the present disclosure.

FIG. 32 is a diagram for explaining that OFDM symbol lengths of frame structures based on various numerologies are aligned (matched) according to various embodiments of the present disclosure.

Because different numerologies, in particular, different subcarrier spacings between 5G system services should be supported, different numerologies may be multiplexed in time or frequency within a single carrier. At this time, as the subcarrier spacing increases, the OFDM symbol length becomes shorter. Therefore, if a service having different subcarrier spacings is supported, the slot or subframe length may be changed according to the number of OFDM symbols. In this case, all resources may not be used or an interference problem occurs when coexisting with LTE system, which leads to a problem in efficiently using resources. Therefore, even in the case of having different carrier intervals, it is necessary to adjust the OFDM symbol length so as to match the OFDM symbol length according to 15 KHz used in the LTE.

In the LTE system, since the first OFDM symbol is designed to have a longer cyclic prefix than the remaining six OFDM symbols every slot, in order to match the OFDM symbol length according to 15 KHz, the cyclic prefix of the first OFDM symbol every 0.5 ms of different subcarrier spacings should be adjusted to fit the length of the first OFDM symbol every 0.5 ms at 15 KHz.

In FIG. 32, reference numeral 3200 denotes an OFDM symbol length at 15 KHz, and the first OFDM symbol has a length of 71.875 μs 3240 including a cyclic prefix of 5.208 μs and the remaining six OFDM symbols have the same length as a length of 71.354 μs 3250 including a cyclic prefix of 4.688 μs.

In FIG. 32, reference numeral 3210 illustrates how OFDM symbols at 30 KHz are configured to match 15 KHz OFDM symbols. At 30 KHz, the number of OFDM symbols doubles to 15 KHz, and the OFDM symbol length decreases by half. At this time, if the cyclic prefix of the first OFDM symbol is set to be 5.208−4.688/2=2.865 us every 0.5 ms, the length of every one OFDM symbol of 15 KHz and the length of every two OFDM symbols of 30 KHz are matched.

In FIG. 32, reference numeral 3220 illustrates how OFDM symbols at 60 KHz are configured to match 15 KHz OFDM symbols. At 60 KHz, the number of OFDM symbols doubles to 30 KHz, and the OFDM symbol length decreases by half. At this time, if the cyclic prefix of the first OFDM symbol is set to be 2.865−2.344/2=1.693 μs every 0.5 ms, the length of every one OFDM symbol of 15 KHz and the length of every two OFDM symbols of 60 KHz are matched with each other.

In FIG. 32, reference numeral 3230 illustrates how OFDM symbols at 120 KHz are configured to match 15 KHz OFDM symbols. At 120 KHz, the number of OFDM symbols doubles to 60 KHz, and the OFDM symbol length decreases by half. At this time, if the cyclic prefix of the first OFDM symbol is set to be 1.693−1.172/2=1.107 μs every 0.5 ms, the length of every one OFDM symbol of 15 KHz and the length of every two OFDM symbols of 120 KHz are matched with each other.

In the same manner, 15 KHz and OFDM symbol length may be matched in the case of having a longer subcarrier spacing.

Figure 33A:
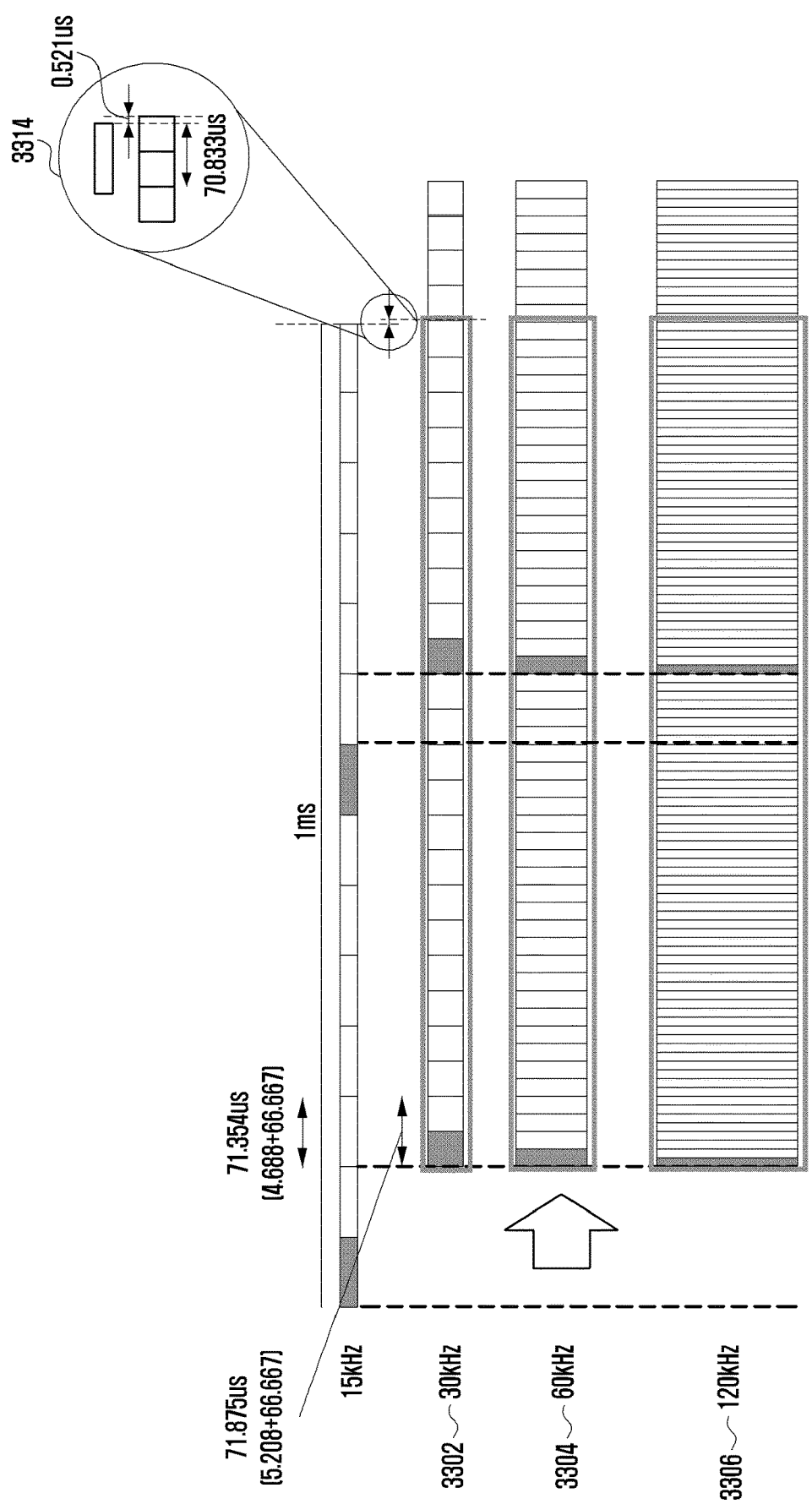
FIGS. 33A and 33B are diagrams for explaining a frame structure required for performing 5G transmission through a MBSFN subframe in a frame structure based on various numerologies according to various embodiments of the present disclosure.
Figure 33B:
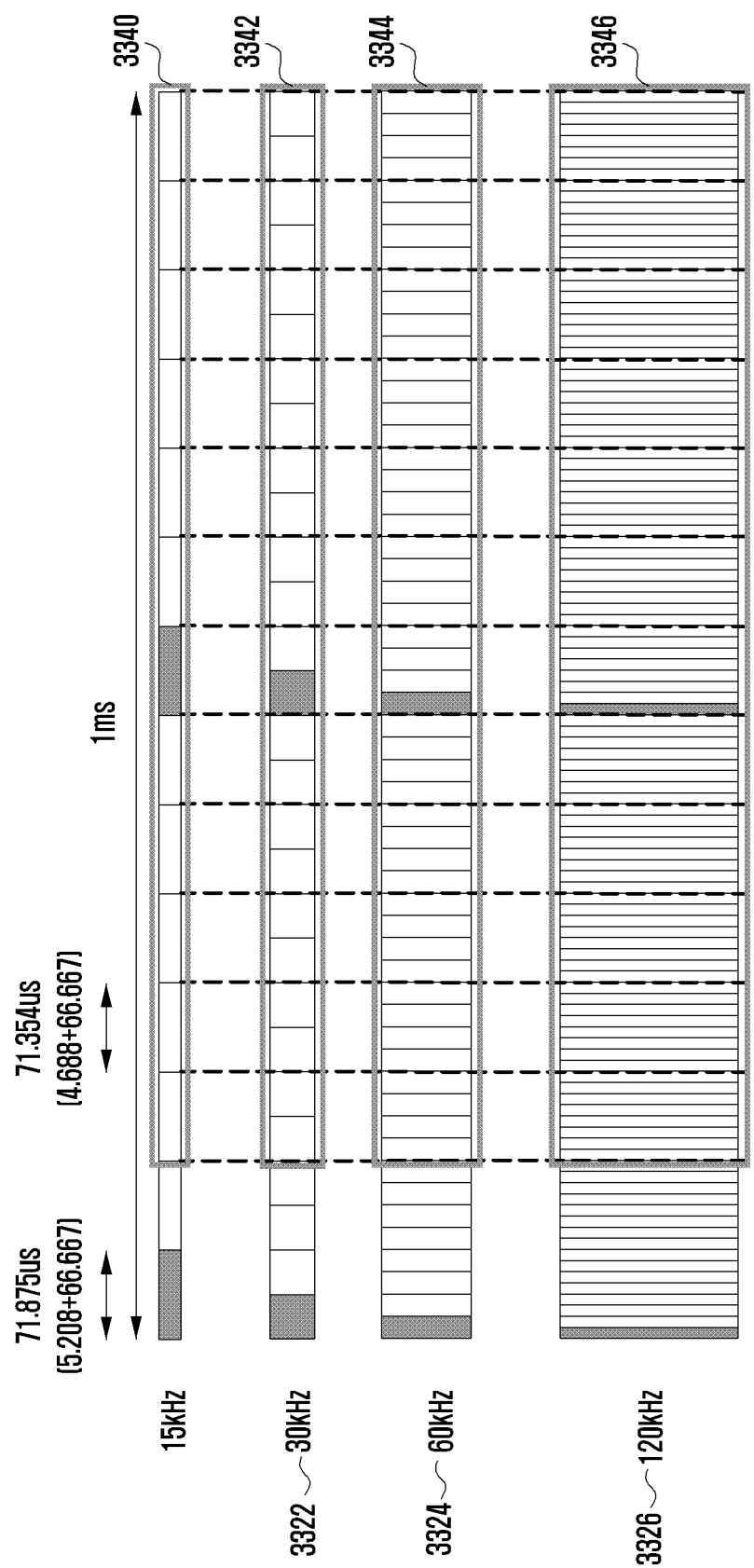

FIGS. 33A and 33B are diagrams illustrating a frame structure required for performing 5G transmission through a MBSFN subframe in a frame structure based on various numerologies according to various embodiments of the present disclosure.

Referring to FIGS. 33A and 33B, when the OFDM symbol length at 15 KHz is matched with the length of the OFDM symbols of different subcarrier spacings in the case of supporting various subcarrier spacings as illustrated in FIGS. 33A and 33B, the problem and the solution in the case in which the MBSFN subframe is used for coexistence of the LTE and NR systems will be described.

As described in FIG. 26 of the present disclosure, the MBSFN subframe in the LTE system may be available for the NR transmission. However, since the first two OFDM symbols are used for the PDCCH transmission in the LTE system, the NR system may be transmitted only in the remaining twelve OFDM symbol intervals. Therefore, the frame structure for performing the NR transmission from the third OFDM symbol is required, and the frame structure still has to be matched with OFDM symbols of 15 KHz. Since the first two OFDM symbols are used for the PDCCH transmission of LTE, the present embodiment describes an example in which NR is transmitted only in the remaining twelve OFDM symbol intervals, but since the first one OFDM symbol is used for the PDCCH transmission of the LTE, the NR is applicable to the case where transmission is performed only in the remaining thirteen OFDM symbol intervals.

In case of having different subcarrier spacings 3302, 3304, and 3306 as in FIG. 33A, the frame structure may be shifted to start from the third OFDM symbol of 15 KHz. In this case, as illustrated in 3314, in the case of the service using the 30 KHz subcarrier spacing, since the OFDM symbol length of 15 KHz and the OFDM symbols of 30 KHz are not matched, the NR transmission may not be performed by 0.521 μs of the last OFDM symbol.

In order to solve the drawback, as illustrated in FIG. 33B, in the frame structure having a different subcarrier spacings 3322, 3324, and 3326, the portion corresponding to the length of the second OFDM symbol of 15 KHz are not used, slots 3340, 3342, 3344, and 3346 are used from the portion corresponding to the third OFDM symbol of 15 KHz to the portion corresponding to the fourteenth OFDM symbol are used to contiguously keep symbol matching.

Figure 34:
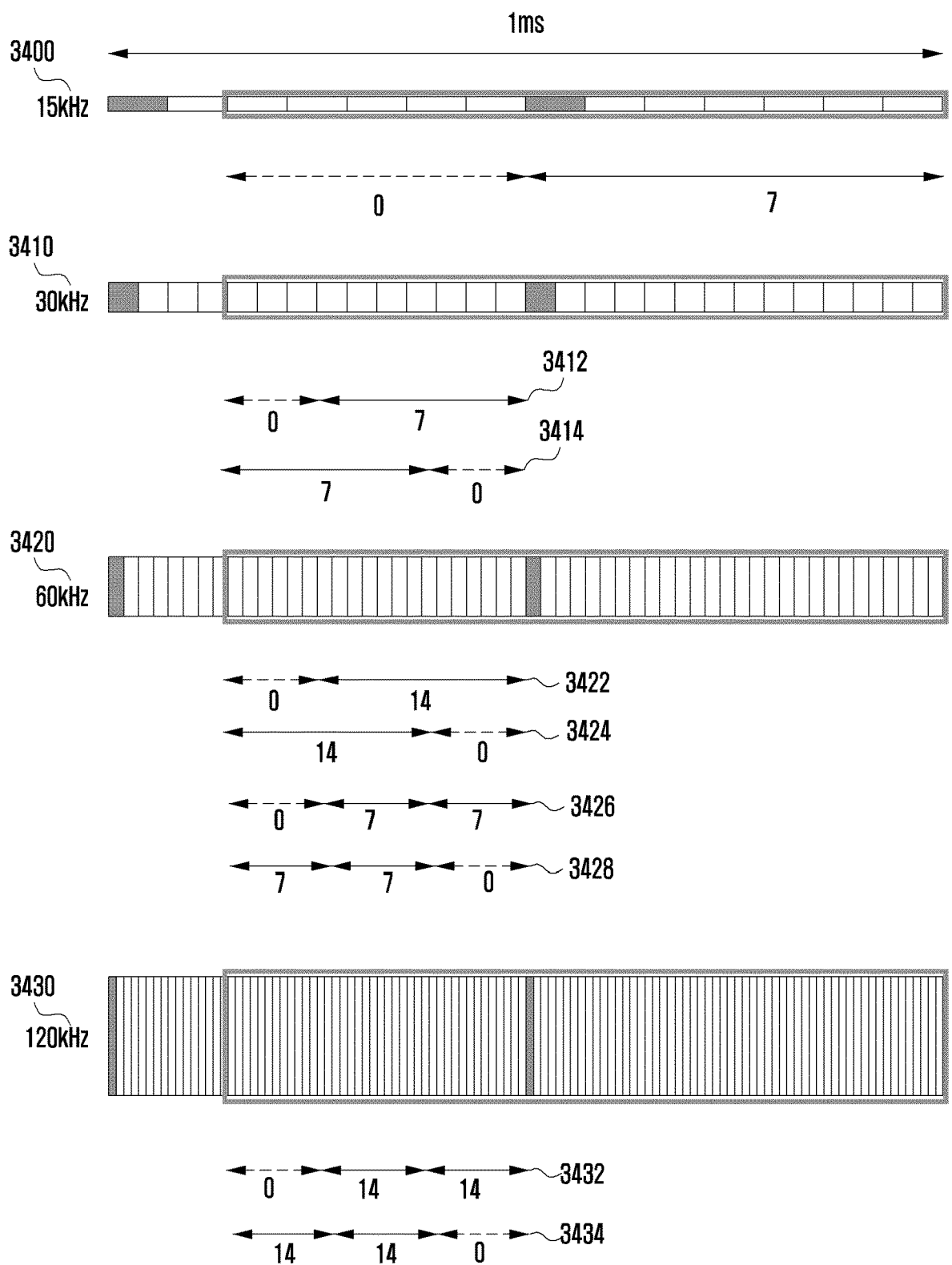
FIG. 34 is a diagram illustrating support of NR transmission without changing a length of an NR slot when the 5G transmission is performed through an MBSFN subframe according to various embodiments of the present disclosure.

FIG. 34 is a diagram illustrating an embodiment in which the NR transmission is supported only through a complete NR slot when the 5G transmission is performed through MBSFN subframe as in the embodiment of FIG. 22 or 26 according to various embodiments of the present disclosure.

Since the first two OFDM symbols are used for the PDCCH transmission of the LTE system, the present embodiment describes an example in which the NR transmission is performed only in the remaining twelve OFDM symbol intervals, but since the first one OFDM symbol is used for the PDCCH transmission of the LTE system, the NR is applicable to the case where the NR transmission is performed only in the remaining thirteen OFDM symbol intervals.

A slot or mini-slot is defined in the NR system as a time unit for data transmission similar to the transmission of data over a time unit called a subframe in an LTE system. In the present disclosure, a mini-slot or a partial slot means a time unit smaller than an OFDM symbol length of a slot, and is interchangeably used in the present disclosure, and has the same meaning. In particular, the length of the slot and the number of OFDM symbols may be different for each subcarrier spacing. The number of OFDM symbols of a slot up to 60 kHz may be defined as 7, or 14, or may be selected from 7 or 14 based on the upper setup to be used for the data transmission. The number of OFDM symbols of the slot when the frequency exceeds 60 KHz is always defined as 14. When the number of OFDM symbols of the slot is defined, the terminal transmits/receives data based on the slot according to the defined number of OFDM symbols, and when the number of OFDM symbols of the slot is set as the higher signal, the terminal receives the higher signal to transmit/receive data based on the slot according to the set number of OFDM symbols.

In the case of performing NR transmission over various subcarrier spacings from 15 KHz based on the frame structure as illustrated in the lower part of FIGS. 33A and 33B, partial slots consisting of some OFDM symbols in addition to slots consisting of seven or fourteen OFDM symbols may be present and supported. The present embodiment is an embodiment in which the partial slots are not supported, and only a full slot consisting of seven or fourteen OFDM symbols are supported. Accordingly, if a slot may not consist of seven or fourteen OFDM symbols, the remaining OFDM symbols are not used for the NR transmission.

Next, a description will be given of a method for instructing or defining the terminal to use the full slot for the NR transmission/reception. The base station transmits a position at which the full slot starts to the terminal as a signal, and the terminal receives the signal to attempt the RS reception, the downlink control channel decoding, and the data transmission/reception at a position at which the full slot starts. Alternatively, the position of the full slot may be predefined and fixed in the specification. Alternatively, the base station transmits the RS and the downlink control channel only in the full slot, and the terminal may receive the RS and the downlink control channel only in the full slot through the blind decoding.

The signal notifying the position at which the full slot starts may be defined as follows. The signal may include an offset indicating a position at which the full slot starts as well as an offset indicating a position at which the 5G transmission starts, as illustrated in FIG. 26. Alternatively, the signal may be a signal indicating a blank resource and may be transmitted to the terminal including the first and second OFDM symbols and the sub-slot of the MBSFN subframe in which the LTE transmission is performed. The terminal having received the signal indicating the blank resource can determine that the first and second OFDM symbols and the partial slot of the MBSFN subframe are not performed for the 5G transmission and that the RS reception, the downlink control channel decoding, and the data transmission/reception may be attempted under the assumption that the full slot is transmitted from a resource other than the blank resource. Alternatively, the signal may include an RS or a downlink control channel at a particular OFDM symbol position of the full slot.

Next, embodiments of a slot configuration of an NR transmission supporting various subcarrier spacings will be described with reference to FIG. 34. In the embodiment of FIG. 34, the full slots indicating the number of OFDM symbols are used for NR transmission, and the partial slots in which the number of OFDM symbols is denoted by 0 are not used for the NR transmission.

Reference numeral 3400 is an embodiment of a slot configuration of the NR transmission supporting a 15 KHz subcarrier spacing. 0 of a first section represented by a dotted line means a partial slot consisting of five OFDM symbols, and 7 of a second section represented by a solid line means a full slot consisting of seven OFDM symbols. Therefore, in the above example, only a full slot consisting of seven OFDM symbols is used for the NR transmission.

Reference number 3412 of reference numeral 3410 is an embodiment of the slot configuration of the NR transmission supporting a 30 KHz subcarrier spacing. 0 of a first section represented by a dotted line means a partial slot consisting of three OFDM symbols, and 7 of a second section represented by a solid line means a full slot consisting of seven OFDM symbols. Therefore, in the above example, only a full slot consisting of seven OFDM symbols is used for the NR transmission.

Reference number 3414 of reference numeral 3410 is an embodiment of the slot configuration of the NR transmission supporting a 30 KHz subcarrier spacing. 7 of a first section represented by a dotted line means a full slot consisting of five OFDM symbols, and 0 of a second section represented by a solid line means a partial slot consisting of three OFDM symbols. Therefore, in the above example, only a full slot consisting of seven OFDM symbols is used for the NR transmission.

Reference number 3422 of reference numeral 3420 is an embodiment of the slot configuration of the NR transmission supporting a 60 KHz subcarrier spacing. 0 of a first section represented by a dotted line means a partial slot consisting of six OFDM symbols, and 14 of a second section represented by a solid line means a full slot consisting of fourteen OFDM symbols. Therefore, in the above example, only a full slot consisting of fourteen OFDM symbols is used for the NR transmission.

Reference number 3424 of reference numeral 3420 is an embodiment of the slot configuration of the NR transmission supporting a 60 KHz subcarrier spacing. 0 of a first section represented by a dotted line means a full slot consisting of fourteen OFDM symbols, and 14 of a second section represented by a solid line means a partial slot consisting of six OFDM symbols. Therefore, in the above example, only a full slot consisting of fourteen OFDM symbols is used for the NR transmission.

Reference number 3426 of reference numeral 3420 is an embodiment of the slot configuration of the NR transmission supporting a 60 KHz subcarrier spacing. 0 of a first section represented by a dotted line means a partial slot consisting of six OFDM symbols, and 7 of a third section represented by a solid line means a full slot consisting of seven OFDM symbols. Therefore, in the above example, only full slots consisting of seven OFDM symbols are used for the NR transmission.

Reference number 3428 of reference numeral 3420 is an embodiment of the slot configuration of the NR transmission supporting a 60 KHz subcarrier spacing. 7 of a first section and 7 of a second section represented by a solid line mean full slots consisting of five OFDM symbols, and 7 of a third section represented by a solid line means a partial slot consisting of six OFDM symbols. Therefore, in the above example, only full slots consisting of seven OFDM symbols are used for the NR transmission.

Reference number 3432 of reference numeral 3430 is an embodiment of the slot configuration of the NR transmission supporting a 120 KHz subcarrier spacing. 0 of a first section represented by a dotted line means a partial slot consisting of twelve OFDM symbols, and 14 of a third section represented by a solid line means a full slot consisting of fourteen OFDM symbols. Therefore, in the above example, only full slots consisting of fourteen OFDM symbols are used for the NR transmission.

Reference number 3434 of reference numeral 3430 is an embodiment of the slot configuration of the NR transmission supporting a 120 KHz subcarrier spacing. 14 of a first section and 14 of a second section represented by a solid line mean full slots consisting of fourteen OFDM symbols, and 14 of a third section represented by a solid line means a partial slot consisting of twelve OFDM symbols. Therefore, in the above example, only full slots consisting of fourteen OFDM symbols are used for the NR transmission.

Figure 35A:
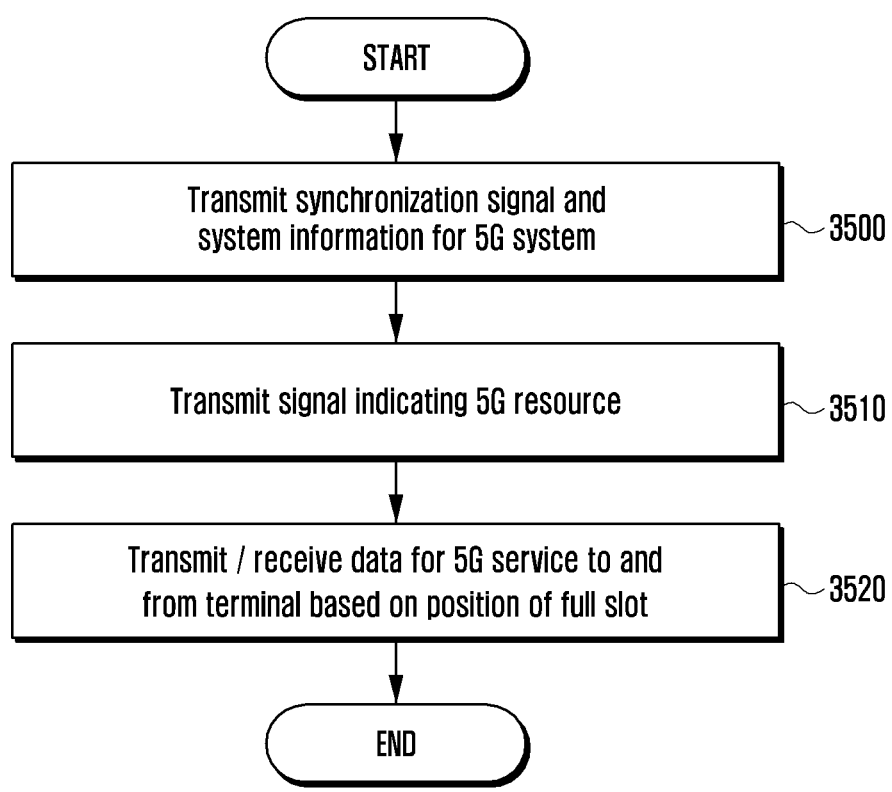
FIGS. 35A and 35B are diagrams for explaining the base station and terminal procedures illustrated in FIG. 34 according to various embodiments of the present disclosure.
Figure 35B:
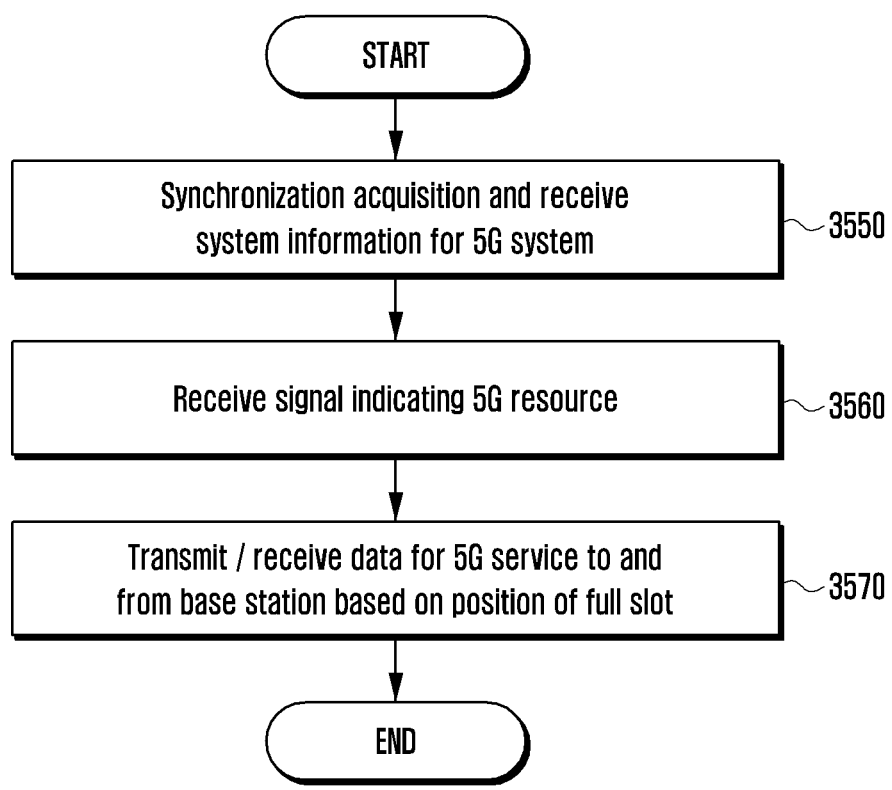

FIGS. 35A and 35B are diagrams illustrating the base station and terminal procedures illustrated in FIG. 34 according to various embodiment of the present disclosure.

FIG. 35A is a diagram illustrating the 5G base station procedure.

In operation 3500, the 5G base station transmits the synchronization signal and the system information for the 5G system from the resource configured for the 5G transmission to the 5G capable terminal. The synchronization signal for the 5G system may be designed to be always transmitted from the third OFDM based on 15 KHz. Therefore, when the terminal acquires the synchronization and system information for the 5G, it is possible to eliminate the influence on whether the subframe for 5G transmission starts from the first OFDM symbol, starts from the second OFDM symbol, or starts from the third OFDM symbol. Alternatively, the synchronization signal for the 5G system may be designed to be always transmitted from the eighth OFDM based on 15 KHz. Therefore, when the terminal acquires the synchronization and system information for the 5G, it is possible to eliminate the influence on whether the subframe for 5G transmission starts from the first OFDM symbol, starts from the second OFDM symbol, or starts from the third OFDM symbol. Meanwhile, a separate synchronization signal may be transmitted for the eMBB, mMTC, URLLC using different numerologies as the synchronization signal for the 5G system, or a common synchronization signal may be transmitted to a specific 5G resource using one numerology. Alternatively, for the specific frequency domain as the synchronization signal for the 5G system, separate synchronization signals and system signals using specific numerology may be transmitted for the specific frequency range, such as the frequency range for 6 GHz or less or the frequency range for 6 GHz or more. With the above system information, the common system signal may be transmitted to a specific 5G resource using one numerology, or separate system information may be transmitted for eMBB, mMTC, and URLLC using different numerologies.

In operation 3510, the 5G base station transmits a signal indicating 5G resource allocation to the 5G terminal. When the 5G resource allocation signal is transmitted to the 5G capable terminal, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched or punctured, signal instructing the terminal to use the full slot in the NR transmission/reception in FIG. 34), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol when being determined based on 15 KHz. Also, the 5G resource allocation signal may include offset information (determined based on 15 KHz) indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols when being determined based on 15 KHz. The synchronization information in the LTE system may be additionally acquired by the 5G capable terminal and a value for the difference from the LTE synchronization with the 5G synchronization may be transmitted by the 5G base station.

If there is the integrated controller, when the LTE system and the 5G system are operated at different resources by dividing resources, the integrated controller 1960 selects the allocation of the time resource of the LTE system and the 5G system and transmits the allocation information to the base station by the X2, thereby distinguishing the resources of the LTE system and the 5G system. If there is no integrated controller, as in the base station procedure of FIG. 17, the LTE base station or the 5G base station may select the LTE or 5G resource allocation and transmit the selected LTE or 5G resource allocation to another base station.

In operation 3520, the 5G base station transmits/receives the data, the control information, and the reference signal for the 5G service on the slot based on the frame structure according to the position (e.g., whether the OFDM symbol from which the 5G transmission starts is the first OFDM symbol, the second OFDM symbol, or the third OFDM symbol) at which the 5G resource starts from the 5G capable terminal and the 5G resource or the 5G resource size (e.g., whether the 5G transmission is transmitted over fourteen OFDM symbols, thirteen OFDM symbols, or twelve OFDM symbols) and based on the position of the full slot from the embodiment of FIG. 34.

FIG. 35B is a diagram illustrating the 5G terminal procedure.

In operation 3550, the 5G terminal acquires the synchronization and system information for the 5G system from the 5G base station. The synchronization signal for the 5G system may always be designed to be transmitted from the third OFDM. Therefore, in order to obtain the synchronization and system information for the 5G system, it is possible to eliminate the influence on whether the subframe for 5G transmission starts from the first OFDM symbol or starts from the third OFDM symbol. Alternatively, the synchronization signal for the 5G system may be designed to be always transmitted from the eighth OFDM based on 15 KHz. Therefore, when the terminal acquires the synchronization and system information for the 5G system, it is possible to eliminate the influence on whether the subframe for 5G transmission starts from the first OFDM symbol, starts from the second OFDM symbol, or starts from the third OFDM symbol. Meanwhile, the synchronization signal for the 5G system may be a separate synchronization signal for the eMBB, mMTC, URLLC using different numerologies, or may be a common synchronization signal to a specific 5G resource using one numerology. Alternatively, for the specific frequency domain as the synchronization signal for the 5G system, separate synchronization signals and system signals using specific numerology may be transmitted for the specific frequency range, such as the frequency range for 6 GHz or less or the frequency range for 6 GHz or more. With the above system information, the common system signal may be a specific 5G resource transmitted using one numerology, or may be a separate system information for the eMBB, the mMTC, and the URLLC transmitted using different numerologies.

In operation 3560, the 5G terminal receives a signal indicating 5G resource allocation from the 5G base station. The 5G resource allocation signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched or punctured, signal instructing the terminal to use the full slot in the NR transmission/reception in FIG. 34), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, or starts from a third OFDM symbol when being determined based on 15 KHz. Also, the 5G resource allocation signal may include offset information (determined based on 15 KHz) indicating a position at which a 5G resource starts in each subframe or each slot. In addition, the 5G resource allocation signal may also include whether the 5G transmission is performed over twelve OFDM symbols or fourteen OFDM symbols. The synchronization information in the LTE system may be additionally acquired by the 5G capable terminal and a value for the difference from the LTE synchronization with the 5G synchronization may be received from the 5G base station.

In operation 3570, the 5G terminal determines the position (e.g., whether the OFDM symbol from which the 5G transmission starts is the first OFDM symbol or the third OFDM symbol) at which the 5G resource starts from the 5G transmission resource or the 5G resource size (e.g., whether the 5G transmission is transmitted over fourteen OFDM symbols or twelve OFDM symbols) occupied in on subframe, and the position of the full slot from the embodiment of FIG. 34 based on the signal received in operation 3560, and transmits/receives the data and control information and reference signal for the 5G signal to and from the base station on the slot based on the frame and slot structure according to the start position.

Figure 36:
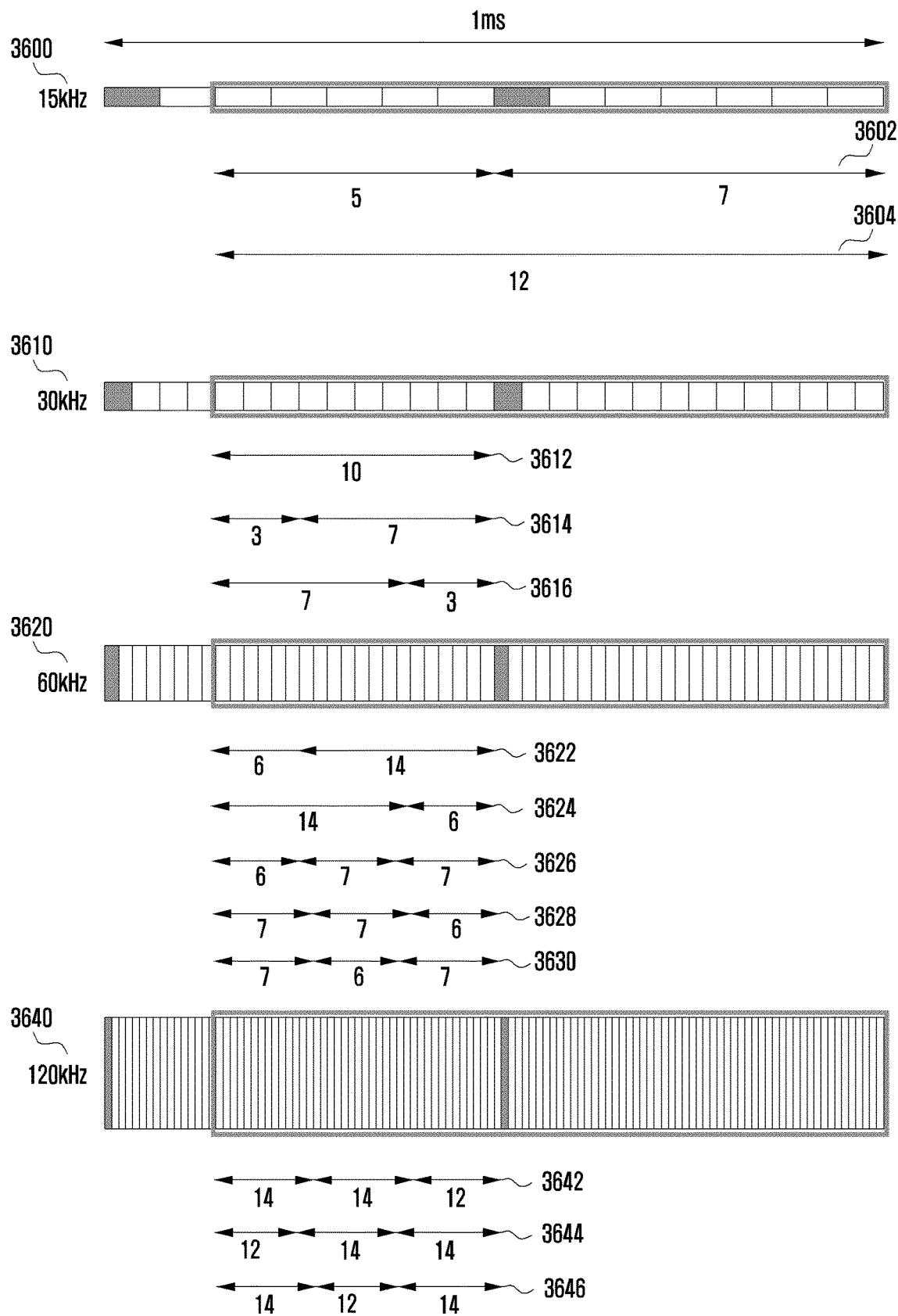
FIG. 36 is a diagram illustrating an embodiment for supporting NR transmission through an NR slot having various lengths when the 5G transmission is performed through the MBSFN subframe according to various embodiments of the present disclosure.

FIG. 36 is a diagram illustrating an embodiment in which the NR transmission is supported through NR slots having various lengths when the 5G transmission is performed through MBSFN subframe as in the embodiment of FIG. 22 or 26 according to various embodiments of the present disclosure.

Since the first two OFDM symbols are used for the PDCCH transmission of the LTE system, the present embodiment describes an example in which the NR transmission is performed only in the remaining twelve OFDM symbol intervals, but since the first one OFDM symbol is used for the PDCCH transmission of the LTE, the NR is applicable to the case where the NR is transmitted only in the remaining thirteen OFDM symbol intervals.

A slot or mini-slot is defined in the NR system as a time unit for data transmission similar to the transmission of data over a time unit called a subframe in an LTE system. In particular, the length of the slot and the number of OFDM symbols may be different for each subcarrier spacing. The number of OFDM symbols of a slot up to 60 kHz may be defined as 7, or 14, or may be selected from 7 or 14 based on the upper setup to be used for the data transmission. The number of OFDM symbols of the slot when the frequency exceeds 60 KHz is always defined as 14. When the number of OFDM symbols of the slot is defined, the terminal transmits/receives data based on the slot according to the defined number of OFDM symbols, and when the number of OFDM symbols of the slot is set as the higher signal, the terminal receives the higher signal to transmit/receive data based on the slot according to the set number of OFDM symbols.

In the case of performing NR transmission over various subcarrier spacings from 15 KHz based on the frame structure as illustrated in the lower part of FIGS. 33A and 33B, partial slots consisting of some OFDM symbols in addition to slots consisting of seven or fourteen OFDM symbols may be present and supported. The present embodiment is an embodiment that is performed to support the partial slot as well as the full slot. Therefore, even if a slot may not consist of seven or fourteen OFDM symbols of slot, it is used for NR transmission.

Next, a description will be given of a method for instructing or defining the terminal to use the partial slot and the full slot for the NR transmission/reception. The base station transmits a position of the partial slot and the full slot to the terminal as a signal, and the terminal receives the signal to attempt the RS reception, the downlink control channel decoding, and the data transmission/reception at the position of the partial slot and the full slot. Alternatively, the positions of the partial slot and the full slot may be predefined and fixed in the specification. Alternatively, the base station transmits the RS and the downlink control channel only in the full slot, and the terminal receives the RS and the downlink control channel only in the full slot by the blind decoding, and the downlink control channel transmitted in the full slot receives scheduling the data transmission in the partial slot. The signal notifying the position of the partial slot and the full slot may be defined as follows. The signal may include a signal additionally notifying the position information of the partial slot and the full slot as well as an offset indicating a position at which the 5G transmission starts, as illustrated in FIG. 26. Alternatively, the signal may include the RS or the downlink control channel at the specific OFDM symbol position (e.g., the first OFDM symbol of the partial slot or the first OFDM symbol of the full slot) of the partial slot or the full slot.

The transport block size of data transmitted in a partial slot may be smaller than the transport block size of data that may be transmitted in the full slot. Therefore, the first method for determining the transport block size of the data transmitted in the partial slot is to multiply the partial slot by a scaling factor according to the number of OFDM symbols in the full slot when the size of the transport block size defined to be transmitted in the full slot is M and determines the transport block size of the data transmitted in the partial slot, thereby determining the transport block size of the data transmitted in the partial slot. That is, when the transport block size of the data transmitted in the partial slot is P, P may be calculated as represented by the following Equation 1.

$$P=\text{floor}[M*(\text{the number of OFDM symbols of partial slot})/(\text{the number of OFDM symbols of full slot})] \quad \text{Equation 1}$$

For example, if the transport block size defined to be transmitted in the full slot is 10000, the number of OFDM symbols in the partial slot is 6, and the number of OFDM symbols of the full slot is 14, the transport block size of the data transmitted in the partial slot may be floor [10000*6/14]=4285.

The second method for determining a transport block size of data transmitted in a partial slot multiplies the partial slot by the scaling factor according to the number of OFDM symbols in the full slot when the number of physical resource blocks included in the full slot is M to determine the number of physical resource blocks included in the partial slot and determine the transport block size from the physical resource block. That is, when the number of physical resource blocks included in the partial slot is P, P may be calculated as represented by the following Equation 2.

$$P=\text{floor}[M*(\text{the number of OFDM symbols of partial slot})/(\text{the number of OFDM symbols of full slot})] \quad \text{Equation 2}$$

For example, if the number of physical resource blocks included in the full slot is 1000, the number of OFDM symbols in the partial slot is 6, and the number of OFDM symbols of the full slot is 14, the number of physical resource blocks included in the partial slot may be floor [1000*6/14]=428. The corresponding transport block size from the physical resource block can be derived from a relationship table between the physical resource block and the transport block size to be defined in the specification.

Based on the determined transport block size, the base station and the terminal may transmit and receive data in a partial slot.

Next, embodiments of a slot configuration of an NR transmission supporting various subcarrier spacings will be described with reference to FIG. 36. In the embodiment of FIG. 36, the number of OFDM symbols of the partial slot and the full slot is displayed on each slot section.

Reference number 3602 of reference numeral 3600 is an embodiment of the slot configuration of the NR transmission supporting a 15 KHz subcarrier spacing. 5 of a first section represented by a solid line means a partial slot consisting of five OFDM symbols, and 7 of a second section represented by a solid line means a full slot consisting of seven OFDM symbols. Thus, in this example, the partial slot and the full slot are used for NR transmission.

Reference number 3604 of reference numeral 3600 is an embodiment of the slot configuration of the NR transmission supporting a 15 KHz subcarrier spacing. 12 of a first section represented by a solid line means a partial slot consisting of twelve OFDM symbols. Thus, in this example, the partial slot is used for the NR transmission.

Reference number 3612 of reference numeral 3610 is an embodiment of the slot configuration of the NR transmission supporting a 30 KHz subcarrier spacing. 10 of a first section represented by a solid line means a partial slot consisting of ten OFDM symbols. Therefore, in the above example, a partial slot consisting of ten OFDM symbols is used for the NR transmission.

Reference number 3614 of reference numeral 3610 is an embodiment of the slot configuration of the NR transmission supporting a 30 KHz subcarrier spacing. 3 of a first section represented by a solid line means a partial slot consisting of three OFDM symbols. 7 of a second section represented by a solid line means a full slot consisting of seven OFDM symbols. Accordingly, in this example, the partial slot and the full slot are used for the NR transmission.

Reference number 3616 of reference numeral 3610 is an embodiment of the slot configuration of the NR transmission supporting a 30 KHz subcarrier spacing. 7 of a first section represented by a solid line means a full slot consisting of five OFDM symbols, and 3 of a second section represented by a solid line means a partial slot consisting of three OFDM symbols. Thus, in this example, the partial slot and the full slot are used for NR transmission.

Reference number 3622 of reference numeral 3620 is an embodiment of the slot configuration of the NR transmission supporting a 60 KHz subcarrier spacing. 6 of a first section represented by a solid line means a partial slot consisting of six OFDM symbols. 14 of a second section represented by a solid line means a full slot consisting of fourteen OFDM symbols. Accordingly, in this example, the partial slot and the full slot are used for the NR transmission.

Reference number 3624 of reference numeral 3620 is an embodiment of the slot configuration of the NR transmission supporting a 60 KHz subcarrier spacing. 14 of a first section represented by a solid line means a full slot consisting of fourteen OFDM symbols. 6 of a second section represented by a solid line means a partial slot consisting of six OFDM symbols. Accordingly, in this example, the partial slot and the full slot are used for the NR transmission.

Reference number 3626 of reference numeral 3620 is an embodiment of the slot configuration of the NR transmission supporting a 60 KHz subcarrier spacing. 6 of a first section represented by a solid line means a partial slot consisting of six OFDM symbols, and 7 of a second section represented by a solid line means full slots consisting of seven OFDM symbols. Thus, in this example, the partial slot and the full slots are used for the NR transmission.

Reference number 3628 of reference numeral 3626 is an embodiment of the slot configuration of the NR transmission supporting a 60 KHz subcarrier spacing. 7 of a first section and 7 of a second section represented by a solid line mean full slots consisting of seven OFDM symbols, and 6 of a third section represented by a solid line means a partial slot consisting of six OFDM symbols. Thus, in this example, the partial slot and the full slots are used for the NR transmission.

Reference number 3630 of reference numeral 3620 is an embodiment of the slot configuration of the NR transmission supporting a 60 KHz subcarrier spacing. 7 of a first section and 7 of a third section represented by a solid line mean full slots consisting of seven OFDM symbols, and 6 of a second section represented by a solid line means a partial slot consisting of six OFDM symbols. Thus, in this example, the partial slot and the full slots are used for the NR transmission.

Reference number 3642 of reference numeral 3640 is an embodiment of the slot configuration of the NR transmission supporting a 120 KHz subcarrier spacing. 14 of a first section and 14 of a second section represented by a solid line mean full slots consisting of fourteen OFDM symbols, and 12 of a third section represented by a solid line means a partial slot consisting of twelve OFDM symbols. Thus, in this example, the partial slot and the full slots are used for the NR transmission.

Reference number 3644 of reference numeral 3640 is an embodiment of the slot configuration of the NR transmission supporting a 120 KHz subcarrier spacing. 14 of a second section and 14 of a third section represented by a solid line mean full slots consisting of fourteen OFDM symbols, and 12 of a first section represented by a solid line means a partial slot consisting of twelve OFDM symbols. Therefore, in the above example, only full slots consisting of fourteen OFDM symbols are used for the NR transmission.

Reference number 3646 of reference numeral 3640 is an embodiment of the slot configuration of the NR transmission supporting a 120 KHz subcarrier spacing. 14 of a first section and 14 of a third section represented by a solid line mean full slots consisting of fourteen OFDM symbols, and 12 of a second section represented by a solid line means a partial slot consisting of twelve OFDM symbols. Therefore, in the above example, only full slots consisting of fourteen OFDM symbols are used for the NR transmission.

Figure 37A:
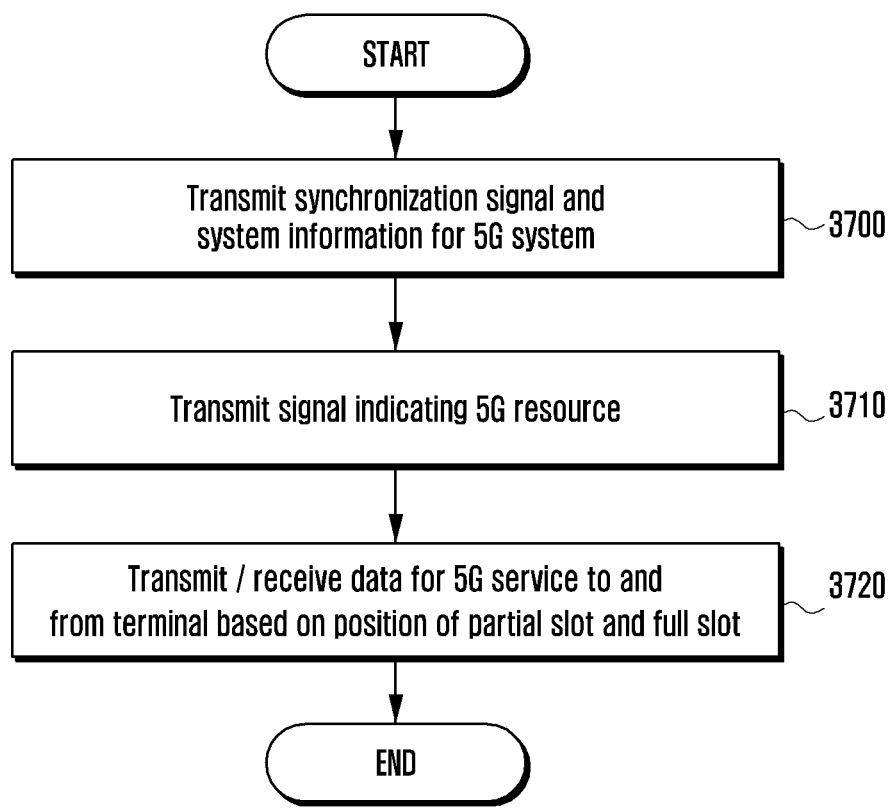
FIGS. 37A and 37B are diagrams for explaining the base station and terminal procedures illustrated in FIG. 36 according to various embodiments of the present disclosure.
Figure 37B:
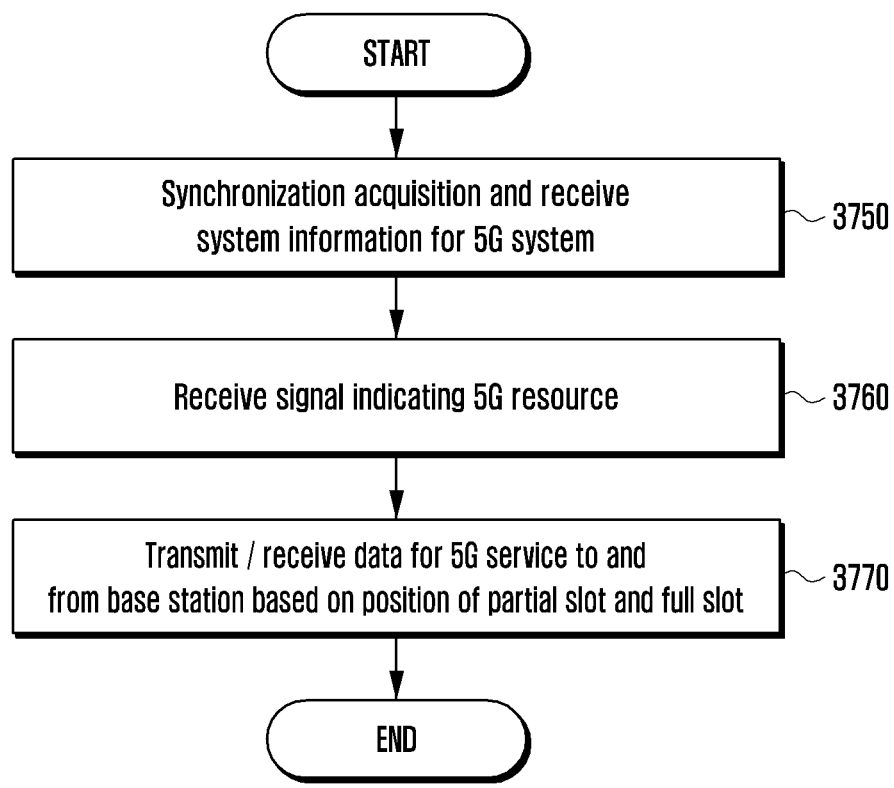

FIGS. 37A and 37B are diagrams illustrating the base station and terminal procedures as illustrated in FIG. 36 according to various embodiments of the present disclosure.

FIG. 37A is a diagram illustrating the 5G base station procedure.

In operation 3700, the 5G base station transmits the synchronization signal and the system information for the 5G from the resource configured for the 5G transmission to the 5G capable terminal. The synchronization signal for the 5G system may be designed to be always transmitted from the third OFDM based on 15 KHz. Therefore, when the terminal acquires the synchronization and system information for the 5G, it is possible to eliminate the influence on whether the subframe for 5G transmission starts from the first OFDM symbol or starts from the third OFDM symbol. Alternatively, the synchronization signal for the 5G system may be designed to be always transmitted from the eighth OFDM based on 15 KHz. Therefore, when the terminal acquires the synchronization and system information for the 5G system, it is possible to eliminate the influence on whether the subframe for 5G transmission starts from the first OFDM symbol, starts from the second OFDM symbol, or starts from the third OFDM symbol.

Meanwhile, a separate synchronization signal may be transmitted for the eMBB, mMTC, URLLC using different numerologies as the synchronization signal for the 5G system, or a common synchronization signal may be transmitted to a specific 5G resource using one numerology. Alternatively, for the specific frequency domain as the synchronization signal for the 5G system, separate synchronization signals and system signals using specific numerology may be transmitted for the specific frequency range, such as the frequency range for 6 GHz or less or the frequency range for 6 GHz or more. With the above system information, the common system signal may be transmitted to a specific 5G resource using one numerology, or separate system information may be transmitted for eMBB, mMTC, and URLLC using different numerologies.

In operation 3710, the 5G base station transmits a signal indicating 5G resource allocation to the 5G terminal. When the 5G resource allocation signal is transmitted to the 5G capable terminal, the signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched or punctured, signal instructing the terminal to use the partial slot and the full slot in the NR transmission/reception in FIG. 36), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol when being determined based on 15 KHz. Also, the 5G resource allocation signal may include offset information (determined based on 15 KHz) indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols when being determined based on 15 KHz. The synchronization information in the LTE system may be additionally acquired by the 5G capable terminal and a value for the difference from the LTE synchronization with the 5G synchronization may be transmitted by the 5G base station.

If there is the integrated controller, when the LTE system and the 5G system are operated at different resources by dividing resources, the integrated controller 1960 selects the allocation of the time resource of the LTE system and the 5G system and transmits the allocation information to the base station by the X2, thereby distinguishing the resources of the LTE system and the 5G system. If there is no integrated controller, as in the base station procedure of FIG. 17, the LTE base station or the 5G base station may select the LTE or 5G resource allocation and transmit the selected LTE or 5G resource allocation to another base station.

In operation 3720, the 5G base station transmits/receives the data, the control information, and the reference signal for the 5G service on the slot based on the frame structure according to the position (e.g., whether the OFDM symbol from which the 5G transmission starts is the first OFDM symbol, the second OFDM symbol, or the third OFDM symbol) at which the 5G resource starts from the 5G capable terminal and the 5G resource or the 5G resource size (e.g., whether the 5G transmission is transmitted over fourteen OFDM symbols, thirteen OFDM symbols, or twelve OFDM symbols) and based on the position of the partial slot and the full slot from the embodiment of FIG. 36.

FIG. 37B is a diagram illustrating the 5G terminal procedure.

In operation 3750, the 5G terminal acquires the synchronization and system information for the 5G from the 5G base station. The synchronization signal for the 5G system may always be designed to be transmitted from the third OFDM. Therefore, in order to obtain the synchronization and system information for the 5G system, it is possible to eliminate the influence on whether the subframe for 5G transmission starts from the first OFDM symbol, starts from the second OFDM symbol, or starts from the third OFDM symbol. Alternatively, the synchronization signal for the 5G system may be designed to be always transmitted from the eighth OFDM based on 15 KHz. Therefore, when the terminal acquires the synchronization and system information for the 5G system, it is possible to eliminate the influence on whether the subframe for 5G transmission starts from the first OFDM symbol or starts from the third OFDM symbol.

Meanwhile, the synchronization signal for the 5G system may be a separate synchronization signal for the eMBB, mMTC, URLLC using different numerologies, or may be a common synchronization signal to a specific 5G resource using one numerology. Alternatively, for the specific frequency domain as the synchronization signal for the 5G, separate synchronization signals and system signals using specific numerology may be transmitted for the specific frequency range, such as the frequency range for 6 GHz or less or the frequency range for 6 GHz or more. With the above system information, the common system signal may be a specific 5G resource transmitted using one numerology, or may be a separate system information for the eMBB, the mMTC, and the URLLC transmitted using different numerologies.

In operation 3760, the 5G terminal receives a signal indicating 5G resource allocation from the 5G base station. The 5G resource allocation signal may be a higher signal or a physical signal. The LTE or 5G resource allocation signal is information indicating where the LTE or 5G resource is positioned. The LTE or 5G resource allocation signal includes frequency information (carrier frequency, physical resource block, etc.), time information (radio frame index, subframe index, MBSFN subframe for 5G transmission, uplink subframe information for 5G transmission, reserved resources or blank resource information determining that 5G terminals are not used for 5G transmission, information indicating whether to perform puncturing when the 5G signal included in the reserved or the blank resource is rate matched or punctured, signal instructing the terminal to use the partial slot and the full slot in the NR transmission/reception in FIG. 36), antenna information, spatial information, duplex information (FDD DL, UL carrier information, TDD UL/DL configuration information, LAA operation related information), a signal for allowing a terminal to acquire in real time whether to occupy the LTE and/or 5G resource depending on the reference signal or the synchronization signal transmission, and the like. Also, the 5G resource allocation signal may include whether the 5G resource is an LTE uplink subframe or an LTE MBSFN subframe. In addition, the 5G resource allocation signal may also include whether the 5G resource starts from a first OFDM symbol, from a second OFDM symbol, or starts from a third OFDM symbol when being determined based on 15 KHz. Also, the 5G resource allocation signal may include offset information (determined based on 15 KHz) indicating a position at which a 5G resource starts in each subframe or each slot. In addition, the 5G resource allocation signal may also include whether the 5G transmission is performed over twelve OFDM symbols, thirteen OFDM symbols, or fourteen OFDM symbols. The synchronization information in the LTE system may be additionally acquired by the 5G capable terminal and a value for the difference from the LTE synchronization with the 5G synchronization may be received from the 5G base station.

In operation 3770, the 5G terminal determines the position (e.g., whether the OFDM symbol from which the 5G transmission starts is the first OFDM symbol, the second OFDM symbol, or the third OFDM symbol) at which the 5G resource starts from the 5G transmission resource or the 5G resource size (e.g., whether the 5G transmission is transmitted over fourteen OFDM symbols, thirteen OFDM symbols, or twelve OFDM symbols) occupied in on subframe, and the position of the partial slot and the full slot from the embodiment of FIG. 36 based on the signal received in operation 3760, and transmits/receives the data and control information and reference signal for the 5G signal to and from the base station on the slot based on the frame and slot structure according to the start position.

Meanwhile, the 5G synchronization signal transmission and system information transmission in the present disclosure will be described in more detail. The 5G base station transmits the synchronization signal and the system information for the 5G system from the resources configured for the 5G transmission to the 5G capable terminal, and the 5G capable terminal receives and acquires the time and/or frequency synchronization and system information for the 5G.

The first method for transmitting a synchronization signal and system information allows the 5G terminal to acquire the time and/or frequency synchronization for the data transmission/reception on the 5G resource by the transmission of the synchronization signal and the system information in the 5G resource coexisting with the LTE system within one carrier without being supported in different 5G cells. The synchronization signal for the 5G system may be designed to be always transmitted from the third OFDM based on 15 KHz. Therefore, when the terminal acquires the synchronization and system information for the 5G, it is possible to eliminate the influence on whether the subframe for 5G transmission starts from the first OFDM symbol or starts from the third OFDM symbol. Alternatively, the synchronization signal for the 5G system may be designed to be always transmitted from the eighth OFDM based on 15 KHz. Therefore, when the terminal acquires the synchronization and system information for the 5G system, it is possible to eliminate the influence on whether the subframe for 5G transmission starts from the first OFDM symbol, starts from the second OFDM symbol, or starts from the third OFDM symbol. Alternatively, the synchronization signal for the 5G system may be designed to be transmitted from the fourteenth OFDM based on 15 KHz. Therefore, when the terminal acquires the synchronization and system information for the 5G, it is possible to eliminate the influence on whether the subframe for 5G transmission starts from the first OFDM symbol, starts from the second OFDM symbol, or starts from the third OFDM symbol. Alternatively, the synchronization signal for the 5G system includes information on whether the LTE and the 5G system coexist in the carrier or the subframe index or the OFDM symbol index to which the synchronization signal is transmitted. Therefore, the terminal may acquire the time and/or frequency synchronization and system information for the 5G data transmission/reception based on which the LTE and the 5G system coexist and based on the subframe or the OFDM symbol index information for the 5G transmission, by acquiring the synchronization and system information for the 5G system.

Meanwhile, a separate synchronization signal may be transmitted for the eMBB, mMTC, URLLC using different numerologies as the synchronization signal for the 5G system, or a common synchronization signal may be transmitted to a specific 5G resource using one numerology. Alternatively, for the specific frequency domain, separate synchronization signals and system signals using specific numerology may be transmitted for the specific frequency range, such as the frequency range for 6 GHz or less or the frequency range for 6 GHz or more. With the above system information, the common system signal may be transmitted to a specific 5G resource using one numerology, or separate system information may be transmitted for eMBB, mMTC, and URLLC using different numerologies.

The second method for transmitting a synchronization signal and system information allows the 5G terminal to acquire the time and/or frequency synchronization for the data transmission/reception on the 5G resource by the transmission of the synchronization signal and the system information in the 5G resource coexisting with the LTE within one carrier with being supported in different 5G cells.

That is, the 5G terminal acquires time and/or frequency synchronization through the reception of the synchronization signal and the system information in the 5G dedicated carrier which does not coexist with the LTE system, and receives the related system information. Thereafter, the 5G terminal may additionally configure an LTE carrier as a higher signal from the base station for the 5G data transmission/reception. At this time, the 5G terminal receives, as the higher signal, the configuration for the transmission slot of the synchronization signal for the acquisition of the time and/or frequency synchronization in the 5G resource coexisting in the LTE carrier through the 5G dedicated carrier. The terminal may know the time and frequency position at which the 5G synchronization signal is transmitted in the LTE carrier by the configuration of the transmission slot position, the OFDM symbol position, or the transmission RB position of the synchronization signal, and receive the 5G synchronization signal to acquire the time and/or frequency synchronization for the 5G transmission/reception.

Figure 38:
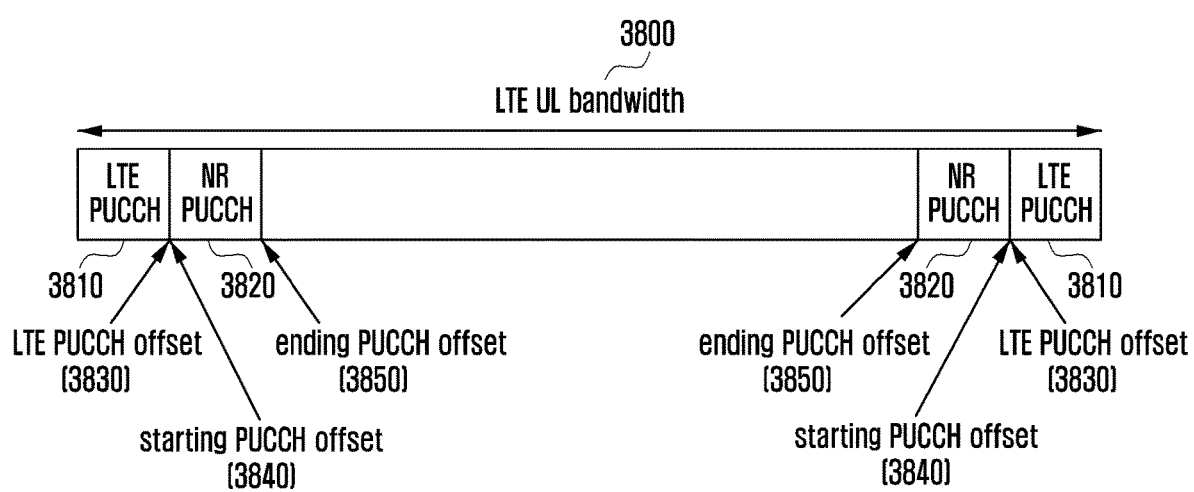
FIG. 38 is a diagram illustrating an example in which a frequency domain for the LTE uplink control channel and a frequency domain for the 5G uplink control channel coexist in the LTE uplink carrier according to various embodiments of the present disclosure.

Referring to FIG. 38, a method for transmitting uplink feedback for 5G downlink transmission in an LTE uplink carrier or transmitting 5G uplink control information transmission such as channel information in an LTE uplink carrier will be described.

FIG. 38 is a diagram illustrating that a frequency domain for the LTE uplink control channel and a frequency domain for the 5G uplink control channel coexist in the LTE uplink carrier according to various embodiments of the present disclosure. Reference numeral 3800 may be an uplink carrier in the LTE FDD or a bandwidth in the uplink subframe in the LTE TDD. The LTE uplink bandwidth 3800 information may be transmitted from the base station through the higher signal or the system information, and the LTE terminal or the 5G terminal may acquire the uplink bandwidth information 3800 through the reception of the higher signal or the system information. Reference numeral 3810 illustrates a frequency domain for an LTE uplink control channel transmission, and reference numeral 3820 illustrates a frequency domain for a 5G uplink control channel transmission.

In the LTE system, the LTE terminal acquires from the base station a frequency domain in which an LTE uplink control channel may exist through an LTE PUCCH offset 3830 for an LTE uplink control channel. The LTE PUCCH offset 3930 is transmitted through the higher signal.

The 5G terminal acquires from the base station a frequency domain in which the 5G uplink control channel may exist through a starting PUCCH offset 3840 in which the 5G uplink control channel starts and an ending PUCCH offset 3850 in which the 5G uplink control channel ends. The starting PUCCH offset 3840 and the ending PUCCH offset 3850 are transmitted through the higher signal or an L1 signal.

Figure 39:
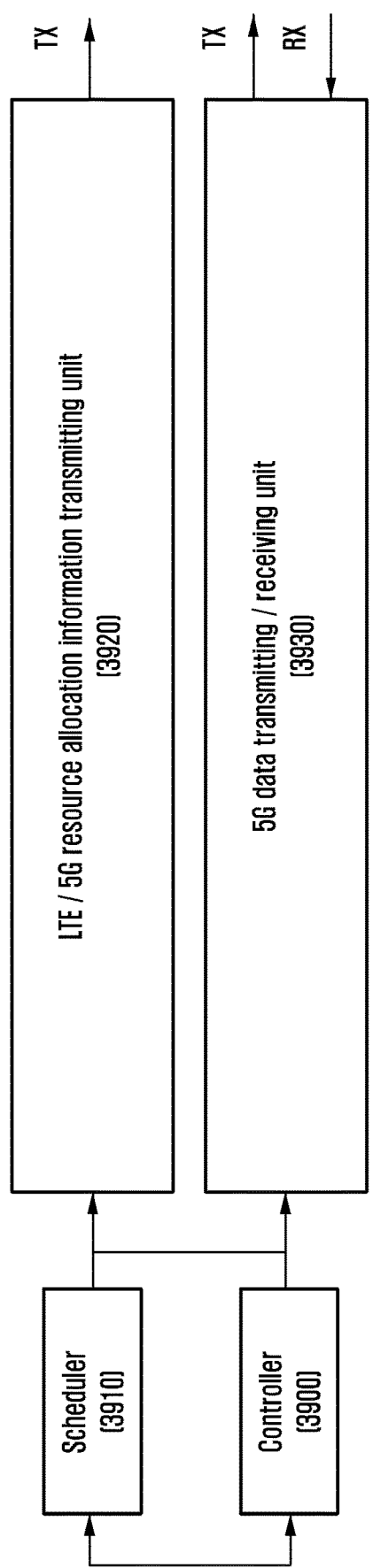
FIG. 39 is a diagram illustrating the base station apparatus according to various embodiments of the present disclosure.

FIG. 39 is a diagram illustrating the base station apparatus according to various embodiments of the present disclosure.

The controller 3900 may control the LTE and/or 5G resource allocation based on the base station procedure illustrated in FIGS. 16A, 16B, 18A, 18B, 20A, 20B, 27A, 27B, 31A, 31B, 35A, 35B, 37A, 37B, and 38 of the present disclosure and the division operating method of the LTE and 5G systems illustrated in FIGS. 21, 22, 23, 24, 25, 26, 29, 34, 36, and 38 and transmits the LTE and/or 5G resource allocation to the terminal and different base stations through an LTE/5G resource allocation information transmitting unit 3920, and controls a scheduler 3910 to schedule the 5G data in the 5G resource and transmit/receive the 5G data to and from the 5G terminal through a 5G data transmitting/receiving unit 3930.

Figure 40:
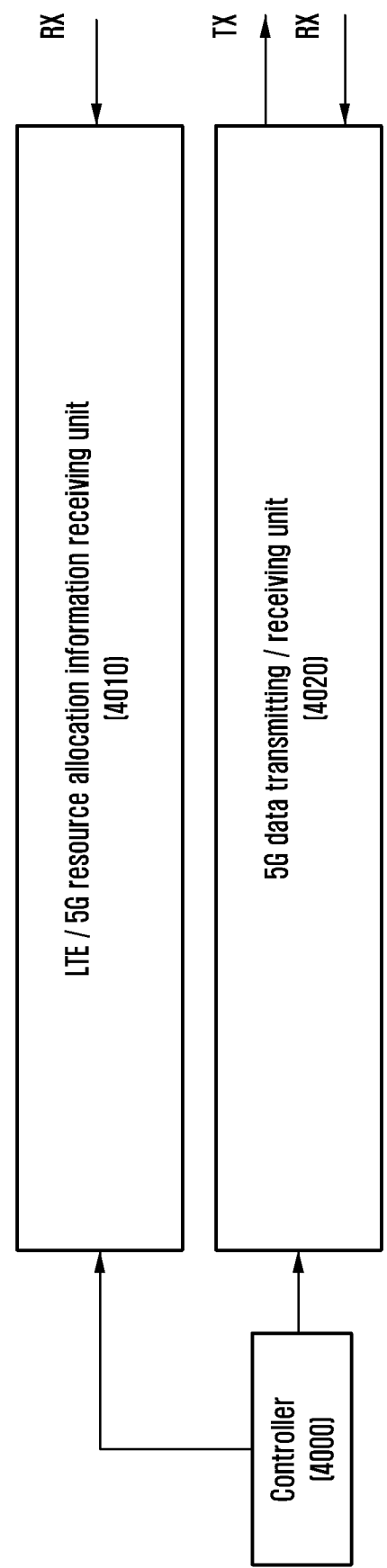
FIG. 40 is a diagram illustrating the terminal apparatus according to various embodiments of the present disclosure.

FIG. 40 is a diagram illustrating the terminal apparatus according to various embodiments of the present disclosure.

The LTE and/or 5G resource allocation is received from the base station through an LTE/5G resource allocation information receiving unit 4010 based on the LTE and/or 5G resource allocation based on the terminal procedure illustrated in FIGS. 16A, 16B, 18A, 18B, 20A, 20B, 27A, 27B, 31A, 31B, 35A, 35B, 37A, 37B, and 38 of the present disclosure and the division operating method of the LTE and the 5G illustrated in FIGS. 21, 22, 23, 24, 25, 26, 29, 34, 36, and 38 and the controller 4000 transmits/receives the 5G data scheduled in the allocated 5G resource to the 5G base station through a 5G data transmitting/receiving unit 4020.

Third Embodiment

A wireless communication system has been developed from a wireless communication system providing a voice centered service in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an OFDM scheme in a DL and has adopted a SC-FDMA scheme in a UL. The uplink refers to a radio link through which a user equipment (UE) or a mobile station (MS) transmits data or a control signal to a base station (eNodeB or base station (BS)) and the down link refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system since the LTE, that is, a 5G communication system has to be able to freely reflect various requirements such as a user and a service provider, a service satisfying various requirements needs to be supported at the same time. The services considered for the 5G communication system include enhanced mobile broadband (eMBB), massive machine type communication (mMTC), ultra reliability low latency communication (hereinafter, URLLC), etc.

The eMBB aims to provide a higher data transfer rate than a data rate supported by the related-art LTE, LTE-A, or LTE-Pro system. For example, in the 5G communication system, the eMBB should be able to provide a peak transmission rate of 20 Gbps in the downlink and a peak data rate of 10 Gbps in the uplink from the viewpoint of one base station. In addition, the 5G communication system should provide the increased user perceived data rate of the terminal simultaneously with providing the peak data rate. In order to satisfy such the requirement, improvement of various transmitting/receiving technologies including a further improved multi input multi output (MIMO) transmission technology is demanded. In addition, signals are transmitted using the transmission bandwidth of up to 20 MHz in the 2 GHz band used by the current LTE system, but the 5G communication system uses a bandwidth wider than 20 MHz in the frequency band of 3 to 6 GHz or more than 6 GHz, thereby satisfying the data transmission rate required in the 5G communication system.

At the same time, the mMTC is being considered to support application services such as Internet of Thing (IoT) in the 5G communication system. The mMTC is required for an access support of a large-scale terminal in a cell, coverage enhancement of a terminal, improved battery time, and cost reduction of a terminal in order to efficiently provide the Internet of things. The Internet of things needs to be able to support a large number of terminals (e.g., 1,000,000 terminals/km2) in a cell because it is attached to various sensors and various devices to provide communication functions. In addition, the terminal supporting the mMTC are more likely to be positioned in shaded areas not covered by a cell, such as an underground of building due to nature of services, thus the terminal requires a wider coverage than other services provided by the 5G communication system. The terminals that support the mMTC should be configured as inexpensive terminals and require very long battery life time, such as 10 to 15 years, because it is difficult to frequently replace the battery of the terminal.

Finally, in the case of the URLLC, it is a cellular-based wireless communication service used for mission-critical purposes. For example, services used for a remote control for a robot or machinery, industrial automation, unmanaged aerial vehicle, remote health care, emergency situation, or the like may be considered. Therefore, the communication provided by the URLLC should provide very low latency and very high reliability. For example, a service that supports URLLC should meet air interface latency of less than 0.5 milliseconds and at the same time have requirements of a packet error rate less than 10-5. Therefore, for the service that supports the URLLC, the 5G system should provide a transmit time interval (TTI) smaller than other services, and at the same time, design matters for allocating a wide resource in the frequency band in order to secure the reliability of the communication link are required.

To support the transmission of the downlink and uplink transmission channels in the wireless communication system, the related downlink control signaling is needed. The control signaling in the conventional 4G LTE system includes information on downlink scheduling allocation including information necessary for the terminal to appropriately receive, demodulate, and decode the physical downlink shared channel (PDSCH), an uplink scheduling grant allowing a terminal to notify a physical uplink shared channel (PUSCH) of a used resource and transmission format, acknowledgement for a hybrid automatic repeat request (HARQ) for the PUSCH, or the like. In the LTE system, there is a physical downlink control channel (PDCCH) as a physical layer transmission channel for transmitting the downlink scheduling allocation and the uplink scheduling grant, which is transmitted over the entire band at a head of each subframe. That is, the subframe may be divided into a control area and a data area, in which a size of the control area is designed to occupy one, two, or three OFDM symbols. The size of the control area represented by the number of OFDM symbols may be changed dynamically according to special circumstances such as the size of the system bandwidth and whether the multimedia broadcast multicast services (MBSFN) subframe for broadcasting is configured, which may be indicated to each terminal through a control format indicator (CFI).

On the other hand, unlike the related-art wireless communication system, the 5G wireless communication system aims to support not only services requiring high transmission speed but also services having very short transmission delay and services requiring high connection density. According to these scenarios, it is necessary to be able to provide various services with different transmission/reception techniques and transmission/reception parameters in one system in order to satisfy various requirements and services of users, and it is important to design so that the added services are not constrained by the current system in consideration of forward compatibility. For example, scalable numerology may be used for subcarrier spacing and various services which may concurrently support the same and have different transmission time intervals (TTIs) may be simultaneously provided in one system. Inevitably, the 5G system should be able to use time and frequency resources more flexibly than related-art LTE system. Specifically, it is very important to ensure flexibility in a control channel design.

The PDCCH used in the conventional LTE system is not suitable for ensuring flexibility in that it is transmitted over the entire bandwidth and the size of the control area is configured in a cell-specific manner. Accordingly, in the 5G wireless communication system, a structure in which a control channel may be flexibly allocated according to various requirements of a service is being considered. For example, a 5G downlink control channel on the frequency axis may be set to be a specific subband without being transmitted over the entire band, and may be transmitted while being set to have the number of OFDM symbols having different sizes according to a TTI (or subframe length, slot length, mini-slot length, etc.) on the time axis.

In particular, the 5G communication system considers the subframe length having a shorter time-axis scheduling unit compared to the conventional LTE in order to satisfy very low latency requirements. In the LTE system, a time axis scheduling unit is defined as a subframe, and one subframe consists of fourteen OFDM symbols. On the other hand, in the 5G communication system, it is considered that a time axis scheduling unit is defined as a slot or a mini-slot, the slot consists of seven OFDM symbols, and the mini-slot consists of the number of OFDM symbols smaller than seven.

As a short scheduling unit (e.g., a mini-slot) is supported, which causes a problem that the ratio occupied by the downlink control channel and the RS is relatively large in the entire slot. For example, in the case of the mini-slot consisting of two OFDM symbols, the first OFDM symbol may be used as a downlink control channel area, and the second OFDM symbol may be used as a downlink data channel area. Also, the RS for decoding the downlink control channel and the downlink data channel may be transmitted over two OFDM symbols, respectively. Accordingly, the amount of resources available for transmitting the downlink data is relatively greatly reduced.

The present disclosure may minimize the amount of downlink control information (DCI) transmitted to the downlink control channel by associating the RB assignment of the downlink control channel and the downlink data channel, and minimize by allowing the downlink control channel and the downlink data channel to share the RS.

Figure 41:
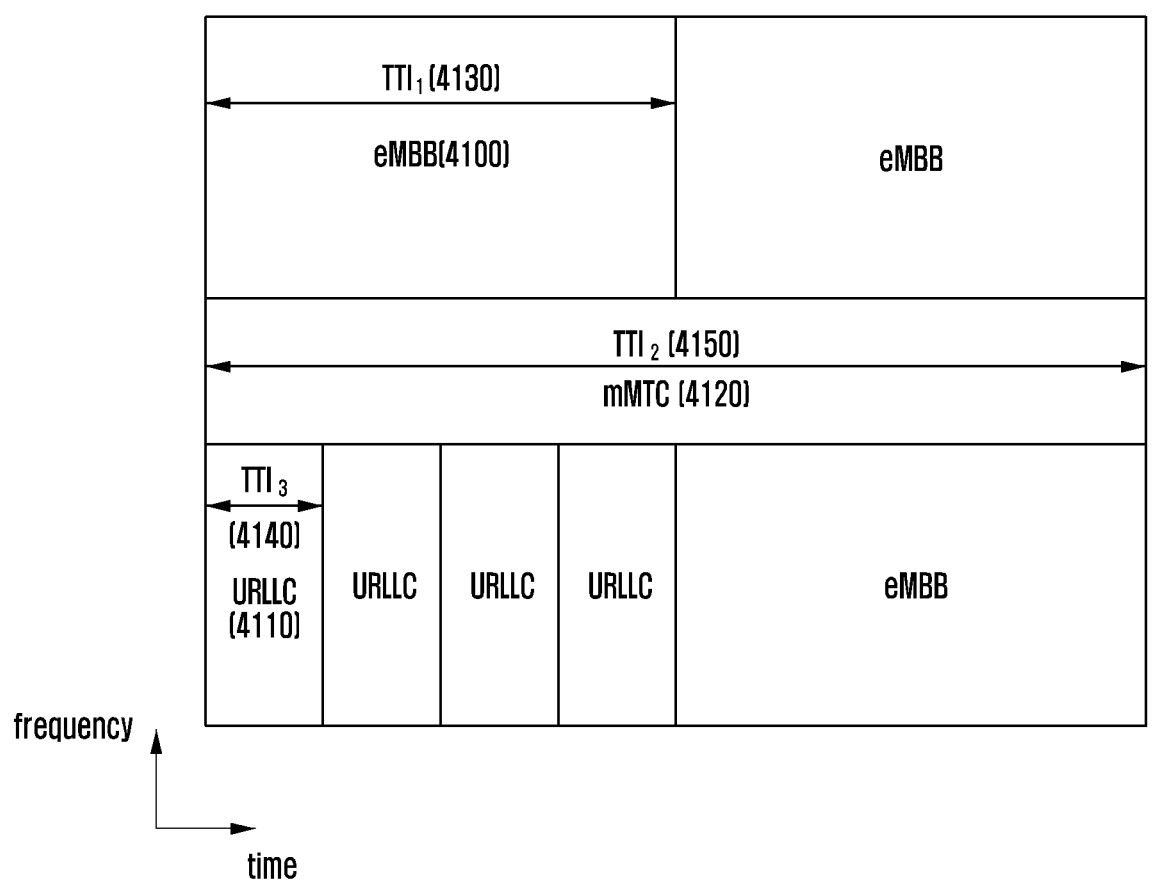
FIG. 41 is a diagram illustrating an example in which 5G services are multiplexed and transmitted in one system according to various embodiments of the present disclosure.

FIG. 41 is a diagram illustrating an example in which various services of the 5G system are multiplexed in one system and transmitted according to various embodiments of the present disclosure. The three services are the same as eMBB 4100, URLLC 4110, and mMTC 4120. According to the example illustrated in FIG. 41, in the 5G communication system, different transmission/reception techniques and transmission/reception parameters can be used between services in order to satisfy different requirements of the respective services. For example, the TTI (or the same scheduling unit, subframe length, slot length, and mini-slot length) may be set differently for each service. In FIG. 41, for example, the eMBB 4100 may be set as TTI 1 4130, the URLLC 4110 may be set as TTI2 4140, and the mMTC 4120 may be set as TTI3 4150. FIG. 41 illustrates that the URLLC may be set to TTI (e.g., TTI2 4140) having a relatively short length on the time axis in order to satisfy a very short delay time.

Hereinafter, the frame structure of the LTE and LTE-A systems will be described in more detail with reference to the drawings.

Figure 42:
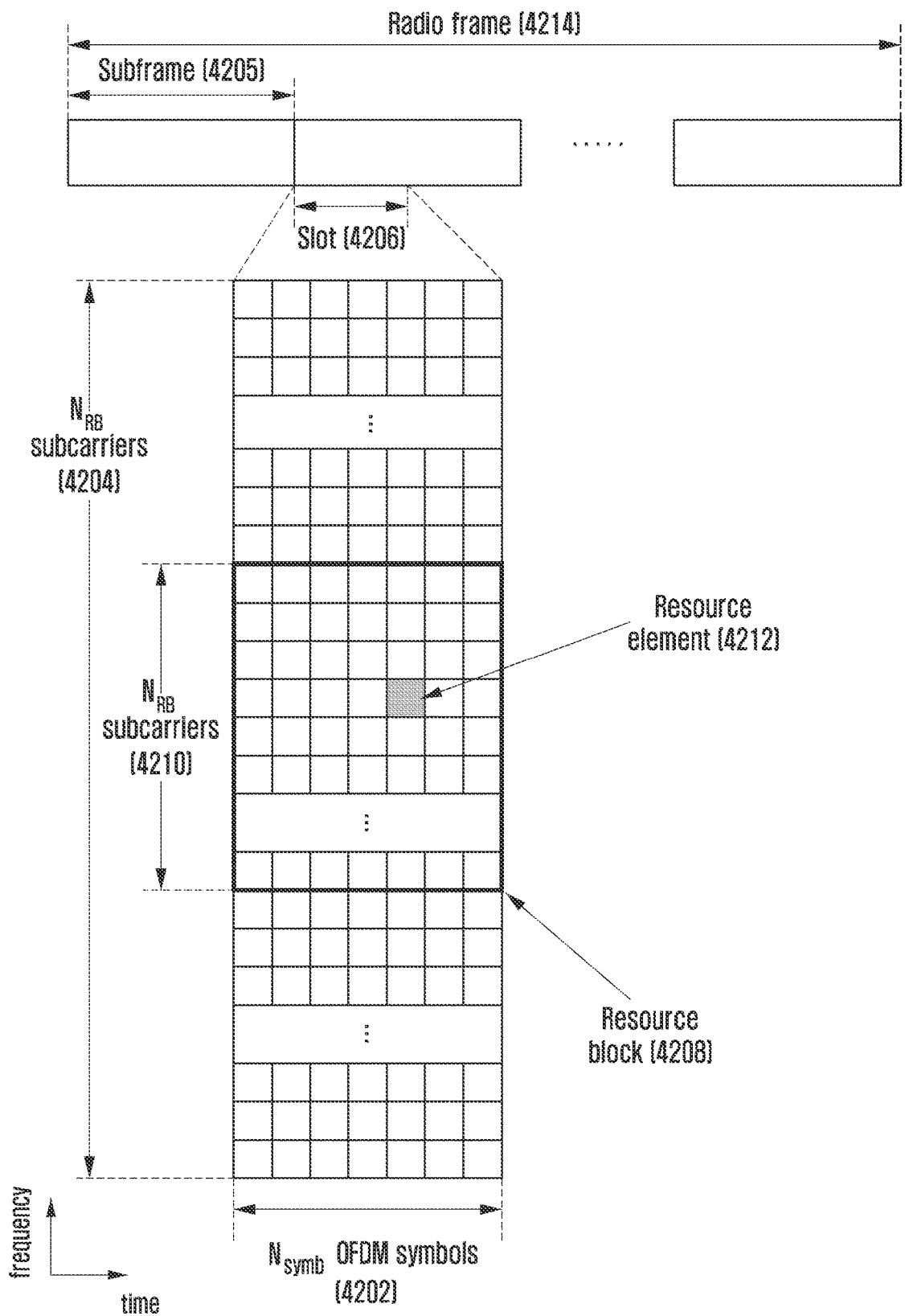
FIG. 42 is a diagram illustrating a basic structure of a time-frequency domain in the LTE according to various embodiments of the present disclosure.

FIG. 42 is a diagram illustrating a basic structure of a time-frequency domain that is a radio resource area to which data or a control channel is transmitted in a downlink of an LTE system according to various embodiments of the present disclosure.

In FIG. 42, a horizontal axis represents a time domain and a vertical axis represents a frequency domain. A minimum transmission unit in the time domain is an OFDM symbol, in which one slot 4206 is configured by collecting $N_{symb}$ OFDM symbols 4202 and one subframe 4205 is configured by collecting two slots. The slot length is 0.5 ms and the subframe length is 1.0 ms. Further, a radio frame 4214 is a time domain unit consisting of 10 subframes. A minimum transmission unit in the frequency domain is a sub-carrier, in which the whole system transmission bandwidth consists of a total of $N_{BW}$ sub-carriers 4204. A basic unit of resources in the time-frequency domain is a resource element (RE) 4212 and may be represented by an OFDM symbol index and a sub-carrier index. A resource block (RB) 4208 (or physical resource block (PRB)) is defined by the $N_{symb}$ continued OFDM symbols 4202 in the time domain and $N_{RB}$ continued sub-carriers 4210 in the frequency domain. Therefore, one RB 4208 consists of $N_{symb} \times N_{RB}$ REs 4212. The PRB pair consists of $N_{symb} \times 2 \times N_{RB}$ REs 4212 in units of two PRBs concatenated on the time axis. Generally, a minimum transmission unit of data is the RB unit. In the LTE system, generally, $N_{symb}=7$ and $N_{RB}=12$ and $N_{BW}$ is proportional to the system transmission bandwidth.

Next, the downlink control information (DCI) in the LTE and LTE-A systems will be described in detail.

In the LTE system, the scheduling information for the downlink data or the uplink data is transmitted from the base station to the terminal through the DCI. The DCI is defined in various formats, and thus the DCI formats are defined depending on whether the DCI is the scheduling information on the uplink data and the scheduling information on the downlink data, whether the DCI is compact DCI having a small size of control information, whether to apply spatial multiplexing using a multiple antenna, whether the DCI is DCI for a power control, or the like and are operated For example, DCI format 1 that is the scheduling control information on the downlink data is configured to include at least following control information.

Resource allocation type 0/1 flag: The information notifies whether a resource allocation scheme is type 0 or type 1. The type 0 applies a bitmap scheme to allocate a resource in a resource block group (RBG) unit. In the LTE system, a basic unit of the scheduling is the resource block (RB) represented by the time-frequency domain resource and the RBG is configured of a plurality of RBs and thus becomes the basic unit of the scheduling in the type 0 scheme. The type 1 allocates a specific RB within the RBG.

Resource block assignment: The RB allocated for the data transmission is informed. The represented resource is determined depending on the system bandwidth and the resource allocation scheme.

Modulation and coding scheme (MCS): The modulation scheme used for the data transmission and a size of a transport block that is the data to be transmitted are informed.

HARQ process number: An HARQ process number is informed.

New data indicator: An HARQ initial transmission or retransmission is informed.

Redundancy version: An HARQ redundancy version is informed.

Transmit power control (TPC) command for physical uplink control channel (PUCCH): A transmit power control command for the PUCCH that is an uplink control channel is informed.

The DCI is subjected to a channel coding and modulation process and then is transmitted through a physical downlink control channel (PDCCH) or an enhanced PDCCH (EPDCCH) that is the downlink physical control channel.

A cyclic redundancy check (CRC) is attached to a payload of a DCI message, and the CRC is scrambled with a radio network temporary identifier (RNTI) corresponding to identity of the terminal. Different RNTIs are used depending on the purpose of the DCI, e.g. UE-specific data transmission, power control command, or random access response. Soon, the RNTI is not explicitly transmitted but is transmitted by being included in the CRC computation process. Upon receiving the DCI message transmitted onto the PDCCH, the terminal checks the CRC using the allocated RNTI. If the confirmation result of the CRC is correct, the terminal can know that the message is transmitted to the terminal.

Next, the downlink control channel through which the DCI is transmitted in the LTE and LTE-A systems will be described in more detail with reference to the drawings.

Figure 43:
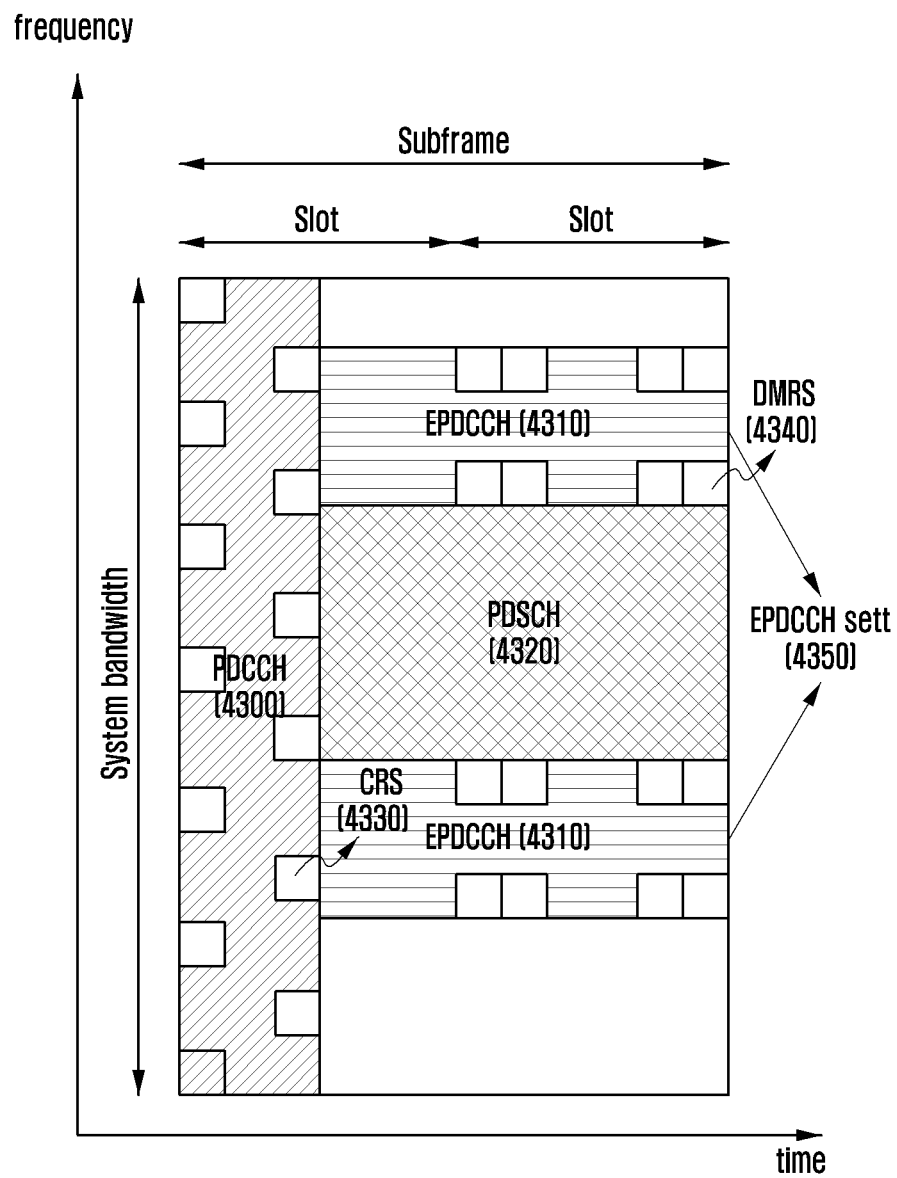
FIG. 43 is a diagram illustrating a physical downlink control channel (PDCCH) and an enhanced PDCCH (EPDCCH), which are downlink control channels of LTE according to various embodiments of the present disclosure.

FIG. 43 is a diagram illustrating PDCCH and enhanced PDCCH (EPDCCH), which are the downlink physical channels through which the DCI of the LTE is transmitted according to various embodiments of the present disclosure.

First, a PDCCH 4300 will be described in detail.

Referring to FIG. 43, the PDCCH 4300 is time multiplexed (TDM) with a PDSCH 4320, which is a data transmission channel, and is transmitted over the entire system bandwidth. The area of the PDCCH 4300 is represented by the number of OFDM symbols, which is indicated to the terminal by a control format indicator (CFI) transmitted through a physical control format indicator channel (PCFICH). The PDCCH 4300 is allocated to the OFDM symbol at a head of a subframe so that the terminal may decode the downlink scheduling allocation as soon as possible. In this way, a decoding delay for a downlink shared channel (DL-SCH), that is, the overall downlink transmission delay may be reduced. One PDCCH carries one DCI message and a plurality of terminals may be scheduled simultaneously on the downlink and uplink, so that a plurality of PDCCHs are simultaneously transmitted in each cell.

A CRS 4330 is used as a reference signal for decoding the PDCCH 4300. The CRS 4330 is transmitted every subframe over the entire band and its scrambling and resource mapping are changed according to cell identity (ID). UE-specific beamforming cannot be used because the CRS 4330 is a reference signal commonly used by all terminals. Therefore, the multi-antenna transmission technique for the PDCCH of the LTE system is limited to open loop transmit diversity. The number of ports of the CRS is implicitly notified to the terminal from the decoding of a physical broadcast channel (PBCH).

The resource allocation of the PDCCH 4300 is based on a control-channel element (CCE), and one CCE consists of nine resource elements (REGs), that is, a total of 36 resource elements (REs). The number of CCEs required for a specific PDCCH 4300 may be 1, 2, 4, or 8, which is changed depending on a channel coding rate of a DCI message payload. As such, the number of different CCEs are used to implement link adaptation of the PDCCH 4300.

The terminal should detect a signal without knowing information about the PDCCH 4300. In the LTE system, a search space representing a set of CCEs for blind decoding is defined. The search space consists of a plurality of aggregates at the aggregation level (AL) of each CCE, which is not explicitly signaled but implicitly defined by function and subframe number by the terminal identity. In each subframe, the terminal decodes the PDCCH 4300 for all possible candidate candidates that may be generated from the CCEs in the set search space, and transmits the information which is declared to be valid to the terminal through the CRC check.

The search space is classified into a UE-specific search space and a common search space. The terminals in a certain group or all the terminals may investigate the common search space of the PDCCH 4300 in order to receive cell-common control information such as dynamic scheduling or paging message for the system information. For example, the scheduling allocation information of the DL-SCH for a transmission of system information block (SIB)-1 including the cell operator information may be received by investigating the common search space of the PDCCH 4300. The terminal-specific DCI, such as the scheduling information for the uplink data and the scheduling information for the downlink data, is transmitted through a mode UE-specific search space.

Next, the EPDCCH 4310 of FIG. 43 will be described in detail.

Referring to FIG. 43, an EPDCCH 4310 is frequency-multiplexed (FDM) with a PDSCH 4320 and transmitted. The base station may appropriately allocate the resources of the EPDCCH 4310 and the PDSCH 4320 through the scheduling, thereby effectively supporting the coexistence with the data transmission for the related-art LTE terminal. However, since the EPDCCH 4310 is allocated over one subframe on the time axis and transmitted, there is a problem in that a loss occurs in terms of transmission latency. A plurality of EPDCCHs 4310 configures one EPDCCH set 4350 and an EPDCCH set 4350 is allocated to units of a physical resource block (PRB) pair. The position information on the EPDCCH set 4350 is set to be UE-specific and is signaled via a remote radio control (RRC). A maximum of two EPDCCH sets 4350 may be configured for each UE, and one EPDCCH set 4350 may be multiplexed and set to different UEs at the same time.

The resource allocation of the EPDCCH 4310 is based on an enhanced CCE (ECCE), and one ECCE may consist of four or eight enhanced REGs (EREGs), and the number of EREGs per ECCE is changed depending on the CP length and the subframe configuration information. One EREG consists of 9 REs, so there may be 16 EREGs per PRB pair. The EPDCCH transmission scheme is classified into localized or distributed transmission according to the RE mapping scheme of the EREG. The aggregation level of the ECCE may be 1, 2, 4, 8, 16 or 32, which is determined by a CP length, a subframe configuration, an EPDCCH format and a transmission mode. The EPDCCH 4310 supports only the terminal-specific search space. Therefore, the terminal which intends to receive a system message should investigate the common search space on the existing PDCCH 4300.

As the transmission scheme for the EPDCCH 4310, there are the localized scheme and the distributed scheme. In the localized transmission scheme, all the EREGs constituting the ECCE exist in the same PRB pair. On the other hand, the EREGs configuring the ECCE by the distributed transmission scheme may exist in different PRB pairs in the plurality of PRB pairs configured in the EPDCCH transmission. In the localized transmission scheme, the UE-specific beamforming may be used, and in the distributed transmission scheme, a diversity technique of a precoder cycling scheme may be used.

In the EPDCCH 4310, a demodulation reference signal (DMRS) 4340 is used as a reference signal for decoding. Thus, the precoding for the EPDCCH 4310 may be set by the base station and the terminal-specific beamforming may be used. Through the DMRS 4340, the terminals may perform decoding on the EPDCCH 4310 without knowing what precoding is used. In the EPDCCH 4310, the same pattern as the DMRS of the PDSCH 4320 is used. However, unlike the PDSCH 4320, the DMRS 4340 in the EPDCCH 4310 may support transmission using up to four antenna ports. The DMRS 4340 is transmitted only in the corresponding PRB to which the EPDCCH is transmitted.

The port configuration information of the DMRS 4340 is changed depending on the transmission mode of the EPDCCH. In the case of the localized transmission scheme, the antenna port corresponding to the ECCE to which the EPDCCH 4310 is mapped is randomly selected based on the ID of the terminal. If different terminals share the same ECCE, that is, a multiuser MIMO transmission is used, the DMRS antenna port may be allocated to each terminal. Alternatively, the DMRS 4340 may be shared and transmitted. In this case, the DMRS 4340 may be divided into a scrambling sequence configured as upper layer signaling. In the case of the distributed transmission scheme, up to two antenna ports of the DMRS 4340 are supported, and the DMRS 4340 may be shared for all REs transmitted in one PRB pair.

Next, a method for allocating a resource for downlink control information (DCI) of LTE and LTE-A systems will be described in detail.

In the LTE, three types of resource allocation schemes (resource allocation type 0, resource allocation type 1, resource allocation type 2) are supported for the PDSCH.

In the resource allocation type 0, non-contiguous RB assignment is supported on the frequency axis and a bitmap is used to indicate the allocated RB. In this case, if the corresponding RBs are displayed with a bitmap having the same size as the number of RBs, it is necessary to transmit a very large bitmap for a large cell bandwidth, resulting in a high control signaling overhead. Therefore, in the resource allocation type 0, the method for reducing a size of a bit map by grouping contiguous RBs without indicating each RB in the frequency domain and indicating the group has been used. For example, when the total transmission bandwidth is $N_{RB}$ and the number of RBs per resource block group (RBG) is P, the bitmap necessary to notify RB assignment information in resource allocation type 0 becomes $[N_{RB}/P]$. The smaller the number of RBs per RBG, that is, the P value, the greater the flexibility of the scheduling, but the greater the control signaling overhead. Therefore, the P value should be selected appropriately so as to reduce the required number of bits while maintaining sufficient resource allocation flexibility. In the LTE system, the P value is determined by the downlink cell bandwidth and can have a value from 1 to 4.

In the resource allocation type 1, the resource allocation is performed by dividing the entire RBG set on the frequency axis into a scattered RBG subset. The number of subsets is given by the cell bandwidth, and the number of subsets of the resource allocation type 1 is equal to a group size P of resource allocation type 0. The RB assignment information of the resource allocation type 1 consists of three fields as follows.

First field: Selected RBG subset indicator ($[\log_{2(P)}]$ bit).

Second field: Indicator indicating whether to shift resource allocation in subset (1 bit).

Third field: Bitmap for allocated RBG ($[N_{RB}/P]-[\log_2(P)]-1$ bit).

As a result, the total number of bits used in resource allocation type 1 becomes $[N_{RB}/P]$ and is equal to the number of bits required in the resource allocation type 0. Therefore, a 1-bit indicator is added to notify the terminal of whether the resource allocation type is 0 or 1.

The resource allocation type 2 is not bitmap-based, unlike the two resource allocation types described above. Instead, the resource allocation is represented by the start point and length of the RB assignment. Thus, the resource allocation types 0 and 1 both support non-contiguous RB assignment, while the resource allocation type 2 supports only the contiguous sequential allocation. As a result, the RB assignment information of the resource allocation type 2 consists of two fields as follows.

First field: Indicator indicating RB start point (RBstart).

Second field: Indicator indicating length (LCRBs) of contiguously allocated RBs.

In the resource allocation type 2, the total number of bits $[\log_2(N_{RB}(N_{RB}+1)/2)]$ is used.

All three resource allocation types correspond to a virtual resource block (VRB). In the resource allocation types 0 and 1, the VRB are directly mapped to the physical resource block (PRB) in the localized form. On the other hand, in the resource allocation type 2, the VRBs in the localized and distributed forms are supported. Therefore, in the resource allocation type 2, there is an additional indicator to discriminate the localized and distributed VRBs.

The structure and transmission method for the downlink control channel in the conventional LTE and LTE-A systems have been described above.

Hereinafter, the downlink control channel (hereinafter, new radio physical downlink control channel (NRC-PDCCH)) considered in the 5G radio communication system will be described in more detail with reference to the drawings.

Figure 44:
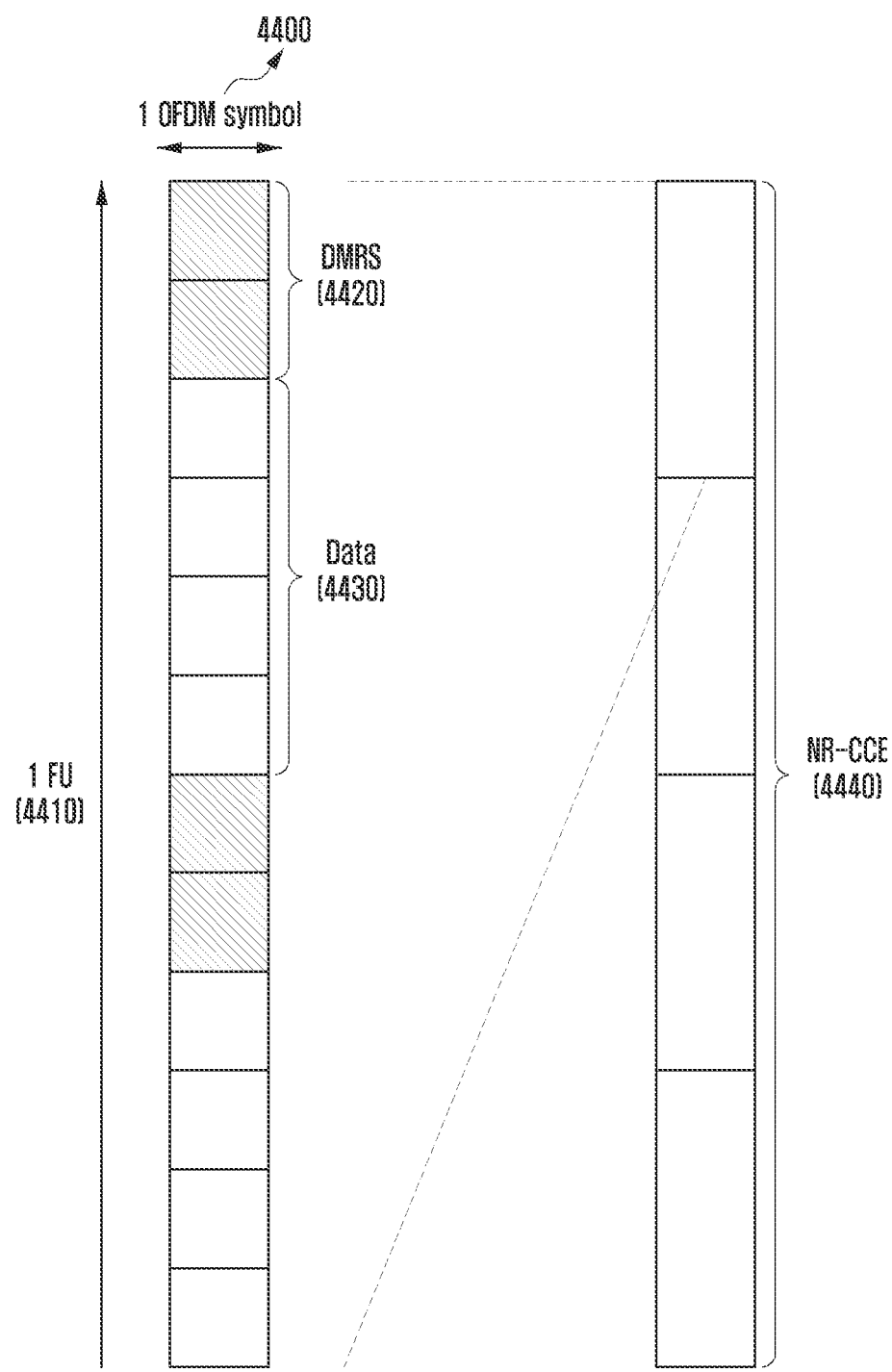
FIG. 44 is a diagram illustrating the 5G downlink control channel according to various embodiments of the present disclosure.

FIG. 44 is a diagram illustrating an example of the time and frequency resources configuring the NR-PDCCH considered in the 5G according to various embodiments of the present disclosure. Referring to FIG. 44, the basic unit of the time and frequency resources configuring the control channel consists of one OFDM symbol 4400 on the time axis and one frequency unit 4410 on the frequency axis. In this case, 1 FU is defined as a basic unit of a frequency resource for performing scheduling from the base station to the terminal. For example, if the scheduling is performed in 12 frequency subcarriers or 1 physical resource block (PRB) unit as a basic unit in the frequency domain, the 1 FU may be defined as a size corresponding to 12 subcarriers (i.e., 12 REs).

The data channel and the control channel may be time multiplexed within one subframe by assuming that the basic unit on the time axis is one OFDM symbol 4400 in configuring the basic unit of the control channel. In addition, by placing the control channel ahead of the data channel, it is possible to reduce the processing time of the user and it is easy to satisfy the delay time requirement. By setting the basic unit of the frequency axis of the control channel to the 1 FU 4410, it is possible to more efficiently perform the frequency multiplexing between the control channel and the data channel. If the basic unit of the frequency axis consists of arbitrary subcarriers smaller than the 1 FU 4410, there is a disadvantage in that the start point on the frequency axis for the scheduled data should be indicated in units of subcarriers.

By connecting the basic units of the NR-PDCCH illustrated in FIG. 44, it is possible to set the control channel areas having various sizes. For example, if a basic unit in which the downlink control channel is allocated in the 5G system is an NR-CCE 4440, 1 NR-CCE 4440 may be configured as a basic unit of the 5G downlink control channel (e.g., in units of PRB). For example, referring to FIG. 44, if the 1 NR-CCE 4440 consists of four PRBs, the 1 NR-CCE may consist of 48 REs. If the downlink control area is set, the corresponding area may consist of a plurality of NR-CCEs 4440. The specific downlink control channel may be mapped to one or a plurality of NR-CCEs 4440 according to the aggregation level (AL) within the control area and transmitted. The NR-CCEs 4440 in the control area are identified by number and the number may be given according to a logical mapping scheme. The actual physical resource allocation to the NR-CCE 4440 may be mapped as a unit of the PRB. At this time, a block interleaver and a cell-specific cyclic shift are additionally used to make the control channel robust.

As the transmission scheme of the NR-PDCCH, there may be the localized scheme and the distributed scheme. In the localized transmission scheme, a plurality of contiguous PRBs on the frequency axis may configure one NR-CCE 4440. On the other hand, in the distributed transmission scheme, a plurality of non-contiguous PRBs on the frequency axis may configure one NR-CCE 4440. Different transmission schemes may be used for the localized and distributed schemes. For example, in the localized scheme, the UE-specific beamforming may be used, and in the distributed scheme, a diversity transmission scheme such as precoder cycling may be used.

The basic unit of the NR-PDCCH illustrated in FIG. 44 may include a data area 4430 to which the DCI is mapped and an area to which the DMRS 4420, which is a reference signal for decoding the same, is mapped. The DMRS 4420 of the NR-PDCCH illustrated in FIG. 44 may be set to be a common or shared RS or a UE-specific or PDCCH-specific RS according to the transmission mode of the NR-PDCCH. For example, if the NR-PDCCH is set to be the localized scheme and thus the UE-specific beamforming is used, the DMRS 4420 in the resource to which the NR-PDCCH is transmitted may be set as the UE-specific RS for the UE only. As another example, if the NR-PDCCH is set to be the distributed mode and thus the transmission technique of the transmit diversity is used, the DMRS 4420 in the resource in which the plurality of NR-PDCCHs are allocated to different the terminals may be set as the common RS that the plurality of terminals may commonly use.

On the other hand, the transmission of the DMRS 4420 may be efficiently transmitted considering the overhead due to the RS allocation. For example, the DMRS 4420 may be turned on or off depending on the antenna port setting used by the base station or the scheme by which the downlink control channel is allocated. In other words, it is noted that the DMRS 4420 may or may not be transmitted within the PRB. The DMRS 4420 is turned off and may be used to transmit the DCI for the RE which is not transmitted.

Figure 45:
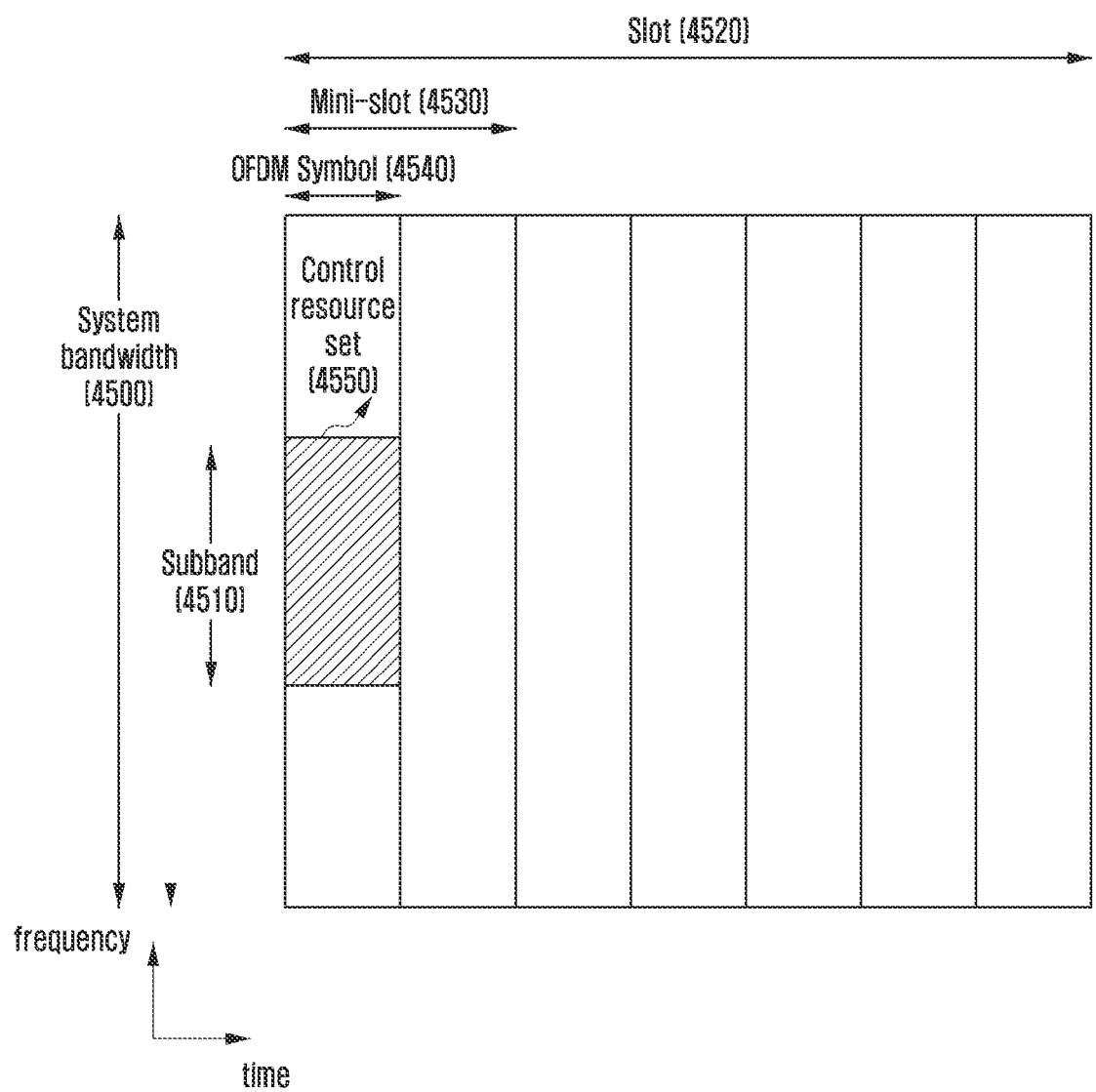
FIG. 45 is a diagram illustrating an example of subband setting for the 5G downlink control channel according to various embodiments of the present disclosure.

FIG. 45 is a diagram illustrating an example of subband setting for the NR-PDCCH according to various embodiments of the present disclosure. In FIG. 45, a system bandwidth 4500 is shown on the frequency axis, and a slot 4520 and a mini-slot 4530 are shown on the time axis, with respect to time and frequency resources for transmission in the 5G system. In one example of FIG. 45, a slot 4520 consists of seven OFDM symbols 4540, and the mini-slot 4530 consists of two OFDM symbols 4540. In FIG. 45, a control channel resource set 4550 is defined as a time and frequency resource area in which the NR-PDCCH may be transmitted. The control channel resource set 4550 may be set to be the size of the subband 4510 on the frequency axis and may be set to be one or a plurality of OFDM symbols 4540 on the time axis. In the example illustrated in FIG. 45, the control channel resource set 4550 is set to be a subband 4510 on the frequency axis and one OFDM symbol 4540 on the time axis. The control channel resource set 4550 may be set to be a plurality of subbands 4510 within the entire system bandwidth 4500. The time and frequency domain for the control channel resource set 4550 may be set via various signaling (e.g., RRC, MIB, common DCI, etc.).

Figure 46:
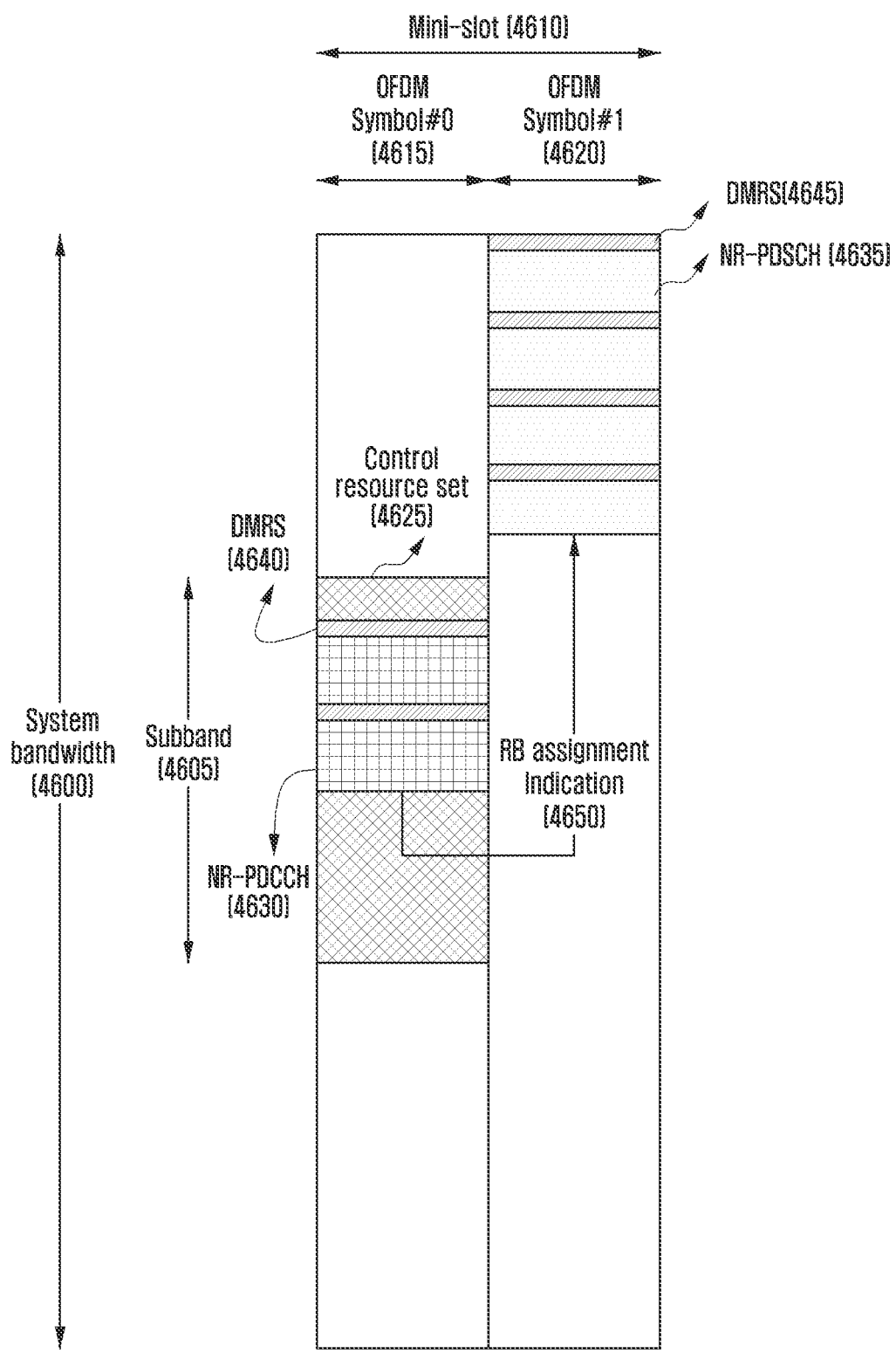
FIG. 46 is a diagram illustrating an example of a downlink control channel and a downlink data channel in a mini-slot according to various embodiments of the present disclosure.

FIG. 46 is a diagram illustrating an example of the downlink control channel (NR-PDCCH) and the downlink data channel (NR-PDSCH) in the mini-slot according to various embodiments of the present disclosure. FIG. 46 illustrates an example in which the mini-slot 4610 consists of two OFDM symbols (OFDM symbol #0 (4615), OFDM symbol #1 (4620)). A control channel resource set 4625 for the NR-PDCCH transmission may be set to be a specific subband 4605 in the entire system band 4600 on the frequency axis and one OFDM symbol (e.g., OFDM symbol #0 4615) on the time axis. A specific NR-PDCCH 4630 may be transmitted through any area within the control channel resource set 4625 and a DMRS 4640 for decoding the NR-PDCCH 4630 as described above may be transmitted. An NR-PDSCH 4635 may be transmitted in all areas except the area in which the NR-PDCCH 4630 is actually transmitted. In FIG. 46, a specific NR-PDSCH 4635 is shown to be transmitted to a second OFDM symbol (OFDM symbol #1 4620). However, it is to be noted that the NR-PDSCH 4635 may be transmitted in all areas in which the NR-PDCCH 4630 of the OFDM symbol #0 (4615) is allocated and transmitted. A DMRS 4645 for decoding the NR-PDSCH 4635 may be sent within the RB to which the NR-PDSCH 4635 is allocated.

An indicator 4650 for the resource allocation for the NR-PDSCH 4635 may be known in the form of resource allocation types 0, 1, or/and 2, or the like described above and may be included in the DCI transmitted to the NR-PDCCH 4630. The terminal may decode the NR-PDSCH 4635 with the DCI acquired by decoding the NR-PDCCH 4630.

The structure and transmission method for a downlink control channel in a 5G wireless communication system have been described above.

As described above, the 5G wireless communication system may support transmission units of various lengths, for example, slot or mini-slot transmission. For example, as illustrated in FIG. 46, a mini-slot transmission consisting of two OFDM symbols may be supported to satisfy very low latency requirement. Like the example of FIG. 46, in the case of the mini-slot consisting of two OFDM symbols, the first OFDM symbol may be used as a downlink control channel area, and the second OFDM symbol may be used as a downlink data channel area. Also, the RS for decoding the downlink control channel and the downlink data channel may be transmitted over two OFDM symbols, respectively. In order to more efficiently perform the downlink control channel and the downlink data channel transmission through the mini-slot considered in the present disclosure, the following considerations may be considered.

Since the RS overhead is large due to the RS of the downlink data channel and the downlink control channel that may be transmitted over each OFDM symbol in the mini-slot are large, the RS overhead needs to be minimized to ensure more available resources for the downlink data transmission.

In the mini-slot, the downlink control channel may be transmitted in units of mini-slots, and accordingly the terminal is required to frequently monitor the downlink control channel. In order to reduce the processing time and the power consumption required for the downlink control channel decoding, there is a need to minimize the DCI size.

Accordingly, the present disclosure proposes a transmission method and apparatus for efficiently transmitting a downlink control channel and a downlink data channel when a short-length slot is supported in a 5G wireless communication system. In the present disclosure, the number of bits required for RB assignment may be reduced by associating the RB assignment of the DL control channel and the DL data channel, such that the amount of DCI transmitted to the downlink control channel may be minimized.

Also, the RS used for the downlink control channel may be reused to decode all or part of the downlink data channel, such that the RS overhead may be reduced. Here, for example, the reuse of the RS may mean that the channel information used for decoding the downlink control channel is used for decoding the downlink data channel. The reuse of the RS of the downlink control channel not only reduces the RS overhead but also uses the estimated channel information for decoding the downlink control channel in the downlink data channel decoding, such that the processing time may be reduced.

Hereinafter, exemplary embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

Further, in describing in detail embodiments of the present disclosure, the LTE and the 5G system will be described as a major target. However, a main subject of the present disclosure may be slightly changed to be applied to other communication systems having similar technical backgrounds and a channel type without greatly departing the scope of the present disclosure, which may be determined by those skilled in the art to which the present disclosure pertains.

In the following, the mini-slot (i.e., two OFDM symbols configuring the mini-slot) illustrated in FIG. 46 is considered as an example in explaining various embodiments of the present disclosure. However, it should be noted that the main gist of the present disclosure are not limited to the above description, but may be identically applied to the mini-slots or the slots having various lengths.

3-1-th Embodiment

Figure 47:
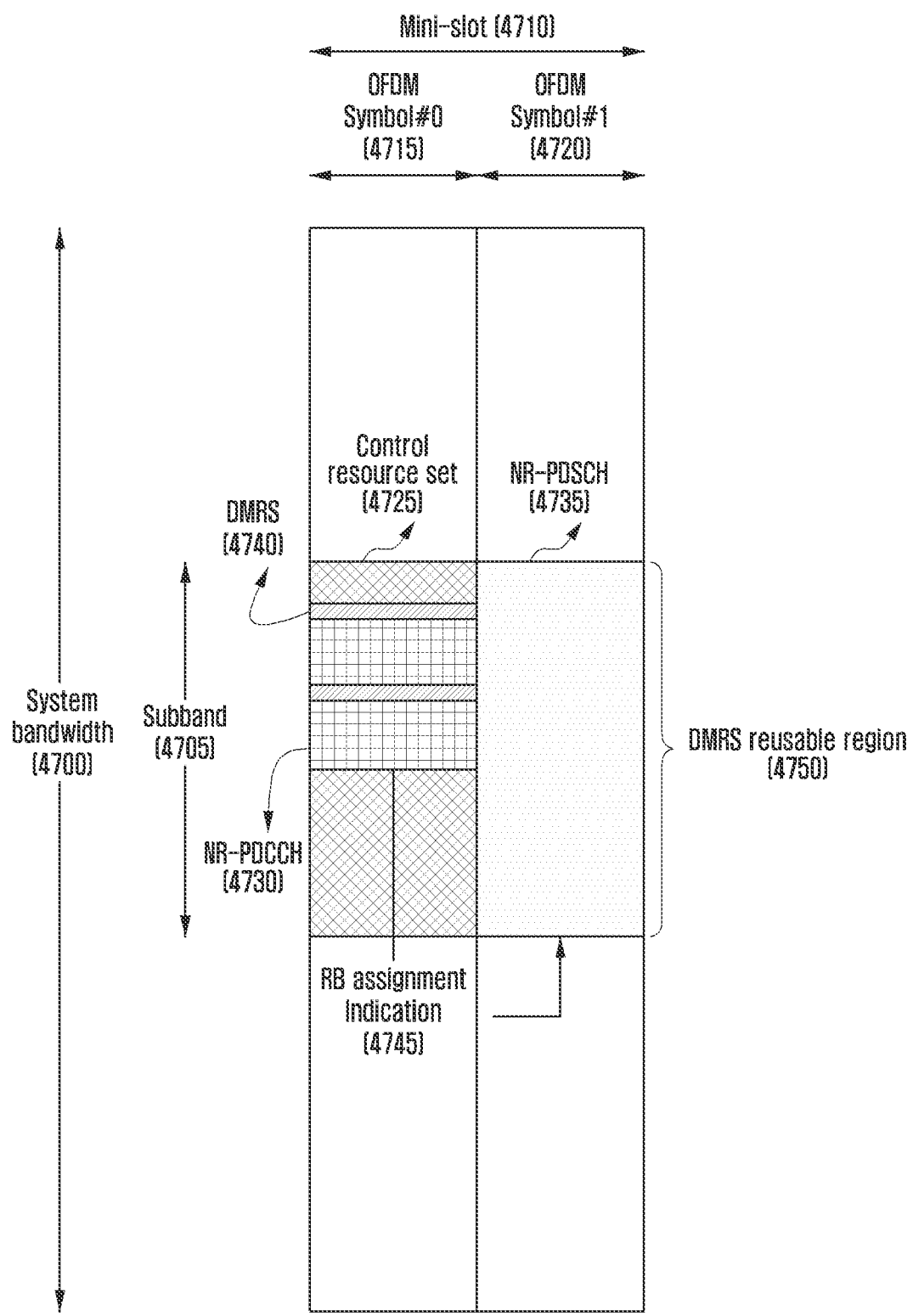
FIG. 47 is a diagram illustrating a 3-1-th embodiment according to various embodiments of the present disclosure.

FIG. 47 is a diagram illustrating a 3-1-th embodiment according to various embodiments of the present disclosure.

As illustrated in FIG. 47, a mini-slot 4710 consists of two OFDM symbols 4715 and 4720, and a control channel resource set 4725 is set to be a specific subband 4705 of OFDM symbol #0 4715. A specific NR-PDCCH 4730 may be transmitted while being mapped to any RB within the control channel resource set 4725 and a DMRS 4740 for decoding the NR-PDCCH 4730 may be transmitted.

In the 3-1-th embodiment of the present disclosure illustrated in FIG. 47, the NR-PDSCH 4735 may be mapped and transmitted in any RB in the subband 4705 set to the control channel resource set 4725 on the frequency axis. At this time, an RB assignment indicator 4745 for the NR-PDSCH 4735 may be obtained from the DCI transmitted to the NR-PDCCH 4730. The transmission structure according to the 3-1-th embodiment of the present disclosure has the following characteristics.

Since the NR-PDSCH 4735 is transmitted within the subband 4705 set as the control channel resource set 4725, the RB assignment indicator 4745 may determine the number of bits by using the subband 4705 bandwidth as the system parameter, not the system bandwidth 4700. When the above-described resource allocation types 0, 1 and/or 2 are used, the number of bits of the RB assignment indicator 4745 increases as the bandwidth in which the RB assignment is made is getting larger. Accordingly, as the NR-PDSCH 4735 is transmitted only in the subband 4705 having a bandwidth smaller than the system bandwidth 4700, the number of bits for the RB assignment indication may be reduced.

The DMRS 4740 of the NR-PDCCH 4730 transmitted in the subband 4705 may be reused (DMRS reuse possible area 4750 of FIG. 47) to decode the NR-PDSCH 4730 when the distributed transmission scheme is configured for the NR-PDCCH 4730 transmission in the set control channel resource set 4725. As described above, the NR-PDCCH 4730 set by the distributed transmission mode may use the transmission technique of the transmit diversity such as precoder cycling. At this time, the NR-PDCCH 4730 transmitted to the plurality of terminals may be configured as the common or shared RS. In addition, the common or shared RS (RS) may be transmitted over the entire subband 4705 configured in the control channel resource set 4725. Thus, if the NR-PDSCH 4735 uses the same transmission scheme as the NR-PDCCH 4730, for example, precoder cycling, then the DMRS 4740 of the NR-PDCCH 4730 may be used to decode the ND-PDSCH 4735. Therefore, if different transmission techniques are used for the NR-PDSCH 4735 and the NR-PDCCH 4730, the DMRS for decoding the NR-PDSCH 4735 may be additionally transmitted in OFDM symbol #1 4715.

The base station operated according to the 3-1-th embodiment of the present disclosure illustrated in FIG. 47 may schedule the NR-PDSCH 4735 of any terminal with the subband 4705 configured in the control channel resource set 4725 of the corresponding terminal and may additionally transmit an indicator for the reuse of the DMRS 4740 of the NR-PDCCH 4730 to the corresponding terminal. When acquiring the reuse indicator for the DMRS 4740, the corresponding terminal may use the estimated channel information using the DMRS 4740 of the NR-PDCCH 4730 in decoding the NR-PDSCH 4735.

3-2-th Embodiment

Figure 48:
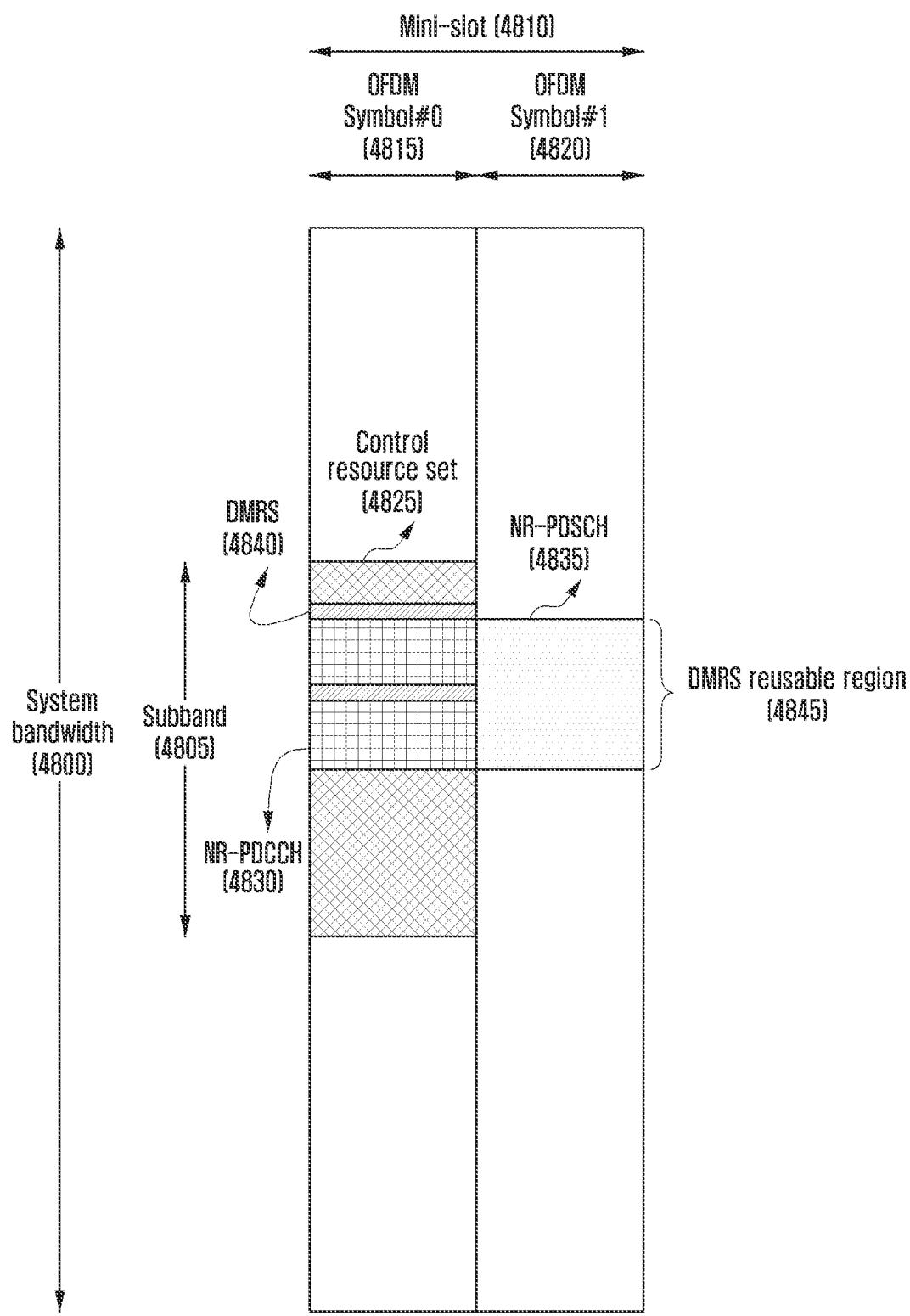
FIG. 48 is a diagram illustrating a 3-2-th embodiment according to various embodiments of the present disclosure.

FIG. 48 is a diagram illustrating a 3-2-th embodiment according to various embodiments of the present disclosure.

As illustrated in FIG. 48, a mini-slot 4810 consists of two OFDM symbols 4815 and 4820, and a control channel resource set 4825 is set to be a specific subband 4805 smaller than the system bandwidth 4800 of OFDM symbol #0 4815. A specific NR-PDCCH 4830 may be transmitted while being mapped to any RB within the control channel resource set 4825 and a DMRS 4840 for decoding the NR-PDCCH 4830 may be transmitted.

In the 3-2-th embodiment of the present disclosure illustrated in FIG. 48, an NR-PDSCH 4835 may be mapped and transmitted to the same RB as the RB to which the actual NR-PDCCH 4830 is transmitted. The terminal may perform blind decoding on the NR-PDCCH in the search space configured in the control channel resource set 4825. The terminal may perform the blind decoding to find the RB to which the NR-PDCCH 4830 is transmitted and perform decoding on the NR-PDSCH 4835 under the assumption that the NR-PDSCH 4835 has been transmitted to the same RB. The transmission structure according to the 3-2-th embodiment of the present disclosure has the following characteristics.

Since the NR-PDSCH 4835 is mapped and transmitted to the same RB as the NR-PDCCH 4830, it is not necessary to transmit the RB assignment indicator for the NR-PDSCH 4835 to the DCI. In this way, it is possible to greatly reduce the size of the DCI transmitted through the NR-PDCCH 4830.

Since the NR-PDSCH 4835 is mapped and transmitted to the same RB as the NR-PDCCH 4830, there is a possibility that the DMRS 4840 may be reused (DMRS reuse possible area 4845 of FIG. 48) regardless of the configuration of the NR-PDCCH 4830 (e.g., localized or distributed scheme). As described above, if the same transmission technique is used for the NR-PDCCH 4830 and NR-PDSCH 4835, the DMRS 4840 of the NR-PDCCH 4830 may be reused to decode the NR-PDSCH 4835.

The base station operated according to the 3-2-th embodiment of the present disclosure illustrated in FIG. 48 may schedule the NR-PDSCH 4835 of any terminal to the same RB as the NR-PDCCH 4830, and may additionally transmit the reuse indicator for the DMRS 4840 to the corresponding terminal. When acquiring the reuse indicator for the DMRS 4840, the corresponding terminal may use the estimated channel information using the DMRS 4840 of the NR-PDCCH 4830 in decoding the NR-PDSCH 4835.

3-3-th Embodiment

Figure 49:
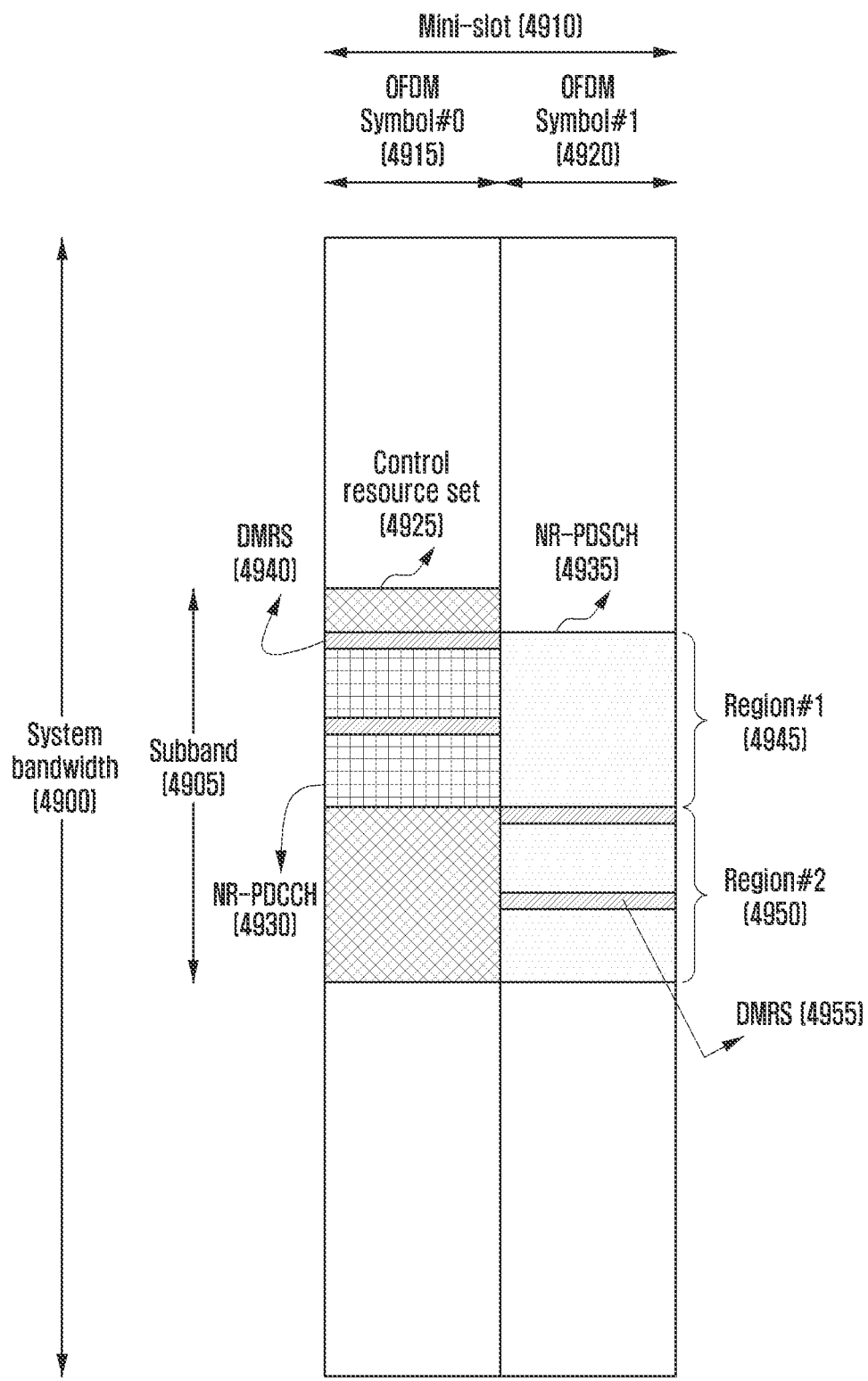
FIG. 49 is a diagram illustrating a 3-3-th embodiment according to various embodiments of the present disclosure.

FIG. 49 is a diagram illustrating a 3-3-th embodiment according to various embodiments of the present disclosure.

As illustrated in FIG. 49, a mini-slot 4910 consists of two OFDM symbols 4915 and 4920, and a control channel resource set 4925 is set to be a specific subband 4805 smaller than the system bandwidth 4900 of OFDM symbol #0 4915. A specific NR-PDCCH 4930 may be transmitted while being mapped to any RB within the control channel resource set 4925 and a DMRS 4940 for decoding the NR-PDCCH 4930 may be transmitted.

In the 3-3-th embodiment of the present disclosure illustrated in FIG. 49, a part of the NR-PDSCH 4935 may be mapped and transmitted (in the example illustrated in FIG. 49 (area #1 4945)) to the same RB as the RB to which the actual NR-PDCCH 4930 is transmitted. The terminal may perform the blind decoding to find the RB to which the NR-PDCCH 4930 is transmitted and may assume that a part of the NR-PDSCH 4935 has been transmitted to the same RB. The additional RB assignment information for a part (area #2, 4950) which is not scheduled with the same RB as the NR-PDCCH 4930 of the NR-PDSCH 4935 may be explicitly or implicitly known. The transmission structure according to the 3-3-th embodiment of the present disclosure has the following characteristics.

The RB assignment indicator need not be transmitted to an area in which the NR-PDSCH 4935 is scheduled and transmitted to the same RB as the NR-PDCCH 4930, that is, area #1 4945. The RB assignment indicator for an area in which the NR-PDSCH 4935 is scheduled and is not transmitted to the same RB as the NR-PDCCH 4930, that is, area #2 4950 may be known as the very small number of bits. For example, it is assumed that the RB start point of the area #2 4950 is an RB end point of the area #1 4945, and only the allocated RB length information may be explicitly known. Alternatively, the RB assignment information for the area #2 4950 may be implicitly known. For example, it is assumed that the RB start point of the area #2 4950 is the RB end point of the area #1 4945, and an area #2 (3i-920) may be transmitted by being previously configured to have the same allocation information (e.g., RB index, allocated RB length, or the like). In this way, it is possible to greatly reduce the size of the DCI transmitted to the NR-PDCCH 4930.

The DMRS 4940 may be reused for the area in which the NR-PDSCH 4935 is scheduled and transmitted to the same RB as the NR-PDCCH 4930, that is, area #1 4945 regardless of the configuration (e.g., localized or distributed scheme) of the NR-PDCCH 4930. The DMRS 4955 for decoding the NR-PDSCH 4935 may be additionally transmitted to an area in which the NR-PDSCH 4935 is scheduled and is not transmitted to the same RB as the NR-PDCCH 4930, that is, area #2 4950.

The base station operated according to the 3-3-th embodiment of the present disclosure illustrated in FIG. 49 may schedule a part of an NR-PDSCH 4935 of any terminal to the same RB (e.g., area #1) as the NR-PDCCH 4930 and schedule the remaining NR-PDSCH 4935 to other RBs (e.g., area #2). The base station may additionally transmit a reuse indicator for the DMRS 4940 in the area #1 4945 and the indicator for the RB assignment in the area #2 4950 to the corresponding terminal. When acquiring the reuse indicator for the DMRS 4940, the corresponding terminal may use the estimated channel information using the DMRS 4940 of the NR-PDCCH 4930 in decoding the NR-PDSCH 4935.

3-4-th Embodiment

Figure 50:
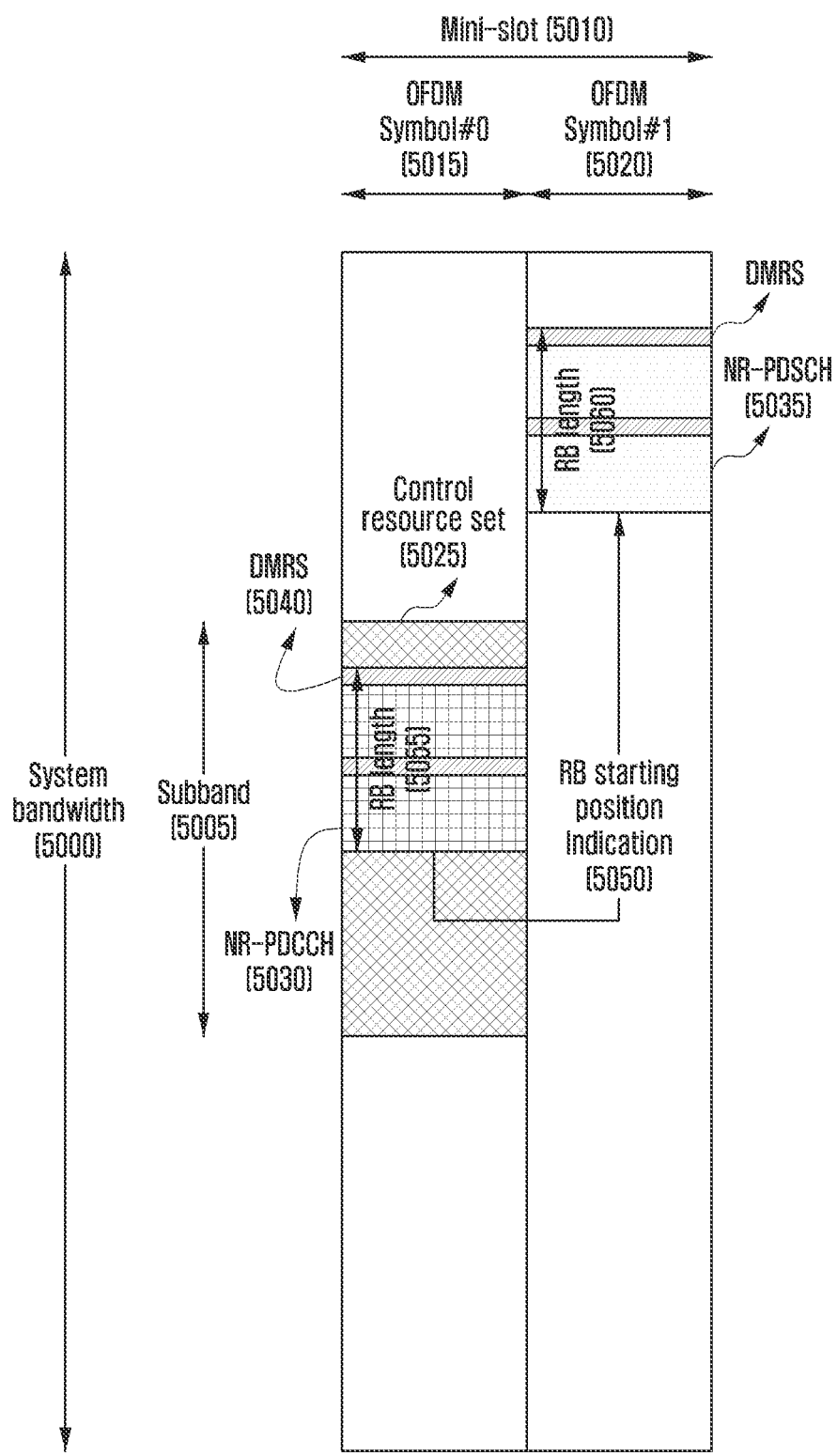
FIG. 50 is a diagram illustrating a 3-4-th embodiment according to various embodiments of the present disclosure.

FIG. 50 is a diagram illustrating a 3-4-th embodiment according to various embodiments of the present disclosure.

As illustrated in FIG. 50, a mini-slot 5010 consists of two OFDM symbols 5015 and 5020, and a control channel resource set 5025 is set to be a specific subband 5005 smaller than the system bandwidth 5000 of OFDM symbol #0 5015. An NR-PDCCH 5030 may be transmitted while being mapped to any RB within the control channel resource set 5025 and a DMRS 5040 for decoding the NR-PDCCH 5030 may be transmitted.

In the 3-4-th embodiment of the present disclosure 50 illustrated in FIG. 50, the RB assignment length 5060 of the NR-PDSCH 5035 is scheduled to be the same as the RB assignment length 5055 of the NR-PDCCH 5030. Therefore, the terminal may know the RB assignment length 5055 for the NR-PDCCH 5030 through blind decoding and may perform decoding on the NR-PDSCH 5035 under the assumption that the transmission to the same RB assignment length 5060 as the RB assignment length 5055 for the NR-PDSCH 5035 is made. At this time, an RB start point indicator 5050 for the NR-PDSCH 5035 may be additionally transmitted to the DCI.

3-5-th Embodiment

Figure 51:
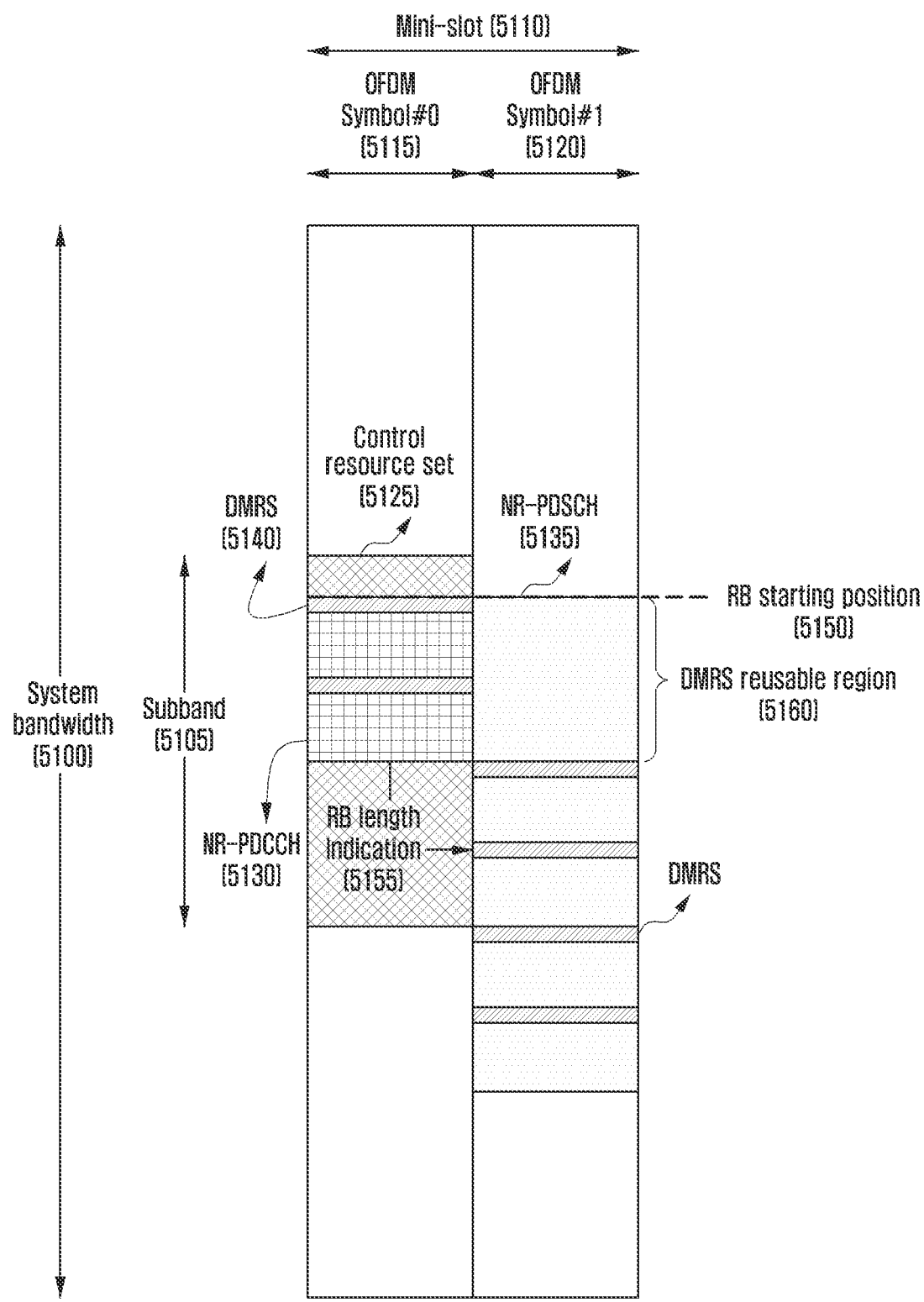
FIG. 51 is a diagram illustrating a 3-5-th embodiment according to various embodiments of the present disclosure.

FIG. 51 is a diagram illustrating a 3-5-th embodiment according to various embodiments of the present disclosure.

As illustrated in FIG. 51, a mini-slot 5110 consists of two OFDM symbols 5115 and 5120, and a control channel resource set 5125 is set to be a specific subband 5105 smaller than the system bandwidth 5100 of OFDM symbol #0 5115. An NR-PDCCH 5130 may be transmitted while being mapped to any RB within the control channel resource set 5125 and a DMRS 5140 for decoding the NR-PDCCH 5130 may be transmitted.

In the 3-5-th embodiment of the present disclosure 51 illustrated in FIG. 50, the RB assignment start point 5150 of the NR-PDSCH 5135 is scheduled to be the same as the RB assignment length 5150 of the NR-PDCCH 5130. Therefore, the terminal may know the RB assignment start point 5150 for the NR-PDCCH 5130 through blind decoding and may perform decoding on the NR-PDSCH 5135 under the assumption that the transmission to the same RB assignment start point 5150 for the NR-PDSCH 5135 is made. At this time, an RB assignment length 5155 for the NR-PDSCH 5135 may be additionally transmitted to the DCI.

According to the 3-5-th embodiment of the present disclosure, there may be an area 5160 in which the NR-PDSCH 5135 may reuse the DMRS 5140 of the NR-PDCCH 5130. Therefore, the base station may transmit the additional indicator for the reuse of the DMRS 5140 to the DMRS reuse possible area 5160.

3-6-th Embodiment

Figure 52:
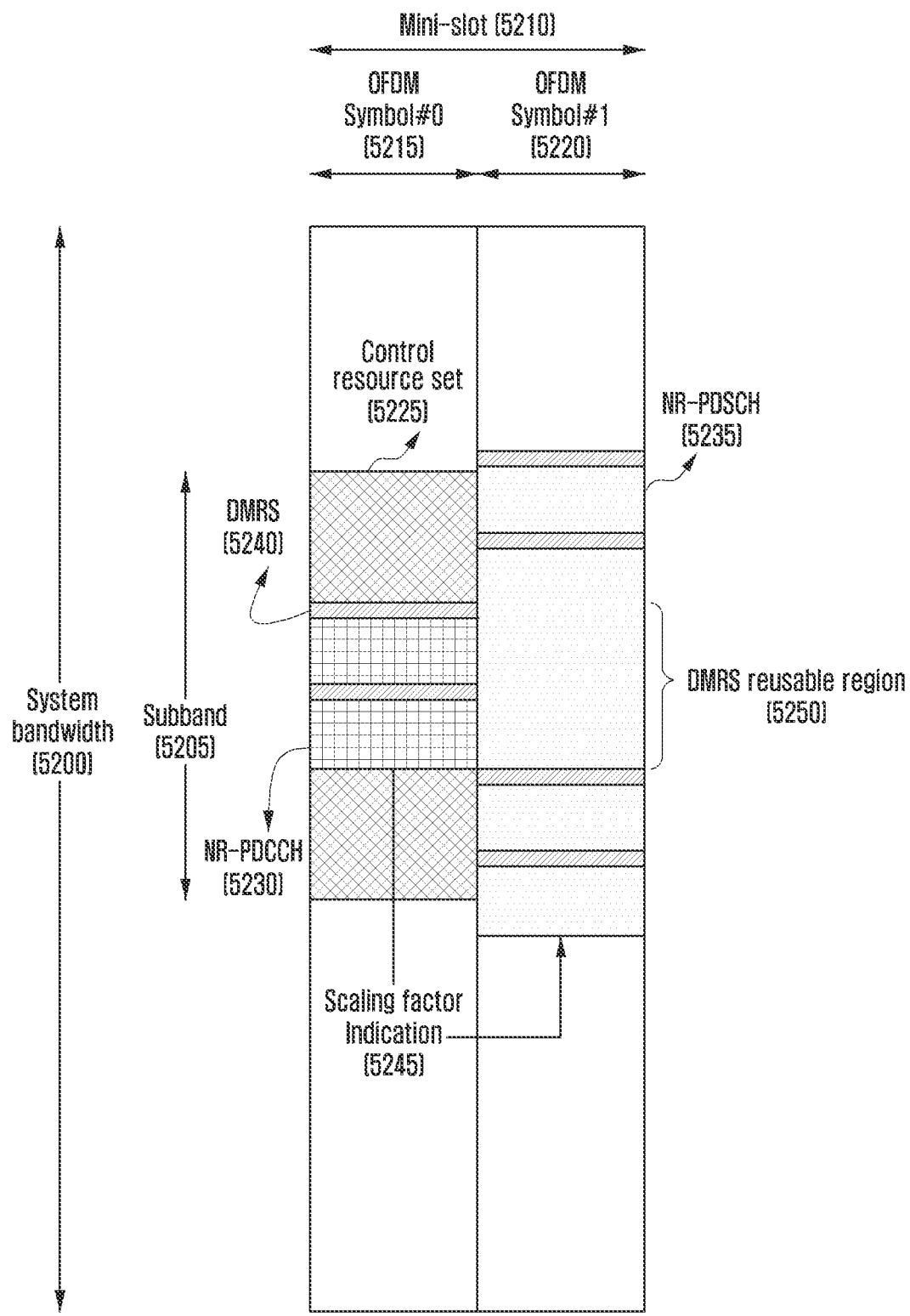
FIG. 52 is a diagram illustrating a 3-6-th embodiment according to various embodiments of the present disclosure.

FIG. 52 is a diagram illustrating a 3-6-th embodiment according to various embodiments of the present disclosure.

As illustrated in FIG. 52, a mini-slot 5210 consists of two OFDM symbols 5215 and 5220, and a control channel resource set 5225 is set to be a specific subband 5205 smaller than the system bandwidth 5200 of OFDM symbol #0 5215. An NR-PDCCH 5230 may be transmitted while being mapped to any RB within the control channel resource set 5225 and a DMRS 5240 for decoding the NR-PDCCH 5230 may be transmitted.

In the 3-6-th embodiments of the present disclosure illustrated in FIG. 52, the RB assignment of the NR-PDSCH 5235 may be set by a relational expression for the RB assignment of the NR-PDCCH 5230. This will be represented by the following Equation 3.

$$\text{RB assignment of NR-PDSCH} = f(\text{RB assignment of NR-PDCCH}) \quad \text{Equation 3}$$

In the Equation 3, y=f(x) denotes an arbitrary functional relationship between x and y. For example, the RB assignment of the NR-PDSCH 5235 may be represented by the scaling of the RB assignment of the NR-PDCCH 5230. More specifically, if the RB assignment start point of the NR-PDCCH 5230 is X and the RB assignment length is Y, the RB assignment start point of the NR-PDSCH 5235 may be a·X and the RB assignment length may be allocated to b·Y. Here, a and b are each defined as scaling parameters. Therefore, the base station according to the third to the 3-6-th embodiment of the present disclosure may additionally transmit an indicator 5245 for the scaling parameter of the RB assignment for the NR-PDSCH 5235 to the DCI. The terminal may obtain the RB assignment information for the NR-PDCCH 5230 through blind decoding, and know the RB assignment information for the NR-PDSCH 5235 by a combination of the RB assignment information of the NR-PDCCH 5230 and the scaling indicator 5245.

According to the 3-6-th embodiment of the present disclosure, there may be an area 5250 in which the NR-PDSCH 5235 may reuse the DMRS 5240 of the NR-PDCCH 5230. Therefore, the base station may transmit the additional indicator for the reuse of the DMRS 5240 to the DMRS reuse possible area 5250.

3-7-th Embodiment

Figure 53:
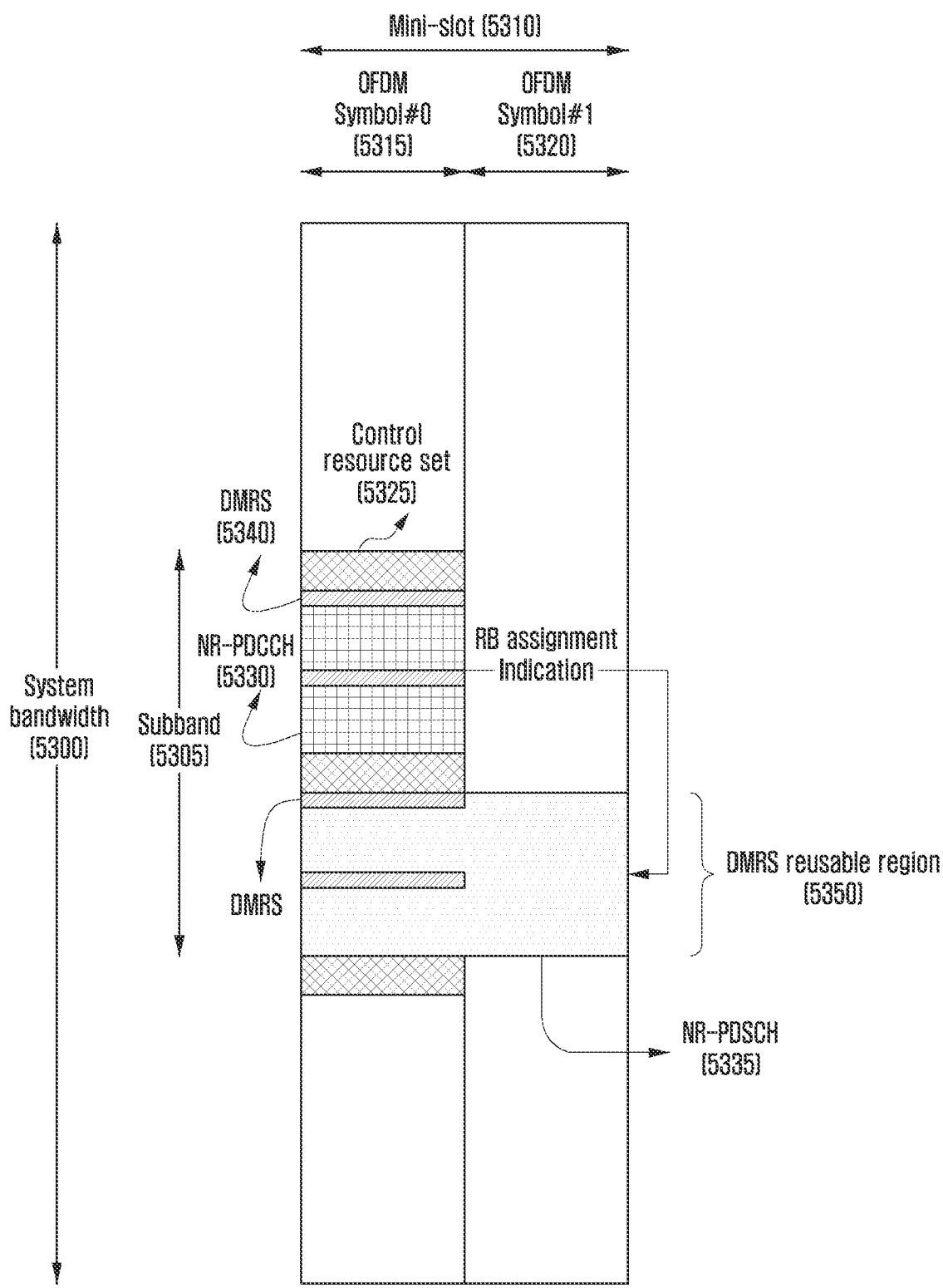
FIG. 53 is a diagram illustrating a 3-7-th embodiment according to various embodiments of the present disclosure.

FIG. 53 is a diagram illustrating a 3-7-th embodiment according to various embodiments of the present disclosure.

As illustrated in FIG. 53, a mini-slot 5310 consists of two OFDM symbols 5315 and 5320, and a control channel resource set 5325 is set to be a specific subband 5305 smaller than the system bandwidth 5300 of OFDM symbol #0 5315. An NR-PDCCH 5330 may be transmitted while being mapped to any RB within the control channel resource set 5325 and a DMRS 5340 for decoding the NR-PDCCH 5330 may be transmitted.

In the 3-7-th embodiment of the present disclosure illustrated in FIG. 53, the RB assignment of the NR-PDSCH 5335 may be made in the control channel resource set 5325. More specifically, the NR-PDSCH 5335 may be allocated to the remaining RBs other than the RB to which the NR-PDCCH 5330 in the control channel resource set 5325 is allocated. At this time, the NR-PDSCH 5335 may be allocated over two OFDM symbols 5315 and 5320, and the DMRS 5340 may be transmitted only in the OFDM symbol #0. Alternatively, the distributed transmission scheme is configured for the transmission of the NR-PDCCH 5330 in the control channel resource set 5325 so that if the DMRS 5340 is transmitted to the common or shared RS over the entire subband 5305 of the control channel resource set 5325, the DMRS 5340 may be reused for the decoding of the NR-PDSCH 5335 (in particular, used in the DMRS reuse possible area 5350).

In the above description, the method for efficiently transmitting a downlink control channel according to the present disclosure has been described in detail with reference to various embodiments. The above-described embodiments describe an example of some of various operations which may be derived by associating the RB assignment of the downlink control channel and the downlink data channel, and there may be various operations on the same principle. Although the above embodiments are described based on the dynamic setting and operations, it is not excluded that the above embodiments may be operated by the same scheme even by the static or semi-static setting.

The operation for associating the RB assignment of the DL control channel and the DL data channel proposed in the present disclosure (which is defined as a mini-slot transmission mode in the following description) is set statically or semi-statically, this may be determined based on various system parameters. For example, the above operation may be set statically or semi-statically based on the parameters such as the size of the downlink data packet transmitted in the mini-slot, the variation in the size of the downlink data packet, the channel state (received signal quality, time and frequency selective characteristics of the channel, or the like), and the required delay time, which may be set to each terminal, for example, via RRC signaling.

In addition, the newly proposed DCI information (e.g., the RS reuse indicator and the simplified RB assignment indicator) through the above embodiments may not be dynamically transmitted through the DCI but may be set to statically or semi-statically through the signaling. The terminal configured in the mini-slot transmission mode may perform decoding on the downlink control channel and the downlink data channel according to the promised setting, under the assumption that the RB assignment of the downlink control channel and the downlink data channel is associated.

Hereinafter, the operation of the base station and the terminal according to the embodiment of the present disclosure will be described.

Figure 54:
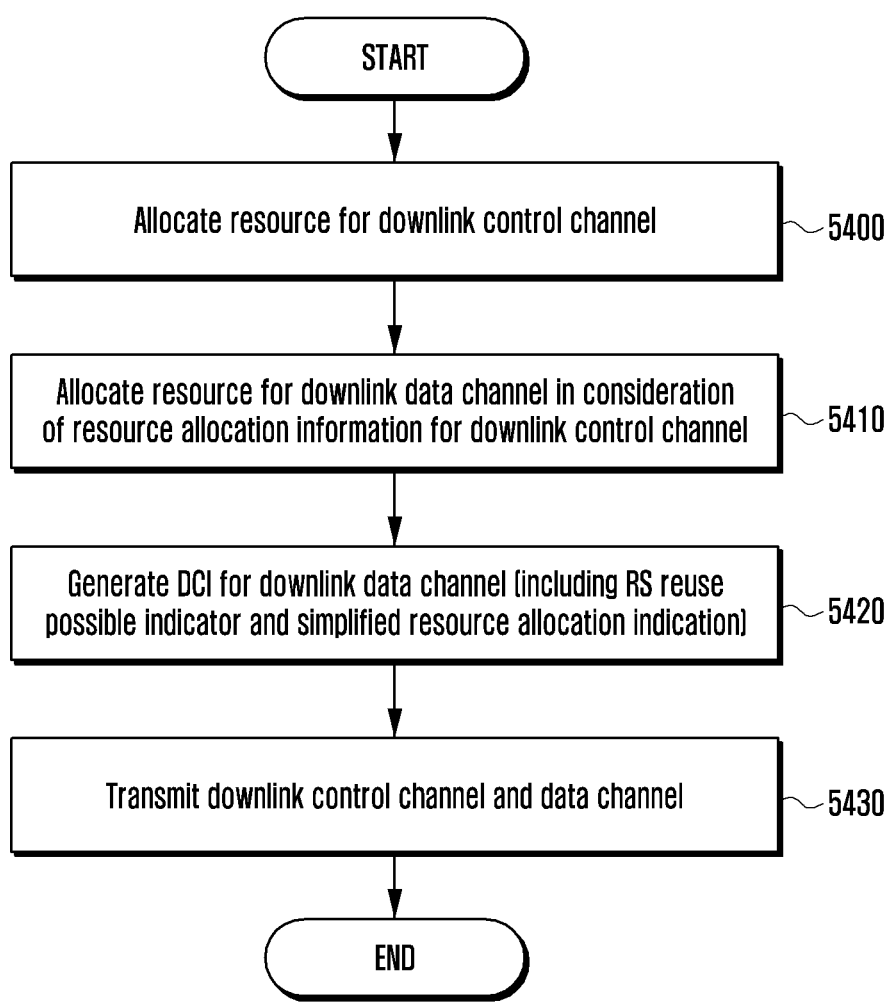
FIG. 54 is a diagram illustrating an operation of a base station according to various embodiments of the present disclosure.

FIG. 54 is a diagram illustrating an operation of a base station according to various embodiments of the present disclosure.

The base station performs the resource allocation for the downlink control channel (i.e., the NR-PDCCH) in operation 5400. The base station performs the resource allocation for the downlink data channel in consideration of the previously allocated downlink control channel information in operation 5410 (e.g., in the manner of the embodiment of the present disclosure described above). In operation 5420, the base station generates the DCI for the downlink data channel. At this time, different information may be included in the DCI based on the resource allocation relation between the DL control channel and the DL data channel as described in the embodiment of the present disclosure. For example, the indicator discriminating whether the downlink data channel may reuse the RS of the downlink control channel or the simplified resource allocation indicator (e.g., an indicator not including a resource allocation indictor, an indicator indicating only a part of the resource allocation, etc.) different from the existing resource allocation indicator may be included. The base station transmits the downlink control channel and the data channel in operation 5430.

Figure 55:
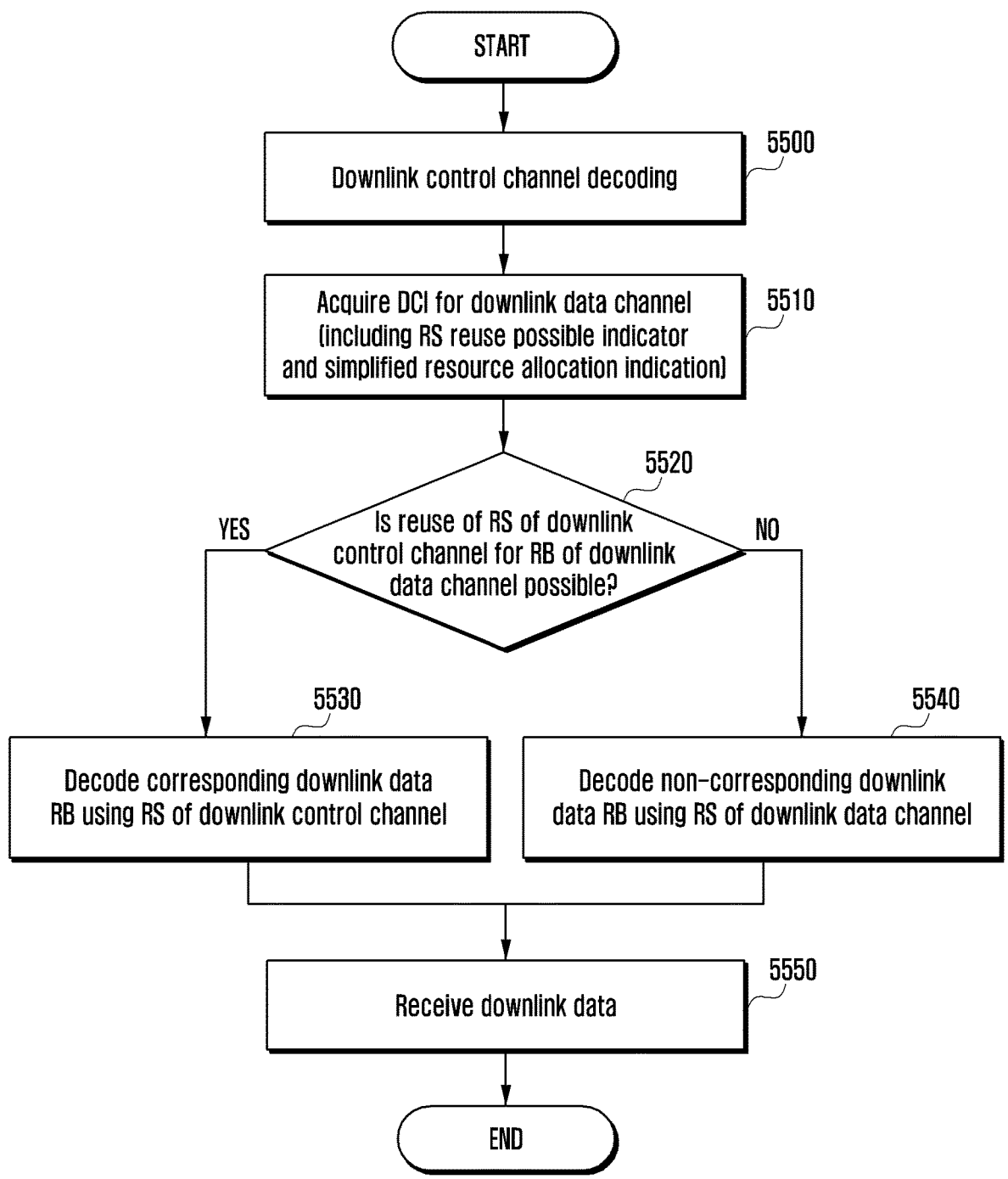
FIG. 55 is a diagram illustrating an operation of a terminal according to various embodiments of the present disclosure.

FIG. 55 is a diagram illustrating an operation of a terminal according to various embodiments of the present disclosure.

In operation 5500, the terminal performs the decoding on the downlink control channel. The terminal can decode the downlink control channel through the blind decoding in a search space configured for the downlink control channel. The terminal acquires the DCI information in operation 5510. At this time, the DCI may include the RS reuse possible indicator and the simplified resource allocation (RB assignment) indicator. The terminal determines from the DCI acquired in operation 5520 whether the RS of the downlink control channel may be reused in the specific RB to which the DL data channel is allocated. If the RS can be reused, the terminal can may the RS of the downlink control channel when decoding the downlink data channel of the corresponding RB in operation 5530, and if the RS may not be reused, the terminal may decode the downlink data channel using the RS of the downlink data channel existing in the corresponding RB in operation 5540. The terminal completes the decoding for the downlink data channel, and performs the downlink data reception in operation 5550.

Figure 56:
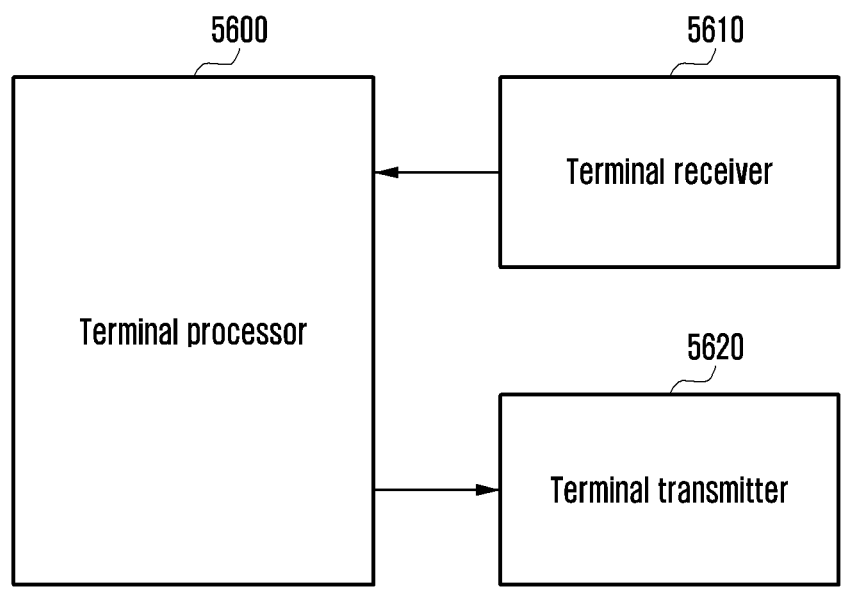
FIG. 56 is a block diagram illustrating an internal structure of the terminal according to various embodiments of the present disclosure.
Figure 57:
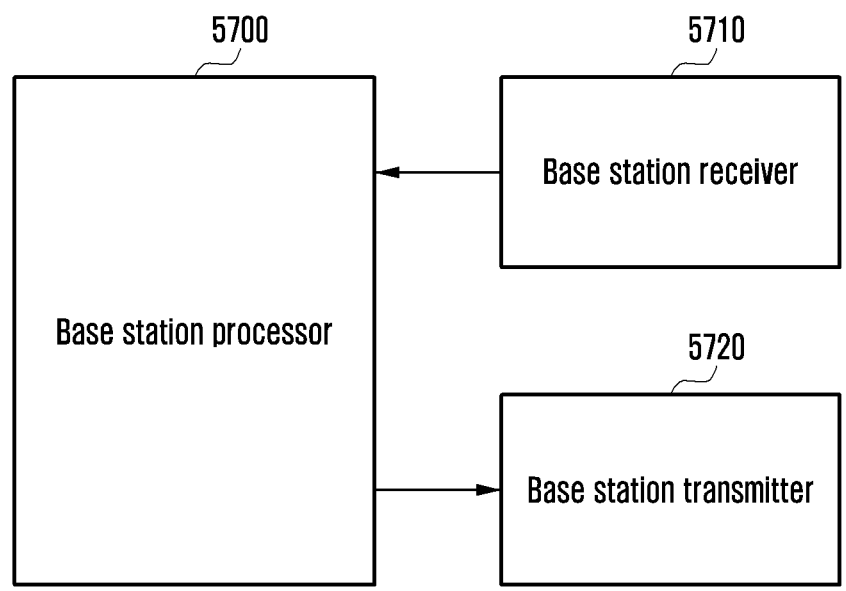
FIG. 57 is a block diagram illustrating an internal structure of the base station according to various embodiments of the present disclosure.

In order to perform the above-described embodiments of the present disclosure, a transmitter, a receiver, and a controller of the terminal and the base station are each illustrated in FIGS. 56 and 57. The transmission/reception method of the base station and the terminal for the method and apparatus for transmitting downlink control information in a 5G communication system corresponding to the 3-1-th, 3-2-th, 3-3-th, 3-4-th, 3-5-th, 3-6-th, and 3-7-th embodiments is described. For the purpose, the transmitter, the receiver, and the processor of the base station and the terminal should be operated according to each embodiment.

FIG. 56 is a block diagram illustrating an internal structure of the terminal according to various embodiments of the present disclosure. As illustrated in FIG. 56, the terminal of the present disclosure may include a terminal processor 5600, a terminal receiver 5610, and a terminal transmitter 5620.

The terminal processor 5600 may control a series process so that the terminal may be operated according to the embodiment of the present disclosure as described above. For example, according to an embodiment of the present disclosure, the NR-PDCCH and NR-PDSCH decoding operations of the terminal may be controlled differently according to the NR-PDCCH configuration information, the NR-PDSCH configuration information, the configuration information for the RS reuse configuration information, or the like. The terminal receiver 5610 and the terminal transmitter 5620 are collectively referred to as a transceiver in the embodiment of the present disclosure. The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 5600 and transmit the signal output from the terminal processor 5600 through the radio channel.

FIG. 57 is a block diagram illustrating an internal structure of a base station according to various embodiments of the present disclosure. As illustrated in FIG. 57, the base station of the present disclosure may include a base station processor 5700, a base station receiver 5710, and a base station transmitter 5720.

The base station processor 5700 may control a series process so that the base station may be operated according to the embodiment of the present disclosure as described above. For example, according to an embodiment of the present disclosure, the DCI generation, the NR-PDCCH transmission, and the NR-PDSCH scheduling and transmission of the base station may be controlled differently according to the NR-PDCCH configuration information, the NR-PDSCH configuration information, the configuration information for the RS reuse configuration information, or the like. Also, it is possible to perform the scheduling for the uplink/downlink control channel and the data channel according to the NR-PDCCH transmission mode, and to indicate the configuration information to the terminal. The terminal receiver 5710 and the terminal transmitter 5720 are collectively referred to as a transceiver in the embodiment of the present disclosure. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the base station processor 5700 and transmit the signal output from the base station processor 5700 through the radio channel.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting control information in a wireless communication system, the method comprising:
 transmitting a control channel including control information based on time-frequency region configured by a higher layer signaling, the control information indicating a number of contiguous frequency resources for a data channel; and transmitting the data channel using resources corresponding to the number of contiguous frequency resources from a starting frequency resource for the data channel, wherein the starting frequency resource for the data channel is same as a starting frequency resource for the control channel, wherein the starting frequency resource for the control channel is identified by a receiving apparatus based on a blind decoding for the control channel, and wherein the starting frequency resource for the data channel is identified by the receiving apparatus to be the same as the identified starting frequency resource for the control channel.

2. The method of claim 1, wherein information on the starting frequency resource for the data channel transmitted in a same slot with the control channel, is not included in the control information.

3. The method of claim 1, wherein resources for the control channel are not available for the data channel.

4. The method of claim 1, wherein resources for the control channel are configured based on unit of symbol in a time domain, and unit of physical resource block (PRB) in a frequency domain.

5. The method of claim 1, wherein the data channel is transmitted in a same slot with the control channel.

6. A method of receiving control information in a wireless communication system, the method comprising:

receiving a control channel including control information based on time-frequency region configured by a higher layer signaling, the control information indicating a number of contiguous frequency resources for a data channel;

identifying a starting frequency resource for the control channel based on a blind decoding for the control channel;

identifying a starting frequency resource for the data channel based on the identified starting frequency resource for the control information, wherein the starting frequency resource for the data channel is identified to be the same as the starting frequency resource for the control channel; and receiving the data channel using resources corresponding to the number of contiguous frequency resources from the starting frequency resource for the data channel.

7. The method of claim 6, wherein information on the starting frequency resource for the data channel received in a same slot with the control channel, is not included in the control information.

8. The method of claim 6, wherein resources for the control channel are not available for the data channel.

9. The method of claim 6, wherein resources for the control channel are configured based on unit of symbol in a time domain, and unit of physical resource block (PRB) in a frequency domain.

10. The method of claim 6, wherein the data channel is received in a same slot with the control channel.

11. A transmitting apparatus for transmitting control information in a wireless communication system, the transmitting apparatus comprising:

a transceiver; and a controller coupled with the transceiver and configured to:

transmit a control channel including control information based on time-frequency region configured by a higher layer signaling, the control information indicating a number of contiguous frequency resources for a data channel, and transmit the data channel using resources corresponding to the number of contiguous frequency resources from a starting frequency resource for the data channel, wherein the starting frequency resource for the data channel is same as a starting frequency resource for the control channel, wherein the starting frequency resource for the control channel is identified by a receiving apparatus based on a blind decoding for the control channel, and wherein the starting frequency resource for the data channel is identified by the receiving apparatus to be the same as the identified starting frequency resource for the control channel.

12. The transmitting apparatus of claim 11, wherein information on the starting frequency resource for the data channel transmitted in a same slot with the control channel, is not included in the control information.

13. The transmitting apparatus of claim 11, wherein resources for the control channel are not available for the data channel.

14. The transmitting apparatus of claim 11, wherein resources for the control channel are configured based on unit of symbol in a time domain, and unit of physical resource block (PRB) in a frequency domain.

15. The transmitting apparatus of claim 11, wherein the data channel is transmitted in a same slot with the control channel.

16. A receiving apparatus for receiving control information in a wireless communication system, the receiving apparatus comprising:

a transceiver; and a controller coupled with the transceiver and configured to:

receive a control channel including control information based on time-frequency region configured by a higher layer signaling, the control information indicating a number of contiguous frequency resource for a data channel, identify a starting frequency resource for the control channel based on a blind decoding for the control channel, identify a starting frequency resource for the data channel based on the identified starting frequency resource for the control information, wherein the starting frequency resource for the data channel is identified to be the same as the starting frequency resource for the control channel, and receive the data channel using resources corresponding to the number of contiguous frequency resources from the starting frequency resource for the data channel.

17. The receiving apparatus of claim 16, wherein information on the starting frequency resource for the data channel received in a same slot with the control channel, is not included in the control information.

18. The receiving apparatus of claim 16, wherein resources for the control channel are not available for the data channel.

19. The receiving apparatus of claim 16, wherein resources for the control channel are configured based on unit of symbol in a time domain, and unit of physical resource block (PRB) in a frequency domain.

20. The receiving apparatus of claim 16, wherein the data channel is received in a same slot with the control channel.

\* \* \* \* \*